United States Patent [19]

Bloom et al.

[11] 4,124,592
[45] Nov. 7, 1978

[54] BIS-INDOLYL PHTHALIDES AND NAPHTHALIDES

[75] Inventors: Stanley M. Bloom, Waban; Alan L. Borror, Lexington; Paul S. Huyffer, West Boxford, all of Mass.

[73] Assignee: Polaroid Corporation, Cambridge, Mass.

[21] Appl. No.: 409,012

[22] Filed: Oct. 23, 1973

Related U.S. Application Data

[63] Continuation-in-part of Ser. No. 108,277, Jan. 21, 1971, abandoned.

[51] Int. Cl.$^2$ ............... C07D 209/04; C07D 209/20; C07D 209/14
[52] U.S. Cl. ............... 260/326.12 R; 96/50 PL; 260/326.14 R; 260/326.15
[58] Field of Search ............ 260/326.12 R, 326.14 R, 260/326.15

[56] References Cited

U.S. PATENT DOCUMENTS

| | | | |
|---|---|---|---|
| 3,509,173 | 4/1970 | Lin | 260/326.14 R |
| 3,509,174 | 4/1970 | Lin | 260/326.14 R |
| 3,862,128 | 1/1975 | Greenwald | 260/326.12 R |

*Primary Examiner*—Ethel G. Love
*Attorney, Agent, or Firm*—Sybil A. Campbell

[57] ABSTRACT

This invention relates to indole phthalein indicator dyes including phthalides and naphthalides wherein one of the indol-3-yl radicals is substituted with a hydrogen-bonding group on a carbon atom adjacent to the nitrogen atom of the indole ring. In a preferred embodiment, one of the indol-3-yl radicals is substituted with a hydrogen-bonding group and the other indol-3-yl radical is substituted with a hydrogen-bonding group or with an electron-withdrawing group. These indicator dyes, especially those of the preferred embodiment, possess a relatively high pKa and a relatively broad absorption spectrum in the visible range.

41 Claims, 18 Drawing Figures

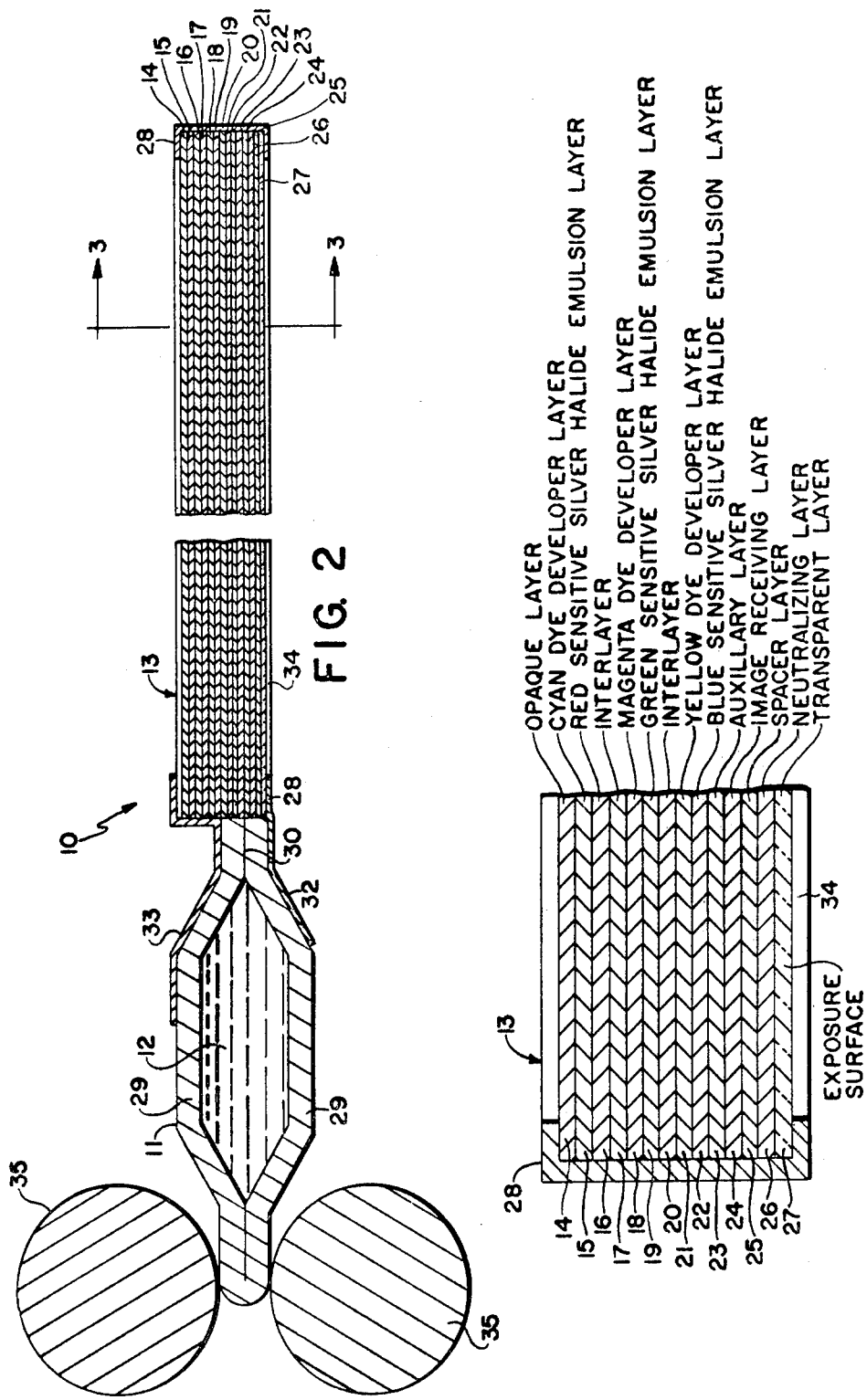

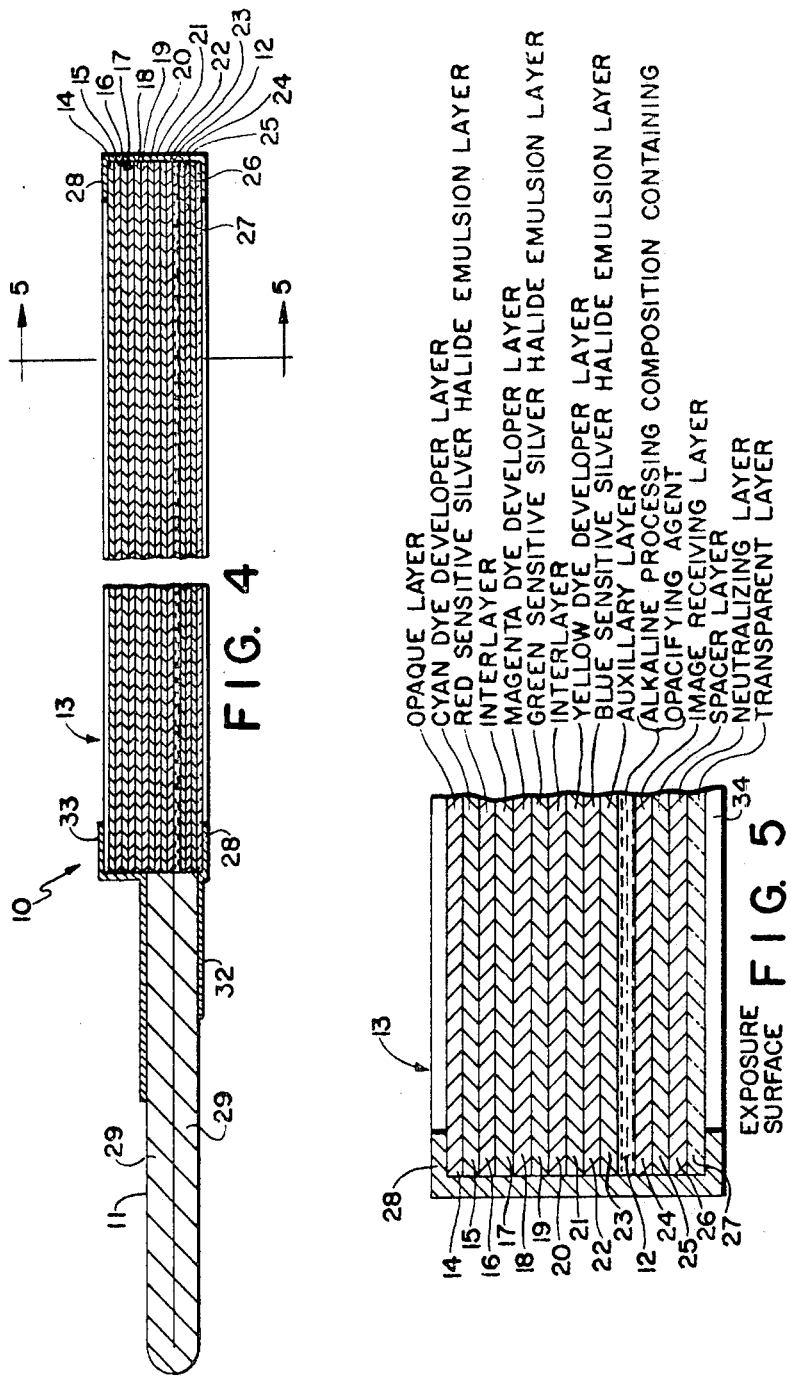

BIS-INDOLYL PHTHALIDES AND NAPHTHALIDES

CROSS-REFERENCE TO RELATED PATENT APPLICATIONS

This application is a continuation-in-part of U.S. Patent application Ser. No. 108,277 filed Jan. 21, 1971, now abandoned.

BACKGROUND OF THE INVENTION

1. Field of the Invention

The present invention relates to photographic processes and products wherein certain light-absorbing dyes are employed as optical filter agents to protect a selectively exposed photosensitive material from further exposure by incident radiation actinic thereto during processing in the presence of light and to novel indole phthaleins useful therein.

2. DESCRIPTION OF THE PRIOR ART

The production of both silver and color images including monochromatic and multicolor images employing diffusion transfer techniques is now well-known. In these processes, a photosensitive element comprising a layer of photosensitive material is exposed to provide a latent image therein and wetted by a liquid processing composition, for example, by immersion, coating, spraying, flowing, etc., in the dark, and the exposed photosensitive element superposed prior to, during or after wetting, on a sheetlike support element which may be utilized as an image-receiving element. As a function of developing the latent image, there is formed an imagewise distribution of image-forming components which imagewise distribution is transferred, by imbibition, to form the final image either in the photosensitive or image-receiving element.

U.S. Pat. No. 3,415,644, discloses a composite photosensitive structure, particularly adapted for use in reflection type photographic diffusion transfer color processes. This structure comprises a plurality of essential layers including, in sequence, a dimensionally stable opaque layer; one or more silver halide emulsion layers having associated therewith dye image-providing material which is soluble and diffusible, in alkali, at a first pH, as a function of the point-to-point degree of its associated silver halide emulsion's exposure to incident actinic radiation; a polymeric layer adapted to receive solubilized dye image-providing material diffusing thereto; a polymeric layer containing sufficient acidifying capacity to effect reduction of a processing composition from the first pH to a second pH at which the dye image-providing material is substantially nondiffusible; and a dimensionally stable transparent layer. This structure may be exposed to incident actinic radiation and processed by interposing, intermediate the silver halide emulsion layer and the reception layer, an alkaline processing composition providing the first pH and containing a light-reflecting agent, for example, titanium dioxide to provide a white background. The light-reflecting agent (referred to in said patent as an "opacifying agent") also performs an opacifying function, i.e., it is effective to mask the developed silver halide emulsions and also acts to protect the photoexposed emulsions from postexposure fogging by light passing through the transparent layer if the photoexposed film unit is removed from the camera before image formation is complete.

In a preferred embodiment, the composite photosensitive structure includes a rupturable container, retaining the alkaline processing composition having the first pH and reflecting agent, fixedly positioned extending transverse a leading edge of the composite structure in order to effect, upon application of compressive pressure to the container, discharge of the processing composition intermediate the opposed surfaces of the reception layer and the next adjacent silver halide emulsion.

The liquid processing composition distributed intermediate the reception layer and the silver halide emulsion, permeates the silver halide emulsion layers of the composite photosensitive structure to initiate development of the latent images contained therein resultant from photoexposure. As a consequence of the development of the latent images, dye image-providing material associated with each of the respective silver halide emulsion layers is individually immobilized as a function of the point-to-point degree of the respective silver halide emulsion layer photoexposure, resulting in imagewise distributions of mobile dye image-providing materials adapted to transfer, by diffusion, to the reception layer to provide the desired transfer dye image. Subsequent to substantial dye image formation in the reception layer, a sufficient portion of the ions of the alkaline processing composition transfers, by diffusion, to the polymeric neutralizing layer to effect reduction in the alkalinity of the composite film unit to the second pH at which dye image-providing material is substantially non-diffusible, and further dye image-providing material transfer is thereby substantially obviated.

The transfer dye image is viewed, as a reflection image, through the dimensionally stable transparent layer against the background provided by the reflecting agent, distributed as a component of the processing composition, intermediate the reception layer and next adjacent silver halide emulsion layer. The thus-formed stratum effectively masks residual dye image-providing material retained in association with the developed silver halide emulsion layer subsequent to processing.

In the copending U.S. Patent application Ser. No. 786,352 of Edwin H. Land, filed Dec. 23, 1968, now abandoned, and copending U.S. Patent application Ser. No. 101,968 filed Dec. 28, 1970, now U.S. Pat. No. 3,647,437; in part a continuation of Ser. No. 786,352, an organic light-absorbing reagent (or optical filter agent), such as a dye, which is present as a light-absorbing species at the first pH and which may be converted to a substantially non-light-absorbing species at the second pH is used in conjunction with the light-reflecting agent to protect the selectively exposed silver halide emulsions from post-exposure fogging when development of the photoexposed emulsions is conducted in the presence of extraneous incident actinic radiation impinging on the transparent layer of the film unit.

In the copending U.S. Patent application Ser. No. 43,782, of Edwin H. Land, filed June 5, 1970, now abandoned, the stratum interposed intermediate, the reception layer and next adjacent silver halide layer is disclosed to comprise an inorganic light-reflecting pigment dispersion containing reflecting pigment in a concentration per se insufficient, distributed as a layer intermediate the reception layer and next adjacent silver halide layer, to effectively prevent transmission of a given level of radiation actinic to the silver halide layer therethrough and at least one optical filter agent at a pH above the pKa of the optical filter agent, in a concentration per se also insufficient to prevent transmission of said given level of actinic radiation therethrough, which concentrations individually and additively are together insufficient to prevent said transmission of incident actinic radiation but in admixture are synergistically effective to provide the requisite transmission density to prevent such transmission of said given level of radiation until modulation of the environmental pH to below the pKa of the optical filter agent whereby the transmission density is rendered sufficiently low to permit substantially immediate viewing of transfer image formation against the background provided by the reflecting pigment.

SUMMARY OF THE INVENTION

It is the primary object of the present invention to provide photographic processes, products and compositions, employing as optical filter agents, a particular class of indicator dyes derived from indoles and also to provide novel indole phthalein indicator dyes.

Other objects of the present invention will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claims.

According to the present invention, it has been discovered quite unexpectedly that certain dyes, namely, indicator dyes containing an indole radical, a second aromatic radical and a ring-closing moiety bonded to the aromatic radical and to the 2- or 3-position of the indole radical are eminently suitable for use as optical filter agents for protecting an exposed photosensitive material from post-exposure fogging in photographic processes where the photosensitive material subsequent to selective exposure to form a latent image therein and during at least the initial stages of developing the latent image, is non-selectively exposed to extraneous incident light. These indicator dyes, because they contain at least one indole radical bonded through the 2- or 3-position to the ring-closing moiety, are capable of absorbing radiation within a predetermined wavelength range in the shorter wavelength region of the visible spectrum. Depending upon the particular indole indicator dye selected, protection of photographic materials from post-exposure fogging may be achieved substantially throughout the blue portion of the spectrum and in the green portion as well. To achieve a highly effective light absorbing system throughout the visible spectrum, i.e., between about 400 nm. and 700 nm., the indole indicator dye(s) may be used in combination with another optical filter agent, such as a second dye or dyes, which are effective absorbers of radiation in the longer wavelength region of the spectrum.

Besides being efficient absorbers of short wavelength radiation, this class of dyes because they are indicators or pH sensitive dyes possess spectral absorption characteristics which are reversibly alterable in response to changes in environmental pH. These dyes possess a highly colored form capable of absorbing visible radiation at a first pH value and may be converted to a substantially colorless form, i.e., a form substantially non-absorbing in the visible spectrum at a second pH value, and vice versa. Though these dyes may be used in any photographic process for protecting a selectively exposed photosensitive material from postexposure fogging by radiation within said wavelength range during development of a latent image to a visible image, these indole dyes, because of their ability to be rendered alternately light-absorbing and non-light absorbing by adjusting the pH of their environment, find particular utility in photographic processes employing composite photographic film units containing means for modulating environmental pH and particularly, in diffusion transfer processes of the type described in aforementioned U.S. Pat. No. 3,415,644 and in aforementioned U.S. Patent application Ser. Nos. 786,352; 43,782; and 101,968 filed Dec. 28, 1970. For convenience, the specifications of these applications and of the patent are specifically incorporated herein.

Specifically, the present invention is directed to photographic processes comprising the steps of selectively exposing a photosensitive element comprising a layer of photosensitive material to radiation actinic thereto to provide a latent image therein, applying a processing composition to provide an indicator dye containing an indole radical, a second aromatic radical and a ring closing moiety bonded to the aromatic radical and to the 2- or 3-position of the indole radical in a form capable of absorbing a predetermined wavelength range of said radiation actinic to said photosensitive material, and developing said latent image while exposing said photosensitive element non-selectively to incident actinic radiation within said predetermined wavelength range, said indicator dye being present during development in a position and quantity effective to absorb radiation within said wavelength range of incident radiation in an amount sufficient to prevent any substantial increase in the minimum density of the image obtained by said development of said latent image.

In another embodiment, a second dye(s) is present which has a principal absorption in a second and at least partly different predetermined wavelength range and the indole dye(s) and said second dye(s) together absorb radiation over the range of 400 nm. to 700 nm.

In a further embodiment, the second dye(s) is also an indicator dye having spectral absorption characteristics reversibly alterable in response to the pH of its environment, and the indole dye(s) and second dye(s) are converted to a substantially non-light-absorbing form subsequent to at least the initial stages of development of the latent image.

The photographic products provided by the present invention comprise a support layer carrying a layer of photosensitive material having associated therewith an indicator dye containing an indole radical, a second aromatic radical and a ring-closing moiety bonded to the aromatic radical and to the 2- or 3-position of the indole radical.

In another embodiment, the photographic products are photographic film units particularly adapted for production of a transfer image by diffusion transfer processes and may be constructed to include a photosensitive element containing a layer of photosensitive material and an optical filter agent of the aforementioned class of indole indicator dyes adapted, subsequent to selective exposure of the photosensitive layer to form a latent image therein, to selectively absorb incident actinic radiation without deleteriously affecting either the composition of and/or the development of the latent image, and a diffusion transfer image-receiving element.

In a further embodiment of the present invention the photographic products are film units specifically adapted to provide a dye transfer image by color diffusion transfer processes. The photosensitive layer, e.g., a photosensitive silver halide layer will have associated therewith a compound providing, as a function of development of a latent image in the associated silver halide layer, an imagewise distribution of a dye image-forming material which is soluble and diffusible in the processing composition, and an optical filter agent of the aforementioned class of indole indicator dye adapted, as a function of environmental pH to selectively effect absorption of incident actinic radiation, subsequent to selective exposure of the photosensitive layer to form the latent image therein.

In a preferred embodiment of the present invention, a second pH sensitive dye or dyes will be used in conjunction with the aforementioned indole indicator dye(s), which dyes together with absorb incident actinic radiation over the range of 400 nm. to 700 nm. The film unit employed will comprise a composite photosensitive element including, in sequence, a first layer or support material, two or more photosensitive silver halide layers each having associated therewith a compound providing, as a function of development of a latent image in the associated silver halide layer, an imagewise distribution of image-forming material which is soluble and diffusible in the processing composition, a layer adapted to receive image-forming material diffusing thereto, a second layer or support material and means for modulating the pH of the film unit. In combination with the composition structure, a rupturable container retaining a processing composition is fixedly positioned and extends transverse a leading edge of the composite structure whereby to effect, upon application of compressive pressure, discharge of the processing composition intermediate the image-receiving layer and the next adjacent photosensitive silver halide layer.

For a fuller understanding of the nature and objects of the invention, reference should be had to the following detailed description taken in connection with the accompanying drawings.

BRIEF DESCRIPTION OF THE DRAWINGS

FIGS. 2, 4 and 6 are diagrammatic enlarged cross-sectional views of the film unit of FIG. 1, along section line 2—2, illustrating the association of elements during the three illustrated states of the performance of a diffusion transfer process, for the production of a multicolor transfer image according to the invention, the thickness of the various materials being exaggerated, and wherein FIG. 2 represents an exposure stage, FIG. 4 represents a processing stage and FIG. 6 represents a product of the process;

FIGS. 3, 5 and 7 are diagrammatic, further enlarged cross-sectional views of the film unit of FIGS. 2, 4 and 6, along section lines 3—3, 5—5 and 7—7, respectively, further illustrating, in detail, the arrangement of layers comprising the photosensitive laminate during the three illustrated stages of the transfer process.

DETAILED DESCRIPTION OF THE INVENTION

Figure 1:
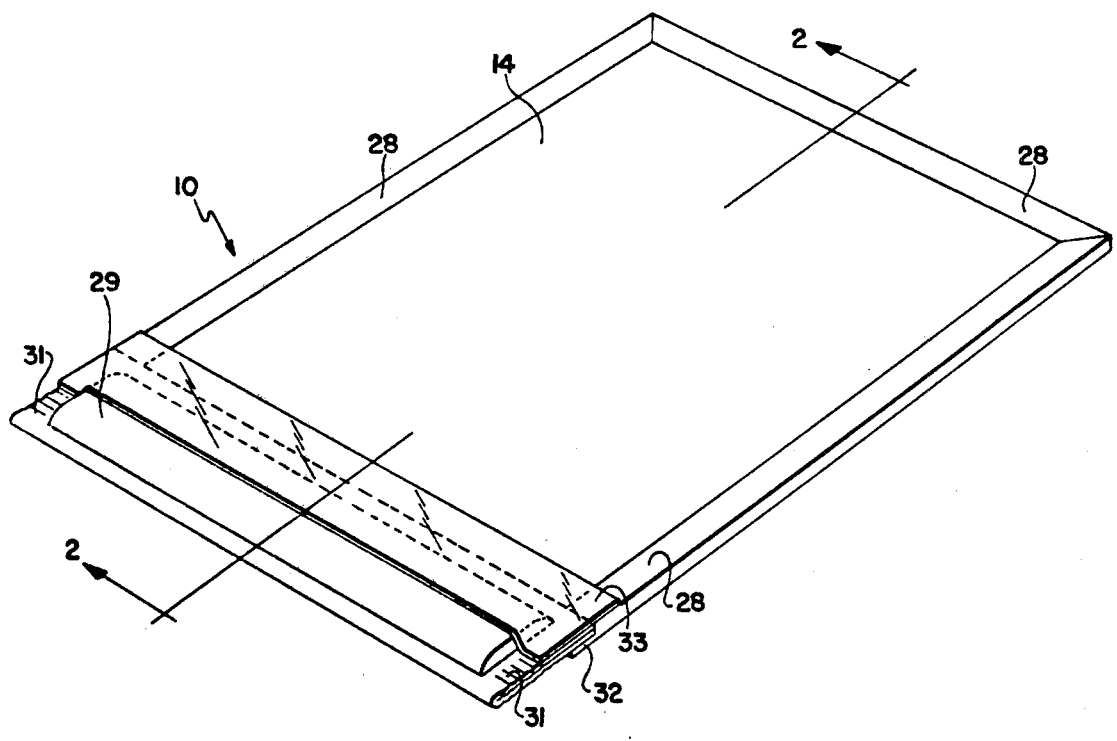
FIG. 1 is a perspective view of a photographic film unit embodying the invention.

As noted above, it has been found in accordance with the present invention that a selectively exposed photosensitive material having a latent image therein may be processed in the presence of extraneous incident radiation actinic thereto within the shorter wavelength region of the visible spectrum by reason of the protection afforded by a particular class of indicator dyes derived from indoles. Specifically, these indicator dyes contain an indole radical, a second aromatic radical and a ring-closing moiety bonded to the aromatic radical and to the 2- or 3-position of the indole radical.

Typical of such indicator dyes are those represented by the following formula:

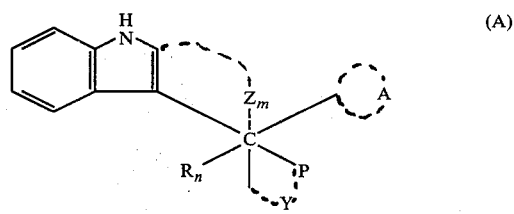
(A)

wherein A is an aromatic radical; Z represents the atoms necessary to complete a ring-closing moiety; R is a group selected from hydrogen, alkyl and aryl; $y$ represents the atoms necessary to complete a ring-closing moiety; $m$, $n$ and $p$ each are integers selected from 0 and 1, provided $n$ is 1 and $p$ is 0 when $m$ is 1 and provided $n$ is 0, and $p$ is 1 when $m$ is 0.

Illustrative of indicator dyes within Formula (A) are those as represented by the following formula:

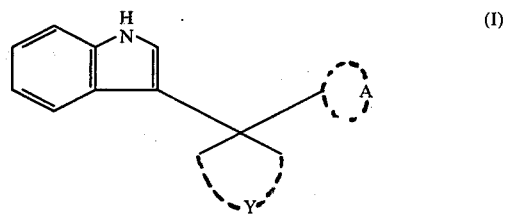
(I)

wherein A is an aromatic radical and Y represents the atoms necessary to complete a ring-closing moiety; and

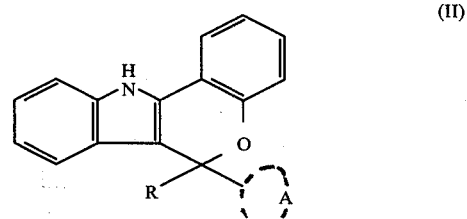
(II)

wherein A is an aromatic radical and R is selected from hydrogen, alkyl and aryl.

As the A radical in the above formulae, any aromatic radical is suitable since the desired spectral absorption characteristics are due to the indole radical, provided the indole radical is bonded to the ring-closing moiety through the 2- or 3-position. Accordingly, the A radical may be carbocyclic aryl of the benzene or naphthalene series, preferably benzene or naphthalene containing a para substituent, such as hydroxy or amino, or it may be heterocyclic aryl containing O, N, S, P and combinations thereof. When the A radical is heterocyclic aryl, it is preferably N-heterocyclic aryl, such as indole, e.g., indol-2-yl or indol-3-yl; pyrrole, e.g., pyrr-2-yl or pyrr-3-yl and carbazole, e.g., carbazol-3-yl. Likewise, the ring-closing moiety Z and y may be any of those commonly used in pH sensitive dyes, such as, a phenolate, carboxylate or sulfonate, and preferably is a phenolate, such as, 3,4-benzochromane or a carboxylate such as a phthalide or naphthalide.

In the above formulae, the indole radical and/or second aromatic radical and/or the ring-closing moiety may be substituted, for example, with solubilizing groups to enhance the solubility of the indicator dye in the particular processing composition employed; with immobilizing groups where it is desired to render the indicator dye substantially non-diffusible in the processing composition and with electron-withdrawing and/or hydrogen-bonding groups as appropriate to adjust the pKa of the indicator dye for the particular processing conditions employed; and with other substituents, such as alkyl groups, which do not interfere with the photographic function of the indicator dye as an optical filter agent.

Typical substituents include branched or straight chain alkyl, such as methyl, ethyl, isopropyl, n-butyl, t-butyl, hexyl, octyl, dodecyl, hexadecyl, octadecyl and eicosanyl; aryl, such as, phenyl, 2-hydroxyphenyl, 2-hydroxy-4-dodecyloxyphenyl, and naphthyl; alkaryl and aralkyl, such as, benzyl, phenethyl, phenylhexyl, p-octylphenyl, p-dodecylphenyl; alkoxy, such as, methoxy, ethoxy, butoxy, 1-ethoxy-2-($\beta$-ethoxyethoxy), dodecyloxy and octadecyloxy; aryloxy, such as phenoxy, benzyloxy, naphthoxy; alkoxyalkyl, such as methoxyethyl, dodecyloxyethyl; halo such as, fluoro, bromo, and chloro; trifluoroalkyl, such as trifluoromethyl, mono- and bis-trifluoromethyl carbinol; sulfonamido; sulfamoyl; amido; acyl and its derivatives; aminomethyl; sulfonyl; sulfo; cyano; amino including mono-and disubstituted amino, e.g., N-ethyl amino and N,N'-dimethylamino, carboxy; and hydroxy.

In addition to the above, the substituent may comprise a fused ring. For example, the indole and/or second aromatic radical may contain as a substituent, a cycloaliphatic or an aromatic ring usually having 5 or 6 members, carbocyclic or heterocyclic and substituted or unsubstituted, bonded to adjacent carbon atoms, e.g.,

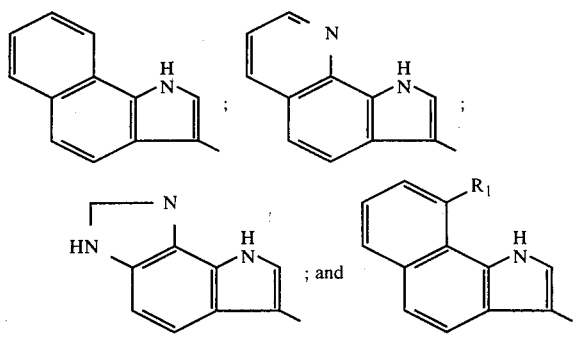

wherein $R_1$ is, e.g., —OH or —COOH.

As mentioned previously, the indicator dyes described above may be used as optical filter agents in any photographic process including conventional tray processing and diffusion transfer photographic techniques. In such processes, the dye or dyes during development of a selectively exposed photosensitive material will be in a position and in a concentration effective to absorb a given level of non-selective radiation incident on and actinic to the photosensitive material. The dyes may be initially disposed in the film unit, for example, in a layer coextensive with one or both surfaces of the photosensitive layer. Where selective exposure of the photosensitive material is made through a layer containing the indicator dye, then the dyes should be in a non-light-absorbing form until the processing solution is applied. Alternately, the dyes may be initially disposed in the processing composition in their light-absorbing form, for example, in the developing bath in tray processing or in the layer of processing solution distributed between the photosensitive element and the superposed image-receiving element (or spreader sheet) in diffusion transfer processing. The particular indicator dye or dyes selected should have an absorption spectrum corresponding to the sensitivity of the photosensitive layer, so as to afford protection over the predetermined wavelength range required by the particular photosensitive material employed and should have a pka such that they are in their colored form, i.e., light-absorbing form at the pH at which the photographic process is performed. Most commercially useful photographic processes are performed under alkaline conditions. Diffusion transfer processes, for example, usually employ highly alkaline processing solutions having a pH in excess of 12. Though the present invention is primarily concerned with indicator dyes to be used as optical filter agents in alkaline photographic systems, dyes may be selected from Formulae (I) and (II) above for use as optical filter agents in photographic processes performed under neutral or acidic conditions.

In photographic processes where the optical filter agent is retained in a stratum through which the final image is to be viewed, the color of the indicator dye may be discharged subsequent to image formation by adjusting the pH of the system to a value at which the dye is substantially non-light absorbing in the visible spectrum. Since most photographic processes are performed at an alkaline pH, the optical filter agent generally is rendered substantially colorless by reducing the environmental pH. However, where the process is carried out at acidic or neutral pH, the color of the optical filter agent is discharged by adjusting the system to a more alkaline pH at which the indicator dye is substantially non-light absorbing. In processes where the optical filter agent is removed or separated from the layer containing the final image or retained in a layer that does not interfere with viewing of the final image, it is unnecessary to convert the indicator dye to its non-light-absorbing form, though the color may be discharged if desired.

The concentration of indicator dye is selected to provide the optical transmission density required, in combination with other layers intermediate the silver halide emulsion layer(s) and the incident radiation, to prevent nonimagewise exposure, i.e., fogging, by incident actinic light during the performance of the particular photographic process. It has been found, by interposing neutral density (carbon containing) filters over a layer of titanium dioxide, that a transmission density of approximately 6.0 from said neutral density filters was effective to prevent fogging of a diffusion transfer multicolor film unit of the type described in said U.S. Pat. No. 3,415,644 having a transparent support layer and an Equivalent ASA Exposure Index of approximately 75 when processed for one minute in 10,000 foot candles of color corrected light, a light intensity approximating the intensity of a noon summer sun. The transmission density required to protect such a film unit under the stated conditions may also be expressed in terms of the "system" transmission density of all the layers intermediate the silver halide layer(s) and the incident light; the "system" transmission density required to protect color film units of the aforementioned type and photographic speed has been found to be on the order of 7.0 to 7.2. Lesser levels of optical transmission density would, of course, provide effective protection for shorter processing times, lesser light intensities and/or films having lower exposure indices. The transmission density and the indicator dye concentration necessary to provide one requisite protection from incident light may be readily determined for any photographic process by following the above described procedure or obvious modifications thereof.

Since most commercial photographic processes employ photosensitive materials sensitive to and exposable by actinic radiation throughout the visible spectrum, e.g., black-and-white panchromatic silver halide emulsions and multilayer silver halide emulsion elements, it is preferred to use a second dye in conjunction with the indole dye that has a principal absorption in a second and at least partially different predetermined wavelength range such that the combination of dyes will afford protection from non-selective incident actinic radiation over the range of 400 to 700 nm. The second dye employed may be non-color-changing but preferably, is also pH sensitive, i.e., has reversibly alterable spectral absorption characteristics in response to changes in the environmental pH so that it may be rendered light-absorbing or non-light-absorbing as desired. Illustrative of such dyes are phthaleins derived from phenols, such as, thymol phthalein. The second dye also may be initially present in the film unit or in the processing composition as discussed above either together with or separate from the indole dye, and subsequent to processing may be removed from the film unit or retained within the film structure, provided it is in a form or position such that it does not interfere with viewing of the image produced.

As noted above, in its preferred embodiments, the present invention is concerned with composite diffusion transfer photosensitive elements including a film pack or roll wherein superposed photosensitive and image-receiving elements are maintained as a laminate after formation of the final image. Such elements include at least one transparent support to allow viewing of the final image without destroying the structural integrity of the film unit. Preferably, the support carrying the photosensitive layer(s) is opaque and the support carrying the image-receiving layer is transparent and selective photoexposure of the photosensitive layer(s) and viewing of the final image both are effected through the latter support. The final image is viewed as a reflection print. i.e., by reflected light, provided by a reflecting agent initially disposed in the processing composition applied and maintained intermediate the image-receiving and next adjacent photosensitive layer or by a preformed layer of reflecting agent initially positioned intermediate the image-receiving and next adjacent photosensitive layer. It will be understood that a preformed reflecting layer, while it should be capable of masking the photosensitive layer(s) subsequent to image formation, should not interfere with selective photoexposure of the photosensitive material prior to processing.

When utilizing reflection-type composite film units, the indicator dye or dyes employed as the optical filter agent(s) may be positioned initially in a layer of the film unit, e.g., in a layer between the image-receiving and next adjacent photosensitive layer through which photoexposure is effected provided it is incorporated under conditions, i.e., at a pH such that it will not absorb actinic radiation intended to selectively expose the photosensitive material to form a latent image therein. For example, the optical filter agent may be in a layer coated over either the image-receiving layer or the next adjacent photosensitive layer and should remain substantially non-light-absorbing until a processing composition is applied providing a pH at which the indicator dye is capable of being rapidly converted to its light-absorbing form to provide light protection when the film unit is removed from the camera. Rather than being initially disposed in the film unit, the indicator dye may be initially present in the processing composition applied intermediate the image-receiving and next adjacent photosensitive layer subsequent to photoexposure. The dye, when initially disposed in the processing composition, will be in its light-absorbing form.

If the indicator dye should be in its colored form at the completion of processing, it should not be present in the image-receiving layer or in any other layer where it would interfere with viewing of the transfer image through the transparent support. This result may be achieved in various ways. An indicator dye which is substantially non-diffusible in the processing composition may be initially disposed in a layer over the first photosensitive layer upon which light is incident, or a diffusible indicator dye capable of being mordanted to or over said first photosensitive layer may be applied with the processing composition. The layer of reflecting agent, either preformed or applied as a component of the processing composition, should be positioned so as to mask the layer of indicator dye over the photosensitive layer and at the same time provide a background for viewing the final image through the transparent receiving element. Where the optical filter agent is to be hidden from view by mordanting, the indicator dye selected should preferentially mordant to the photosensitive layer and not to any of the layers intermediate the light-reflecting layer and transparent support.

By "hiding" the optical filter agent behind the reflecting layer, greater latitude may be achieved in the selection of the indicator dye. For example, dyes may be employed that are not substantially colorless at the pH attained after processing, or dyes may be employed that change from colored to colorless more slowly than is desirable to permit early viewing of the final image. Preferably, however, the indicator dye(s) selected for use in composite photosensitive elements is one that is readily converted to its non-light-absorbing form subsequent to substantial image formation as the pH of the film unit is adjusted to the final value desired for stabilizing the photographic system. Since the filter agent is rendered substantially non-light-absorbing in the visible spectrum, its final position in the film unit does not have to be behind the reflecting layer. It may be in front of the reflecting layer and/or in the reflecting layer itself, provided that if the indicator dye is associated with the final image, it will not have an adverse effect on the stability of the image.

For use in diffusion transfer processes including those utilizing composite photosensitive elements and in other photographic processes employing highly alkaline processing solutions, it is desirable that the indicator dye selected as the optical filter agent possess a relatively high pKa so that the dye will be in a light-absorbing form during the initial stages of processing and yet may be rendered substantially non-light absorbing within a relatively brief interval as the pH subsequent to substantialimage formation is reduced. By pKa is meant the pH at which about 50% of the dye is present in its light-absorbing form and about 50% is present in its non-light-absorbing form.

In accordance with the present invention, novel indicator dyes are provided which possess a relatively high pKa rendering them especially useful in photographic processes, such as diffusion transfer processes, conducted at relatively high pH. Such dyes may be represented by the formula:

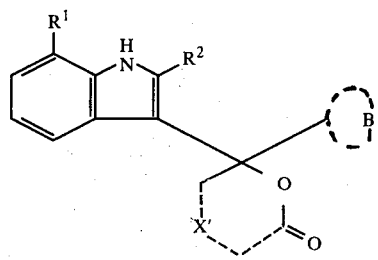
(III)

wherein one of $R^1$ and $R^2$ is a hydrogen-bonding group and the other is hydrogen; B is an indol-3-yl radical; and X' represents the carbon atoms necessary to complete a ring-closing moiety selected from phthalide and naphthalide.

In the above formula, any hydrogen-bonding group may be used that is capable of raising the pKa. The association of two atoms through hydrogen to form a hydrogen bond between or within molecules is well known. When hydrogen is attached to an electronegative atom, for example, O or N, the resultant bond is polarized. If directed toward another atom (M) with an unshared pair of electrons, the hydrogen acts as a bridge between the atoms (O—H···M) due to the electrostatic attraction to both atoms between which the hydrogen proton can be transferred. In the above compounds, an intramolecular hydrogen bond is formed between the —NH— of the indole ring and an adjacent hydrogen-bonding group, i.e., a group containing a heteroatom possessing an active unshared pair of electrons, such as, O, N, S or halogen, e.g., F., which has a free electron pair or a negative charge in basic solution and which is capable of forming a 5-, 6- or 7-membered and preferably a 5- or 6-membered hydrogen-bonded ring with the —NH— of the indole ring. Groups containing a free electron pair include, for example, alkoxy; acyl and its derivatives

wherein R may be hydrogen, alkyl, aryl, alkaryl); and amido

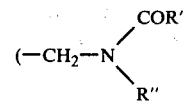

wherein R' and R" each may be alkyl, aryl, alkaryl). Preferably, the heteroatom in the hydrogen-bonding group has attached to it a proton which is more acidic than the proton on the —NH— of the indole and ionizes in basic solution to a negative charge. Such groups include, for example, carboxy; hydroxy; o-hydroxyphenyl, unsubstituted or substituted in one of the 4- or 5-positions with alkoxy containing 1 to 12 carbon atoms, i.e.,

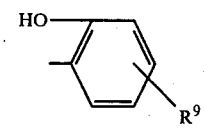

wherein $R^9$ in the 4- or 5-position is hydrogen or alkoxy containing 1 to 12 carbon atoms; bis trifluoromethyl carbinol; sulfonamido (—NH—SO$_2$—R''' wherein R''' may be alkyl, aryl, alkaryl) and sulfamoyl (—SO$_2$—N-H—R'''' wherein R'''' may be alkyl, aryl, alkaryl). Suitable R, R', R'', R''' and R'''' substituents include branched or straight chain alkyl, e.g., methyl, ethyl, isopropyl, n-butyl, t-butyl, hexyl, octyl, dodecyl, hexadecyl, octadecyl and eicosanyl; aryl, e.g., phenyl and naphthyl; aralkyl and alkaryl, e.g., benzyl, phenethyl, phenylhexyl, p-octylphenyl and p-dodecylphenyl.

Where it is desired that the indicator dye be substantially immobile or non-diffusible in the processing solution, compounds containing a sulfamoyl or sulfonamido substituent afford the distinct advantage of allowing the immobilizing function to be combined with the hydrogen bonding function by selecting sulfonamido or sulfamoyl groups containing as R''' or R'''' a substituent such as, hexadecyl or p-dodecylphenyl.

Besides possessing a relatively high pKa, the indole dyes of formula (III) in their colored form are effective absorbers of radiation in the shorter wavelength range of the visible spectrum thereby affording protection of photosensitive materials from post-exposure fogging within a predetermined wavelength range in the blue region. Also, these dyes may be readily converted to a form which does not interfere with viewing of the image and which does not detract from the brilliance, hues and other properties of the final image.

Preferred compounds within formula (III) may be represented by the formula:

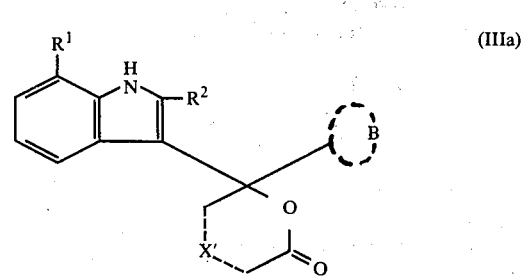
(IIIa)

wherein one of $R^1$ and $R^2$ is a hydrogen-bonding group selected from carboxy, sulfonamido, sulfamoyl and o-hydroxyphenyl, said o-hydroxyphenyl being unsubstituted or substituted in one of the 4- or 5-positions with alkoxy containing 1 to 12 carbon atoms, and the other is hydrogen; B is an indol-3-yl radical,

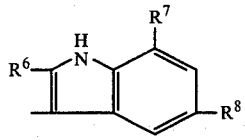

wherein $R^6$ and $R^7$ each are selected from hydrogen, methoxy, carboxy, sulfonamido, sulfamoyl and o-hydroxyphenyl, said o-hydroxyphenyl being unsubstituted or substituted in one of the 4- or 5-positions with alkoxy containing 1 to 12 carbon atoms, at least one of $R^6$ and $R^7$ being hydrogen; $R^8$ is selected from hydrogen, carboxy, cyano, halo, and alkoxy having 1 to 12 carbon atoms; and X' represents the atoms necessary to complete a ring-closing moiety selected from phthalide and naphthalide, said ring-closing moiety being unsubstituted.

As noted above, when utilized in diffusion transfer processes employing reflection-type composite photosensitive elements, the indicator dyes used as the optical filter agents may be initially disposed in a layer of the composite film unit but preferably are initially disposed in the processing composition applied subsequent to selective photoexposure of the photosensitive structure. When incorporated into the processing composition, it is desirable that the dyes selected exhibit good stability in highly alkaline media in addition to effective absorption in the visible spectrum and a high pKa. Also, the dyes employed as optical filter agents are preferably substantially non-diffusible in the alkaline processing composition in order to achieve optimum efficiency as a radiation filter and to prevent diffusion of filter agent into layers of the film unit where its presence may be undesirable.

Indicator dyes which possess these preferred characteristics in combination are those represented in Formulae (IV) below. These indicator dyes possess the desired unique combination of properties, namely, (1) efficient absorption of actinic radiation within the wavelength range of about 400 nm. to 550 nm., (2) a high pKa of 11 or more, (3) stability in highly alkaline media, and optionally, (4) non-diffusibility in aqueous alkali.

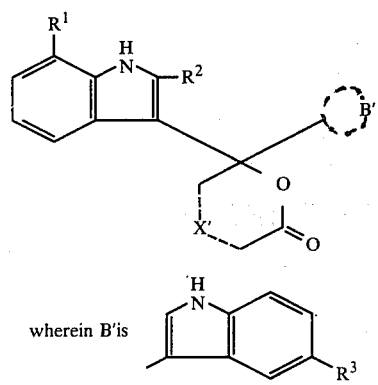

wherein $R^3$ is an electron-withdrawing group or

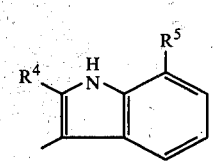

wherein one of $R^4$ and $R^5$ is a hydrogen-bonding group having a negative charge in basic solution and the other is hydrogen; and $R^1$, $R^2$ and X' have the same meaning as in Formula (III).

In Formula (IV), the hydrogen-bonding groups $R^1$ and $R^2$ may be any of those enumerated above but preferably, are among those having a negative charge in basic solution, particularly, carboxy, ortho-hydroxyphenyl, sulfonamido and sulfamoyl. The group $R^3$ may be any electron withdrawing group, i.e., any group with a positive sigma value as defined by Hammett's Equation. Such groups are well known in the art and include, for example, carboxy; cyano; trifluoromethyl; sulfonyl ($-SO_2-R^v$ wherein $R^v$ may be alkyl, aryl, alkaryl); and acyl and its derivatives.

As in Formulae (I) and (II), the dyes represented in Formulae (III) and (IV) may contain additional substituents, as desired, which do not interfere with its photographic function as an optical filter agent such as solubilizing group(s), e.g., carboxyl and sulfo groups and immobilizing group(s), e.g., long chain alkyl groups or other bulky group either cyclic or acyclic which render the indicator dye substantially non-diffusing in the processing composition. In Formulae (III) and (IV) such substituents may be substituted on the first and/or second indole radical and/or the ring-closing group and will be substituted on the carbon atoms of the indole radicals. As noted previously, rather than using a separate immobilizing group, such as the long chain 5-alkoxy, the immobilizing function may be combined with the hydrogen-bonding function by selecting sulfonamido or sulfamoyl groups containing as $R'''$ or $R''''$, a substituent such as, hexadecyl or p-dodecylphenyl. Among the compounds of Formula (IV) which are especially useful as optical filter agents to be incorporated into highly alkaline processing media are those containing a 2-ortho-hydroxyphenyl-indol-3-yl radical and a second indol-3-yl radical substituted in the 7-position with, for example, carboxy, sulfonamido or sulfamoyl or a second indol-3-yl radical substituted in the 5-position with, for example, carboxy or cyano. Other such compounds are those containing a 7-carboxyindol-3-yl radical and a second indol-3-yl radical substituted in the 7-position with, for example, sulfonamido or sulfamoyl.

Preferred compounds within formula (IV) may be represented by the following formulae (IVa) and (IVb):

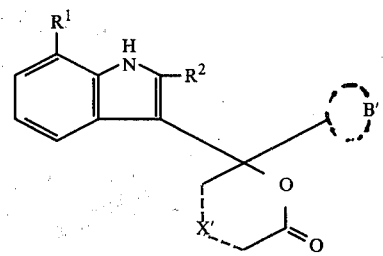

wherein one of $R^1$ and $R^2$ is hydrogen and the other is a group containing a heteroatom possessing an active unshared pair of electrons selected from O, N, and S, said heteroatom possessing a proton more acidic than the proton of the —NH— of the indole ring and ionizing to a negative charge in basic solution to form an intramolecular hydrogen bond with said —NH—, said group forming a 5-, 6- or 7-membered intramolecular hydrogen-bonded ring with said —NH—; B' is an indol-3-yl radical selected from (1)

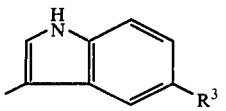

wherein $R^3$ is a group having a positive sigma value as defined by Hammett's Equation and (2)

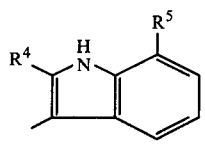

wherein one of $R^4$ and $R^5$ is hydrogen and the other is a group containing a heteroatom possessing an active unshared pair of electrons selected from O, N, and S, said heteroatom possessing a proton more acidic than the proton of the —NH— of the indole ring and ionizing to a negative charge in basic solution to form an intramolecular hydrogen bond with said —NH—, said group forming a 5-, 6- or 7-membered intramolecular hydrogen-bonded ring with said —NH—; and X' represents the atoms necessary to complete a ring-closing moiety selected from phthalide and naphthalide, said ring-closing moiety being unsubstituted.

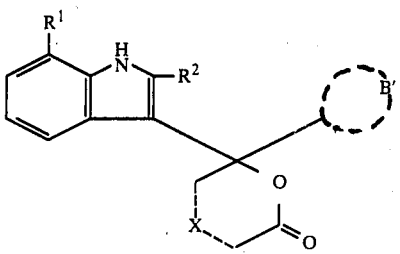

(IVb)

wherein one of $R^1$ and $R^2$ is a hydrogen-bonding group selected from carboxy, sulfonamido, sulfamoyl and o-hydroxyphenyl, said o-hydroxyphenyl being unsubstituted or substituted in one of the 4- or 5-positions with alkoxy containing 1 to 12 carbon atoms and the other is hydrogen; B' is a radical selected from (1)

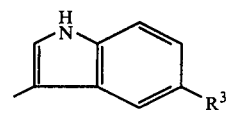

wherein $R^3$ is an electron-withdrawing group selected from carboxy and cyano and (2)

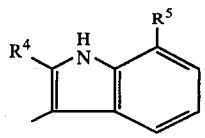

wherein one of $R^4$ and $R^5$ is a hydrogen-bonding group selected from carboxy, sulfonamido, sulfamoyl and o-hydroxyphenyl, said o-hydroxyphenyl being unsubstituted or substituted in one of the 4- or 5-positions with alkoxy containing 1 to 12 carbon atoms, and the other is hydrogen; and X' represents the atoms necessary to complete a ring-closing moiety selected from phthalide and naphthalide, said ring-closing moiety being unsubstituted.

Specific examples of indicator dyes useful as optical filter agents in accordance with the present invention include the following wherein the dyes of formulas (1) to (47) represent novel indole phthaleins of the present invention.

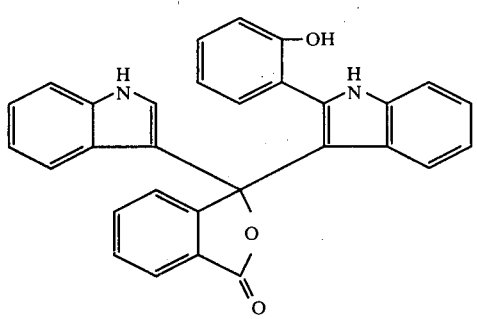

(1)

-continued
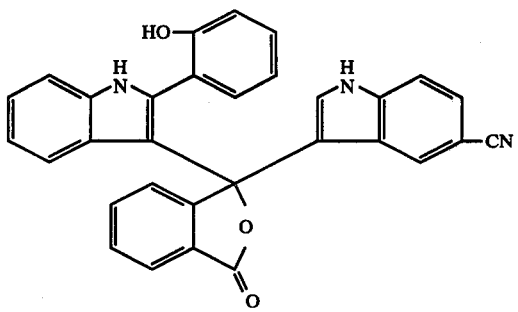
(2)
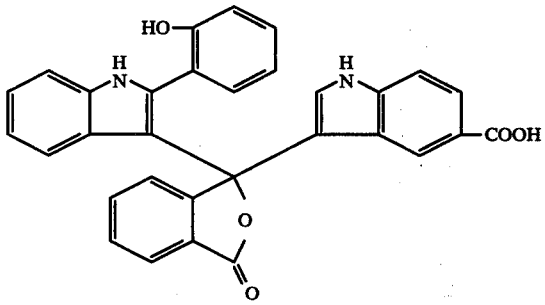
(3)
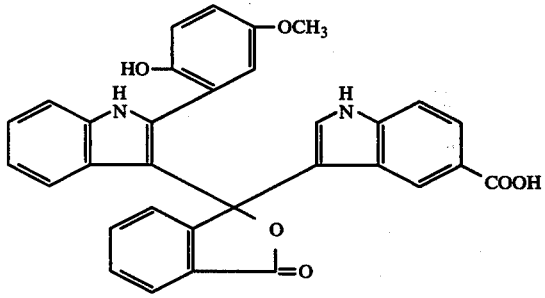
(4)
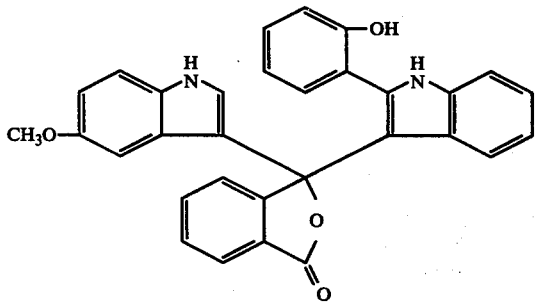
(5)
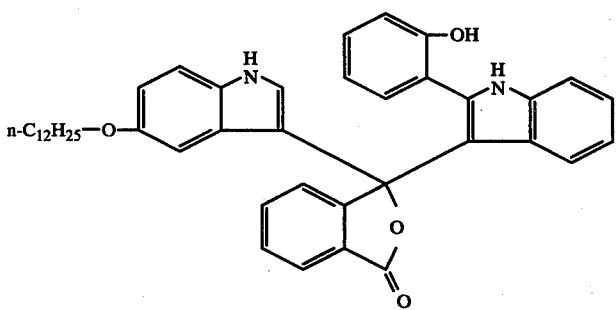
(6)

(7)
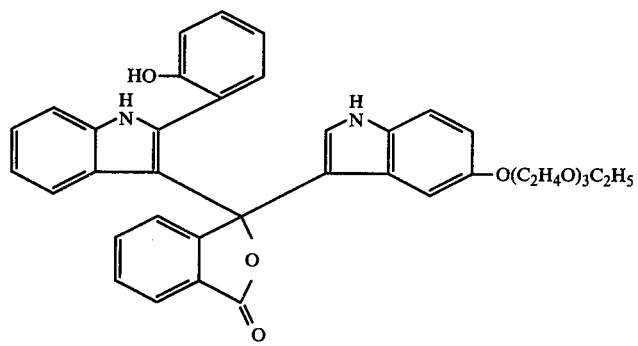
(8)
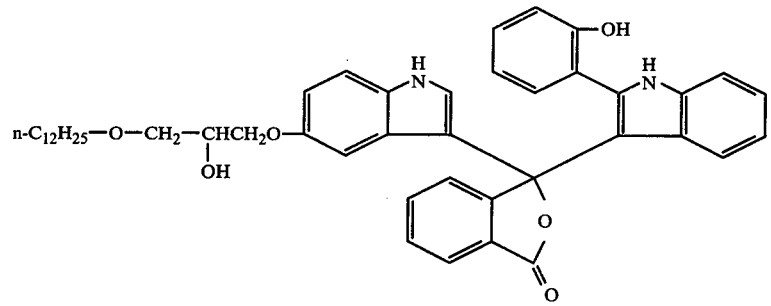
(9)
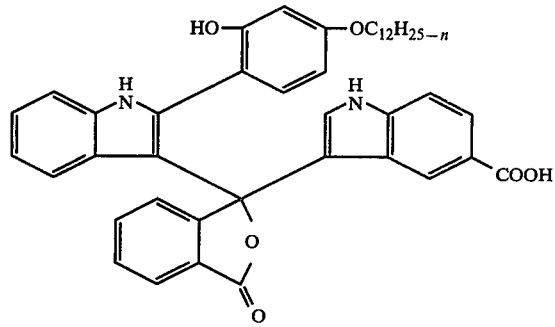
(10)
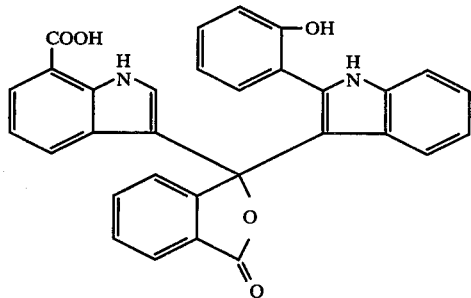
(11)
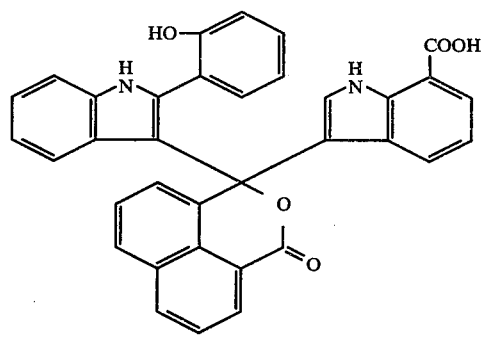

-continued
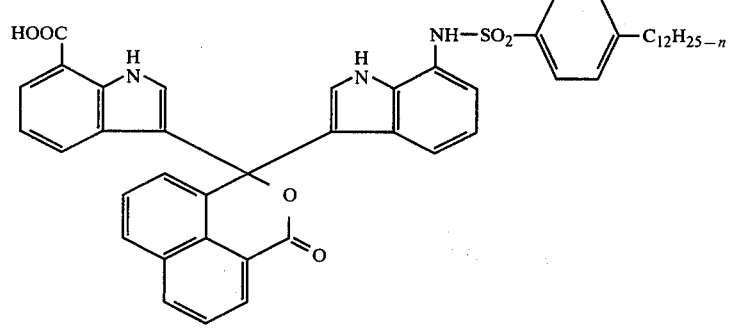
(12)
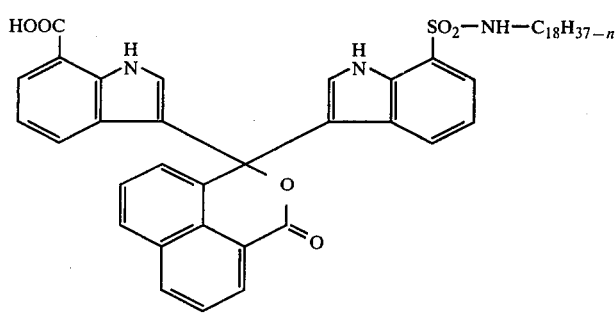
(13)
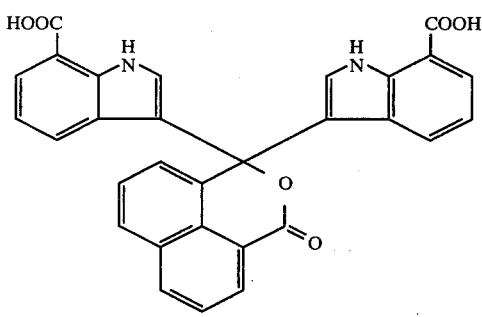
(14)
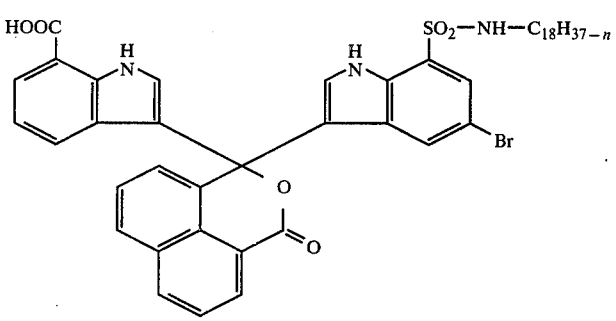
(15)
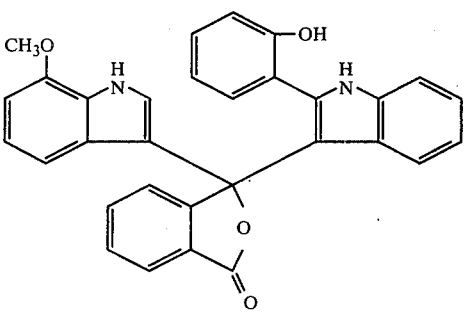
(16)

(17)
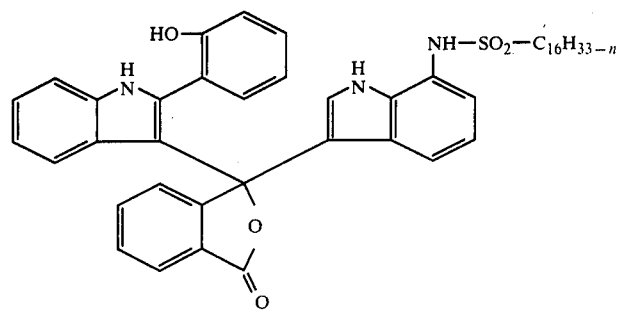
(18)
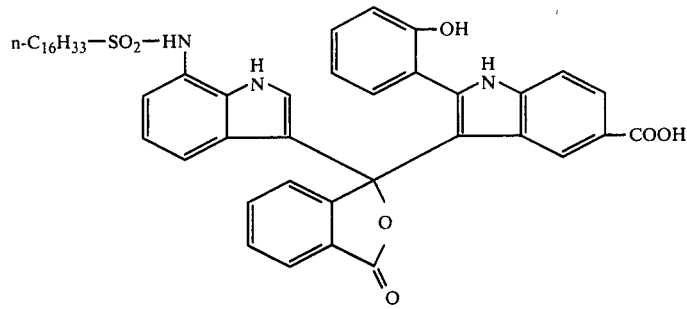
(19)
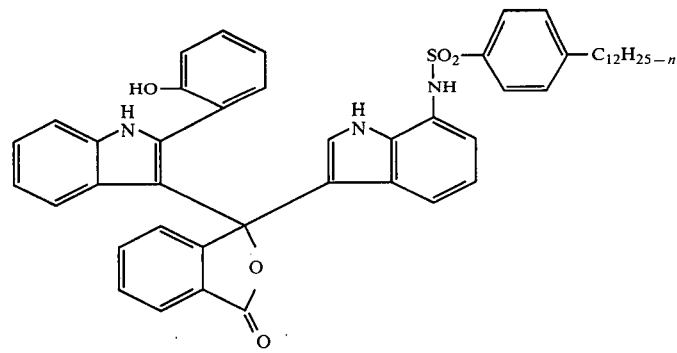
(20)
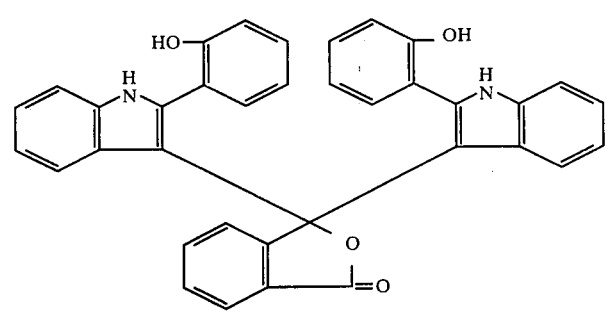
(21)
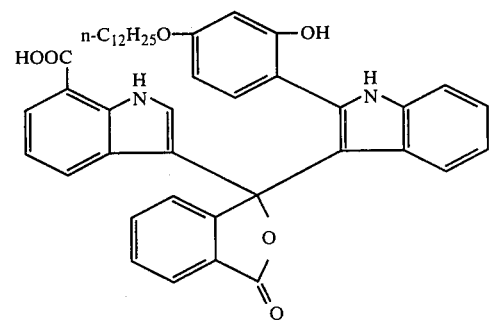

-continued
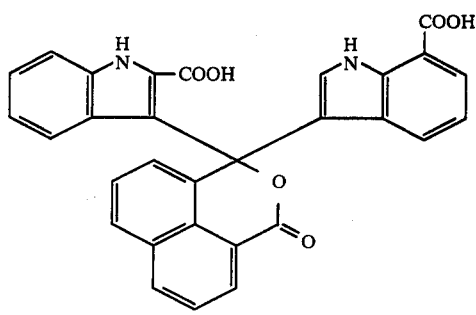
(22)
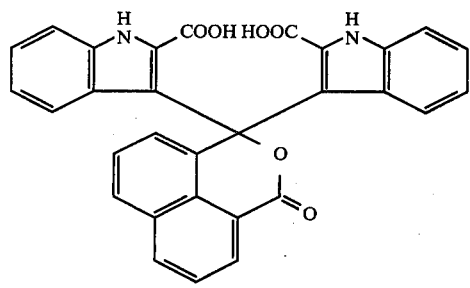
(23)
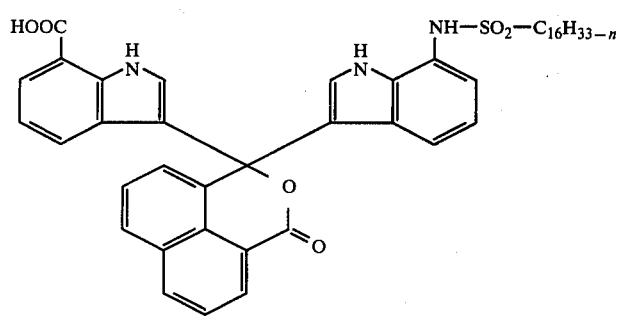
(24)
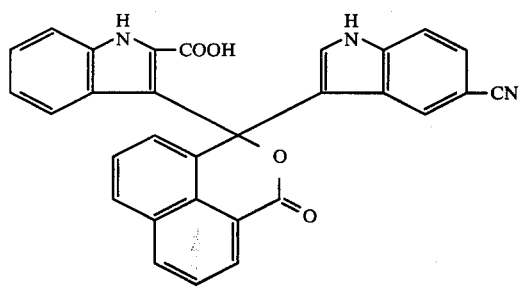
(25)
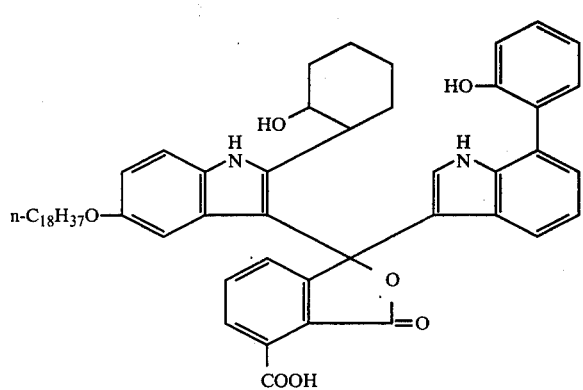
(26)

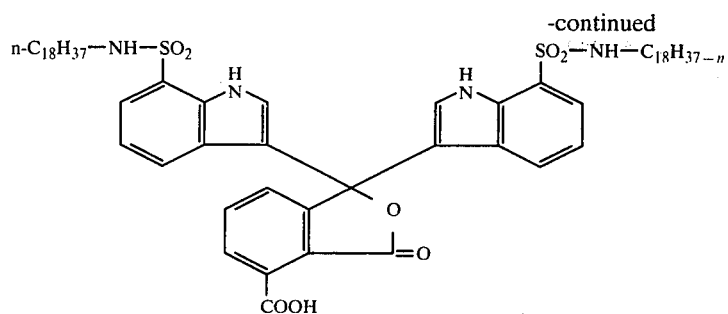(27)
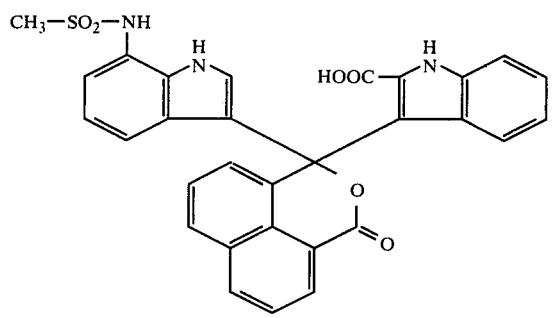(28)
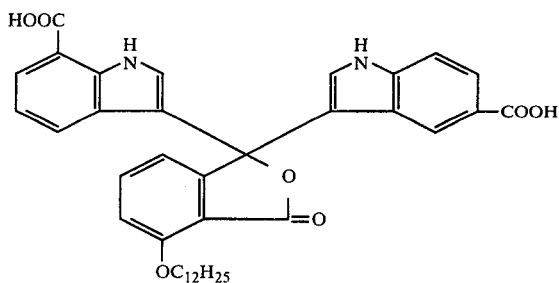(29)
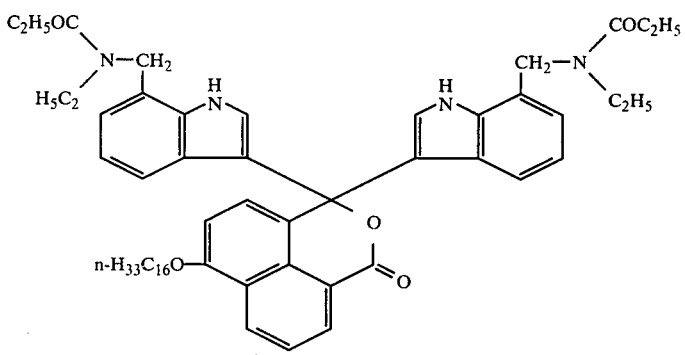(30)
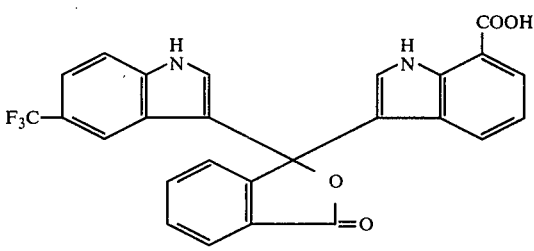(31)
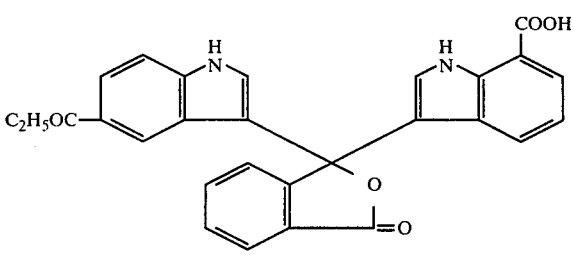(32)

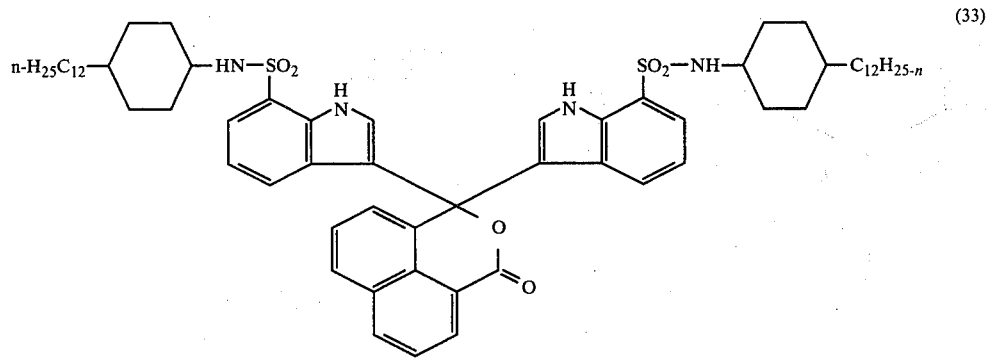
(33)
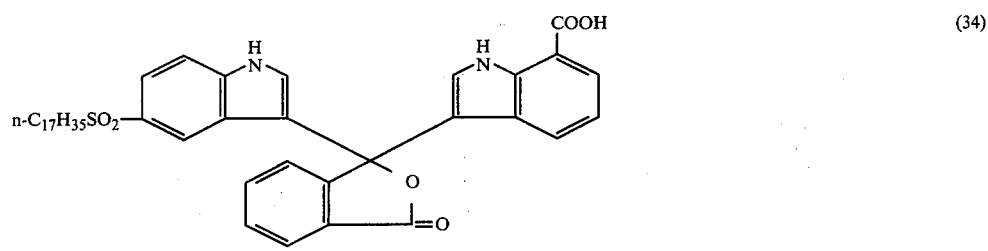
(34)
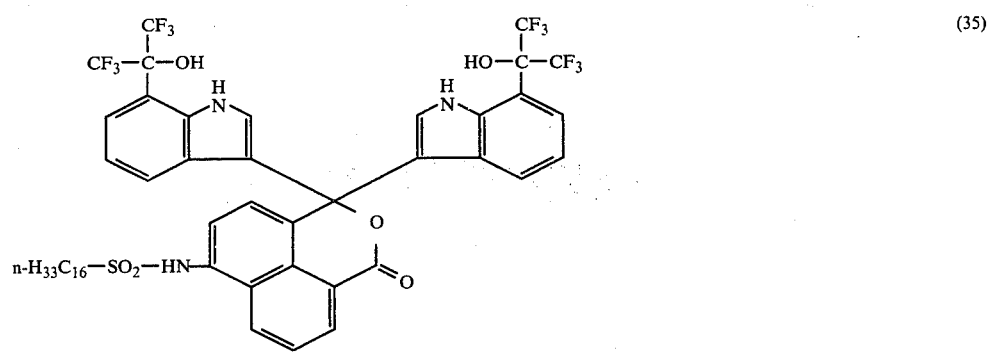
(35)
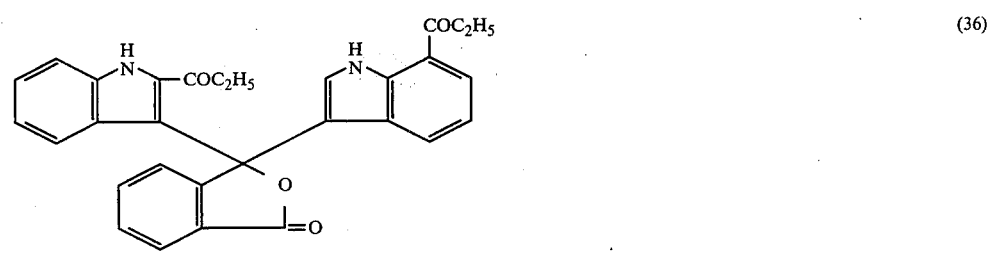
(36)
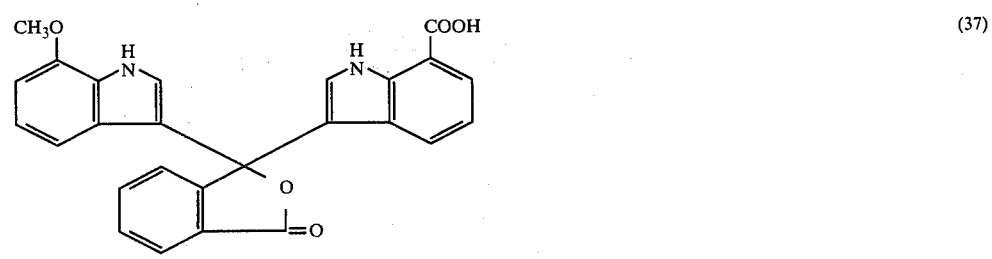
(37)
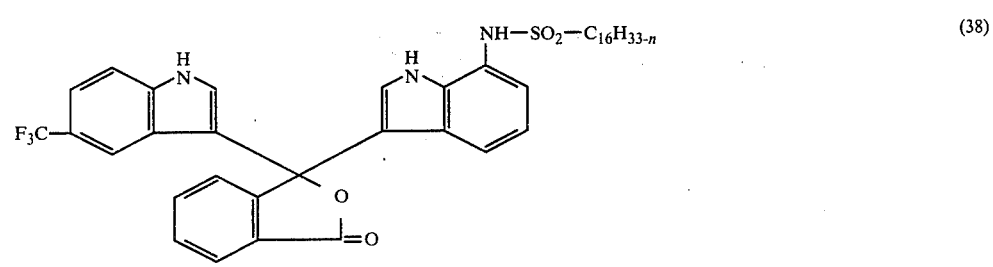
(38)

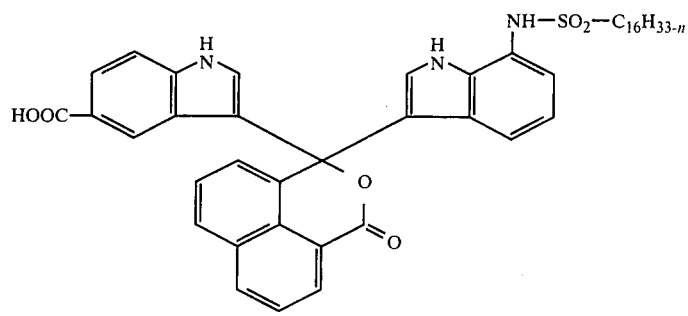
(39)
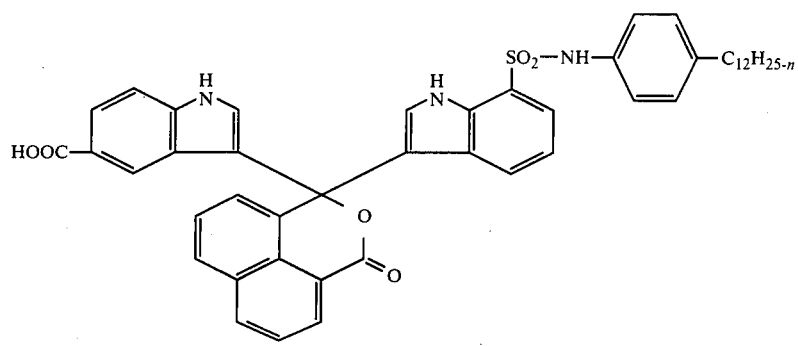
(40)
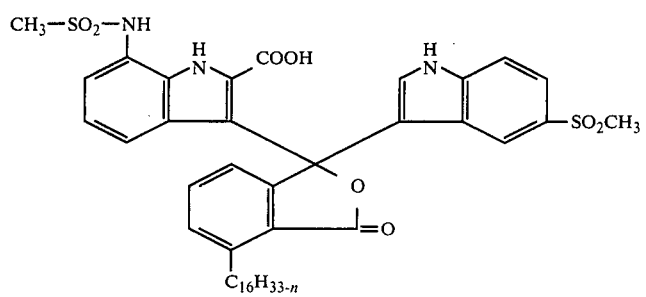
(41)
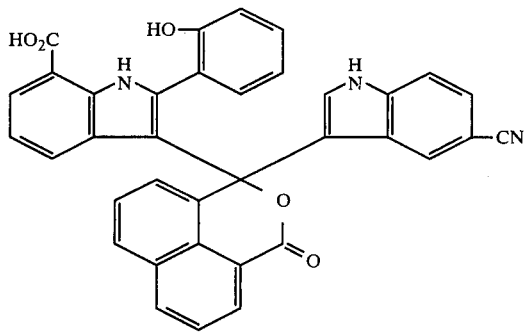
(42)
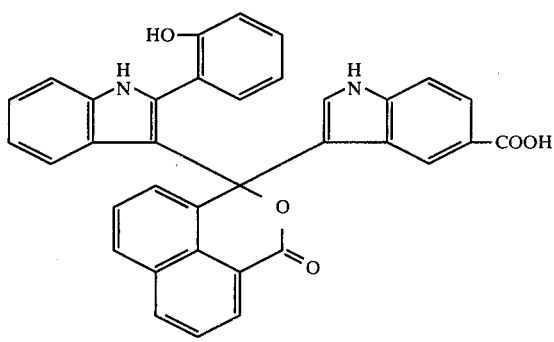
(43)

-continued
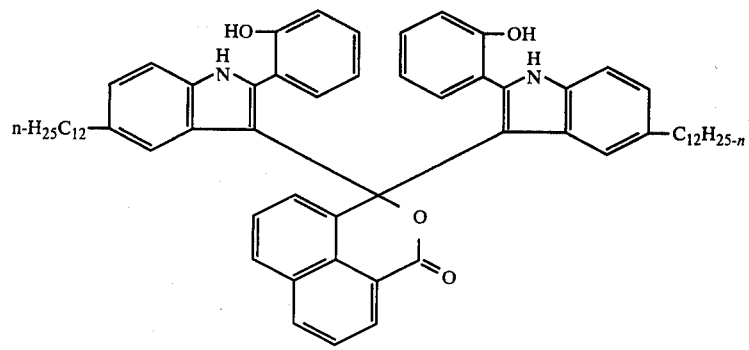 (44)
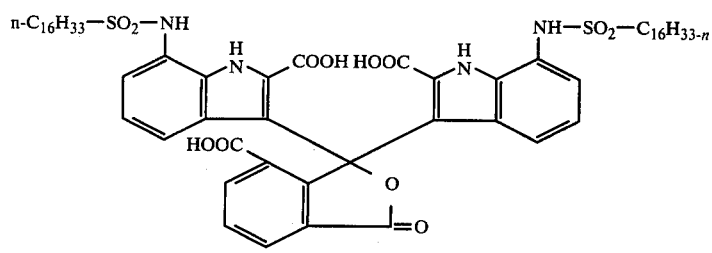 (45)
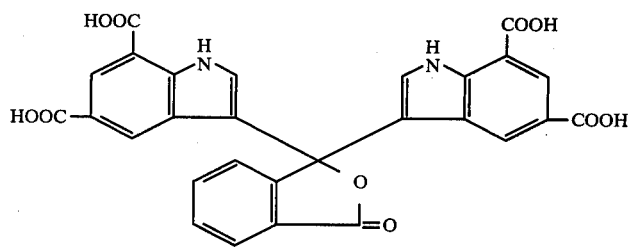 (46)
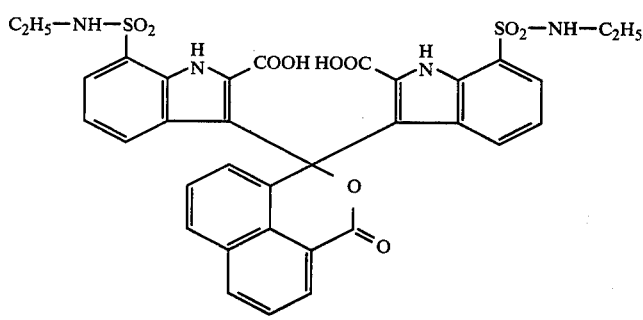 (47)
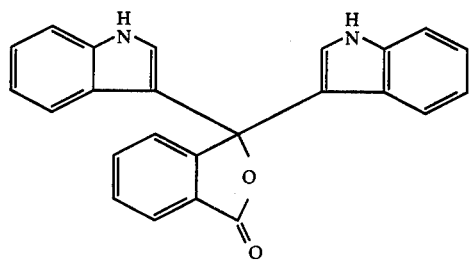 (48)
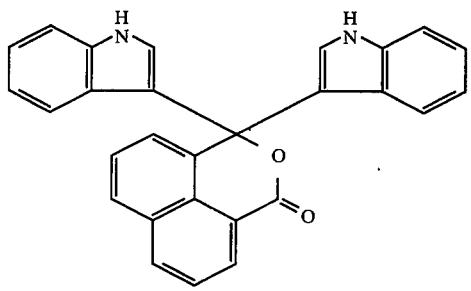 (49)

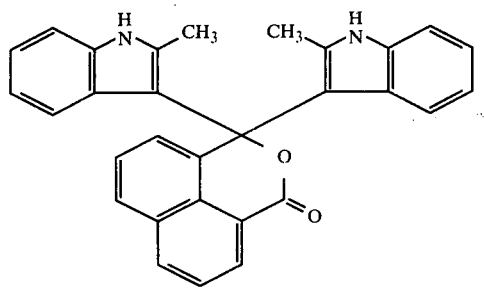
(50)
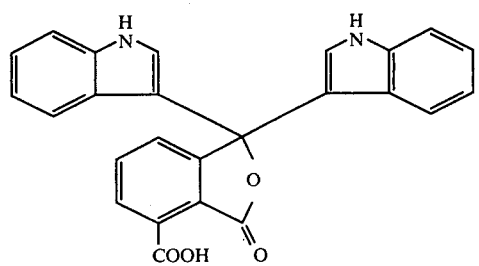
(51)
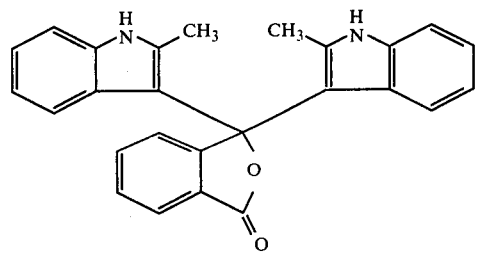
(52)
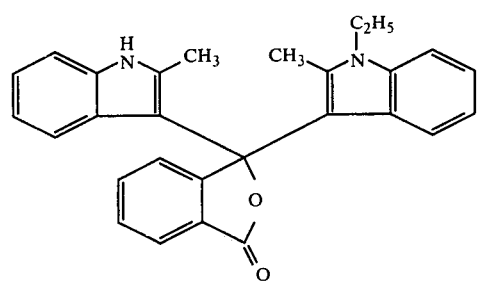
(53)
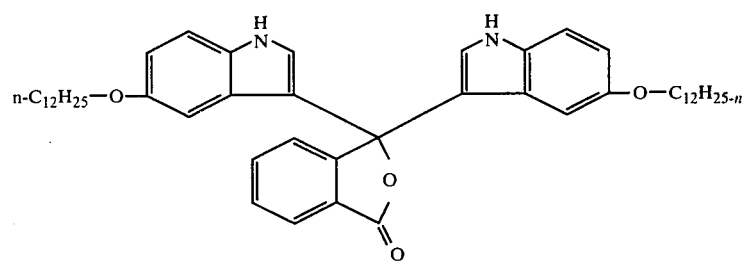
(54)
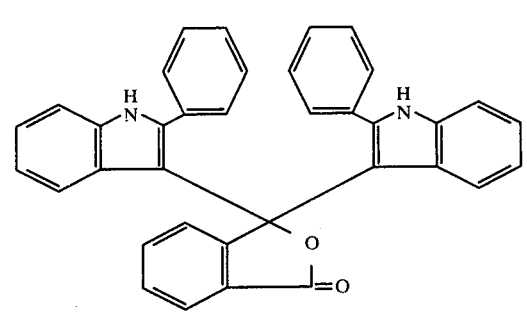
(55)

-continued
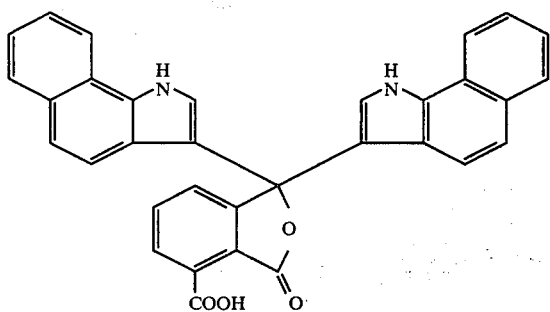
(56)
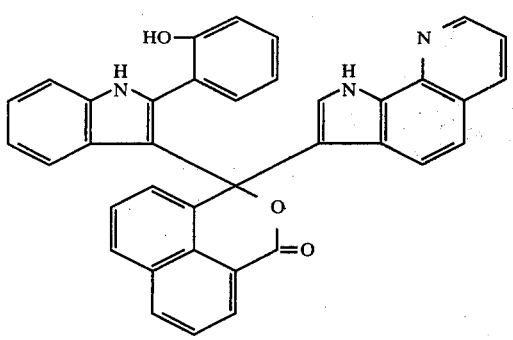
(57)
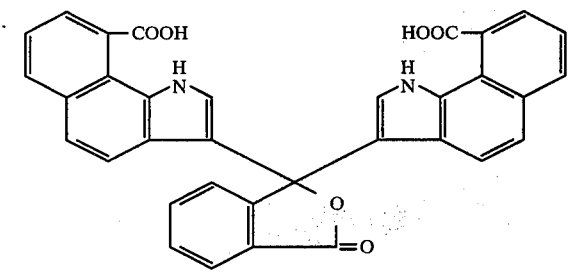
(58)
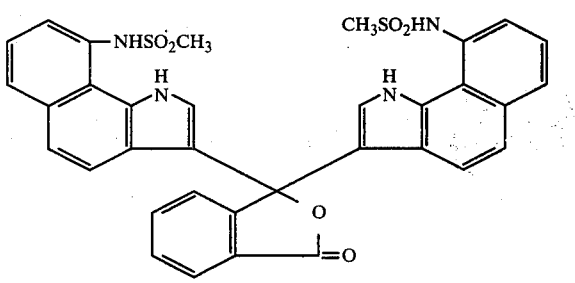
(59)
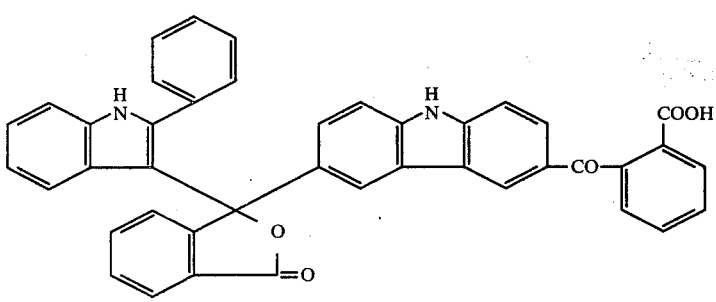
(60)

-continued
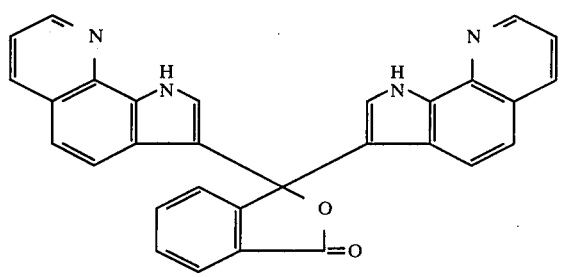
(61)
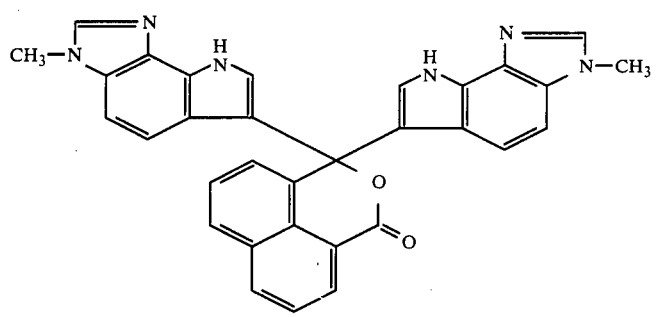
(62)
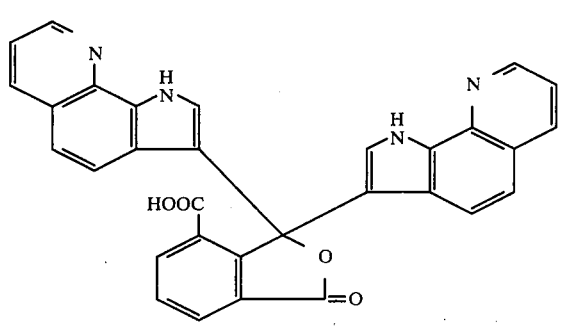
(63)
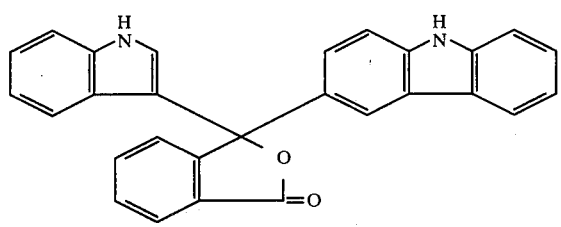
(64)
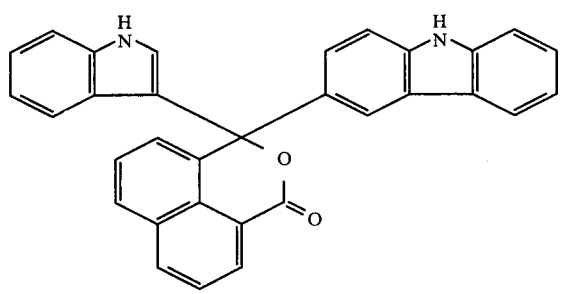
(65)

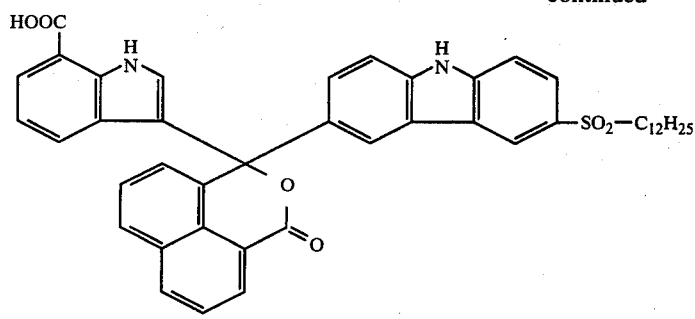
(66)
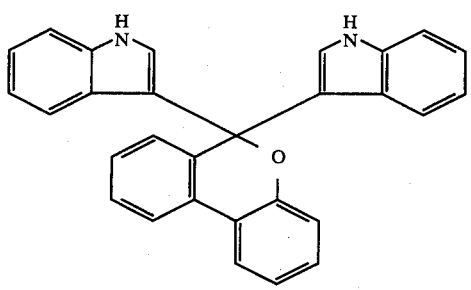
(67)
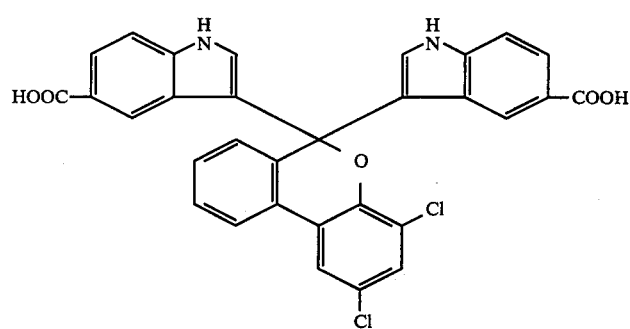
(68)
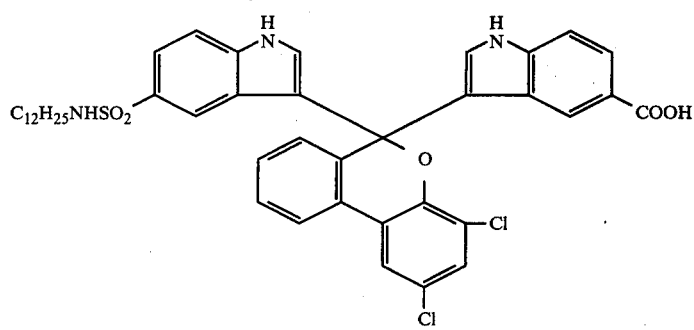
(69)
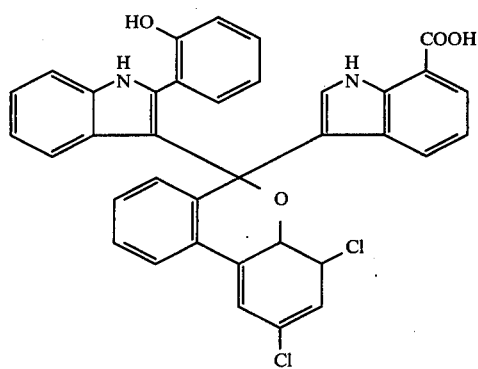
(70)

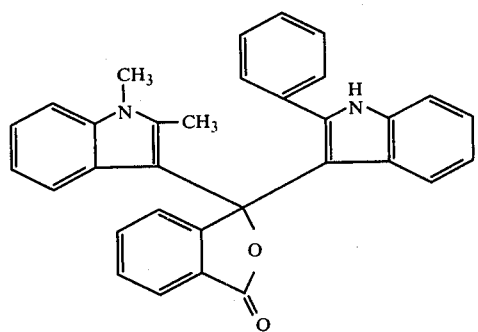
(71)
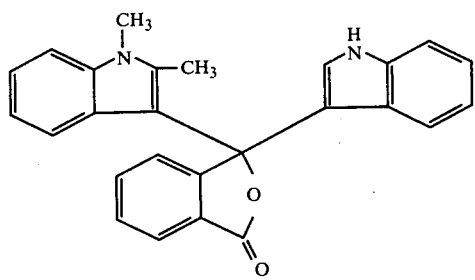
(72)
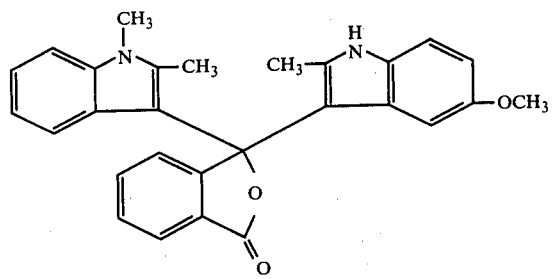
(73)
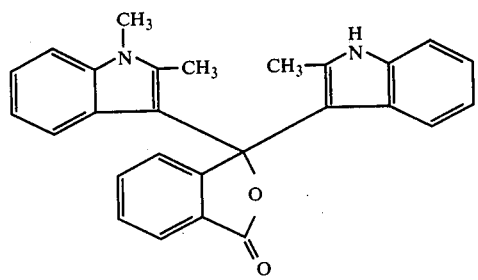
(74)
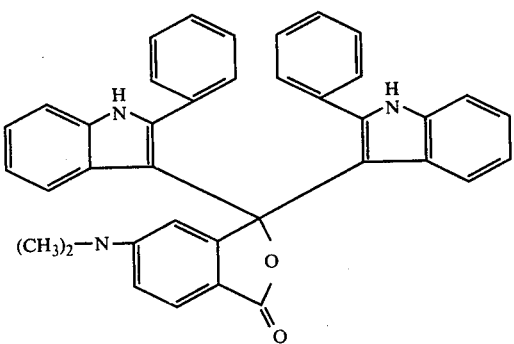
(75)

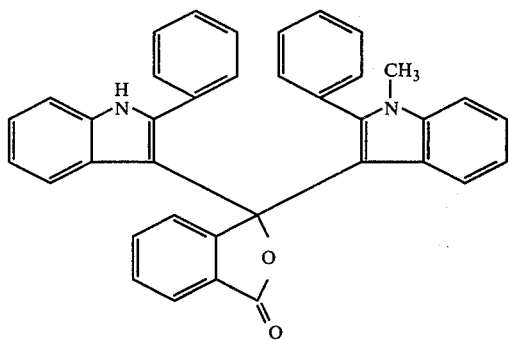
(76)
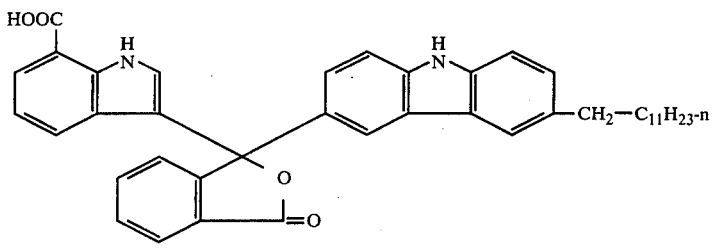
(77)
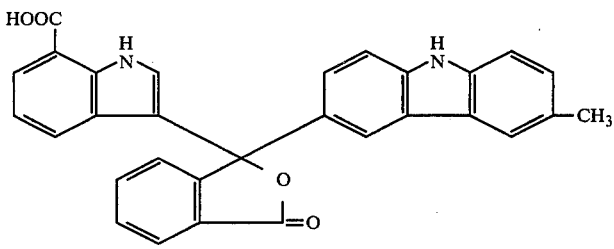
(78)
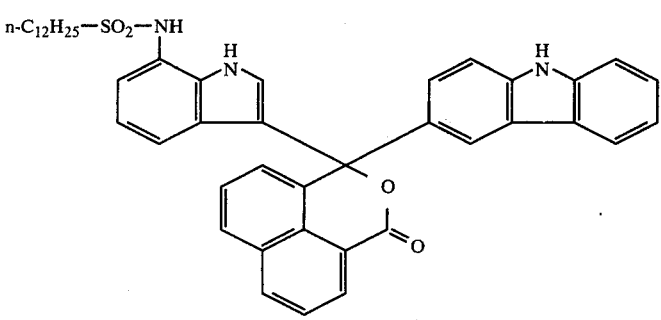
(79)
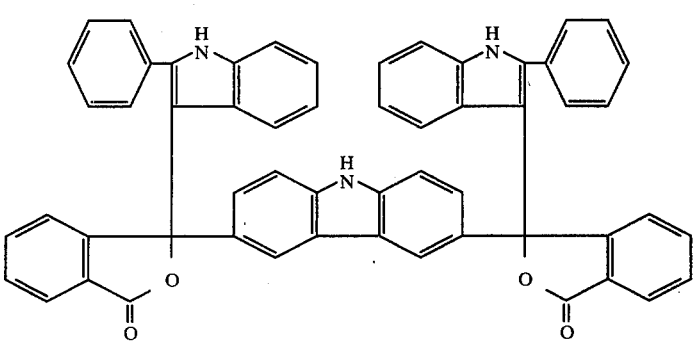
(80)

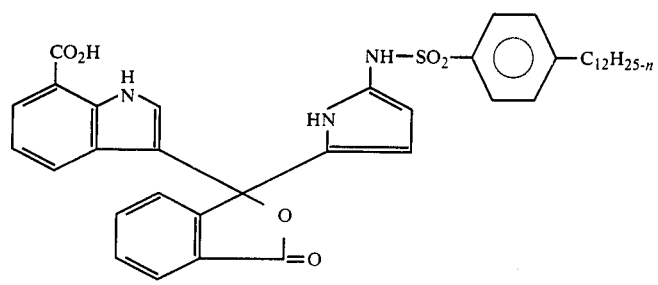
(81)
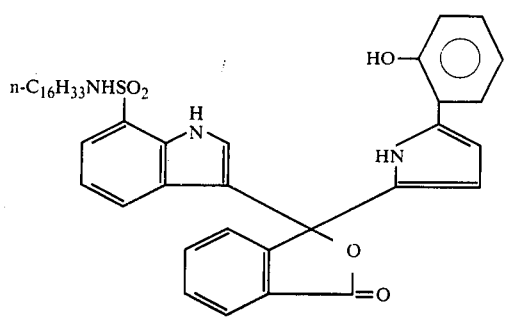
(82)
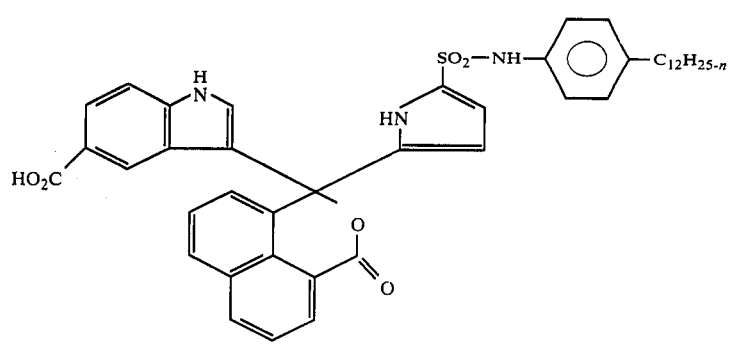
(83)
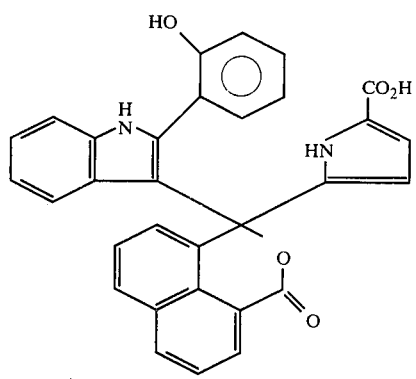
(84)
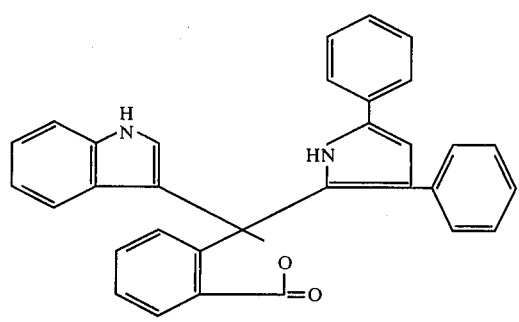
(85)

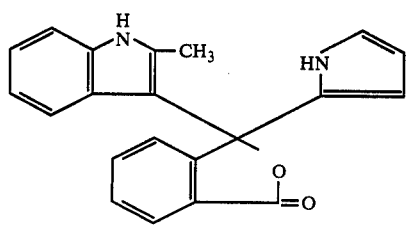
(86)
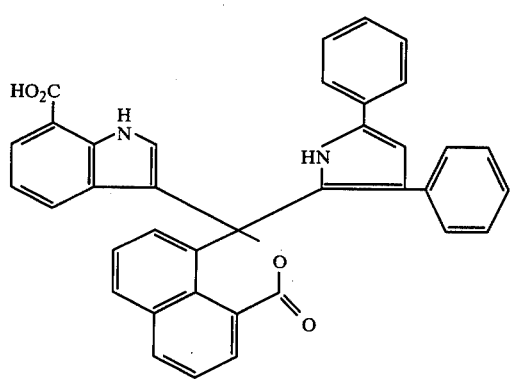
(87)
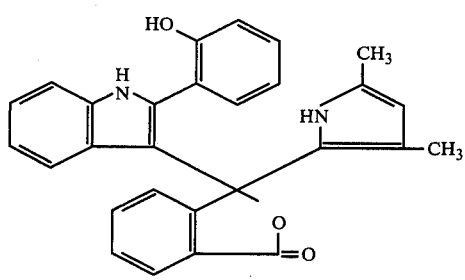
(88)
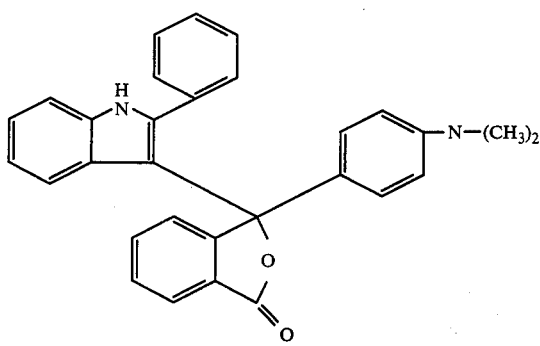
(89)
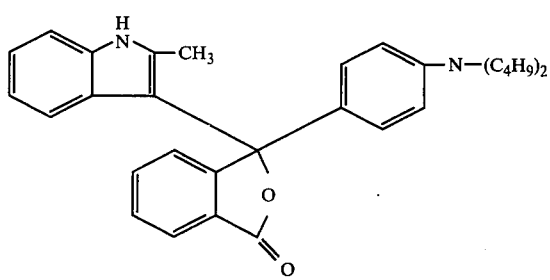
(90)

(91)
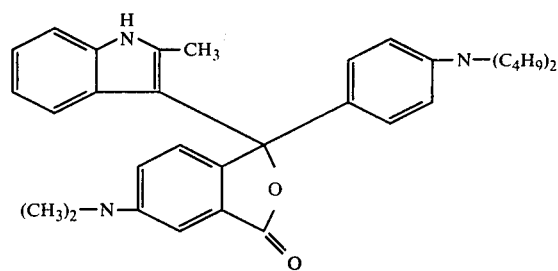
(92)
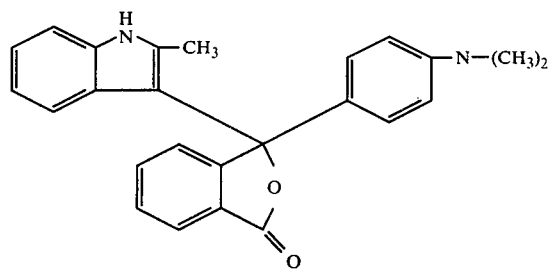
(93)
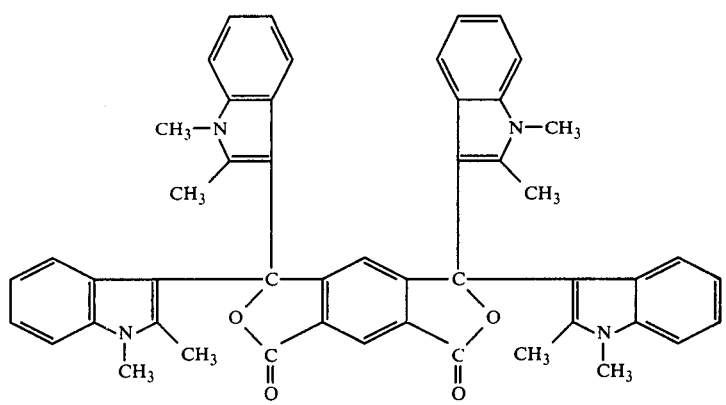
(94)
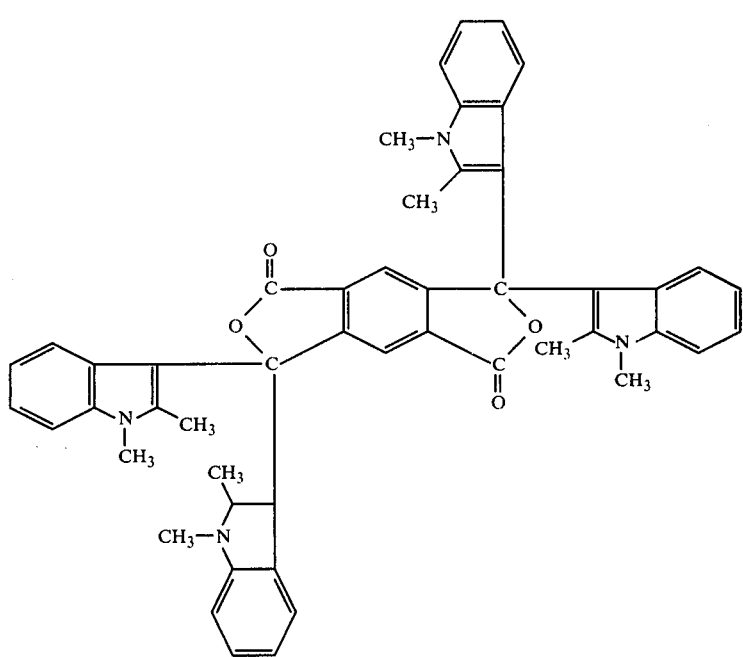

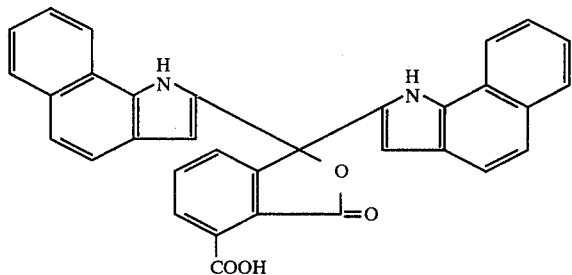
(95)
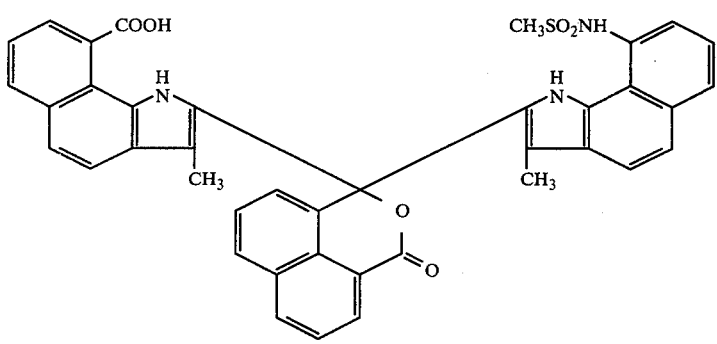
(96)
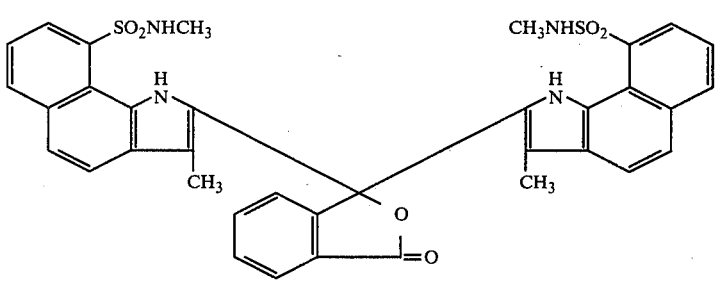
(97)
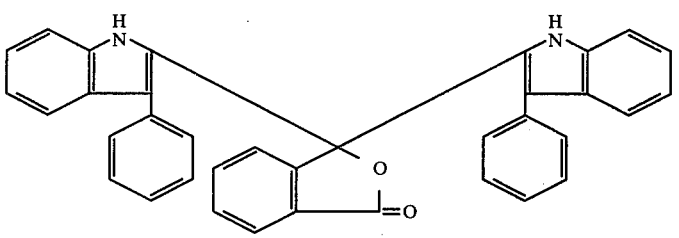
(98)
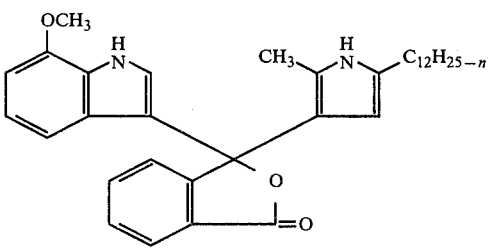
(99)
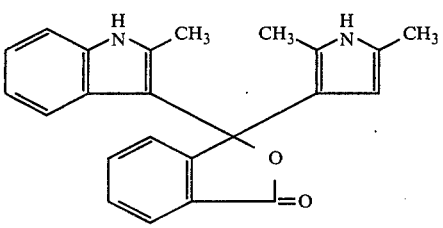
(100)

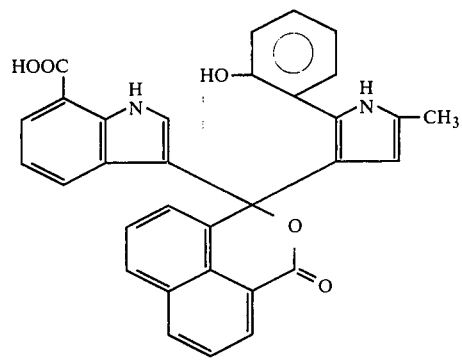
(101)
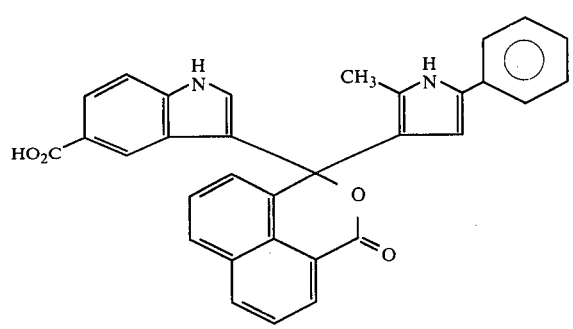
(102)
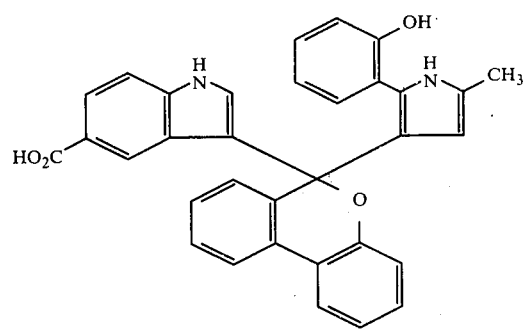
(103)
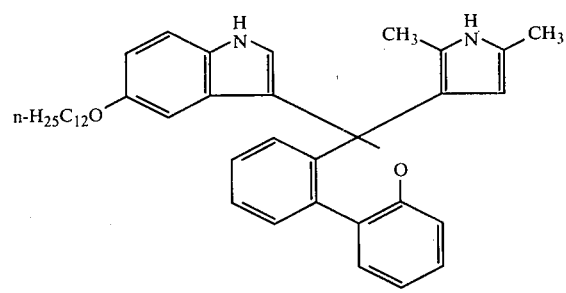
(104)

-continued
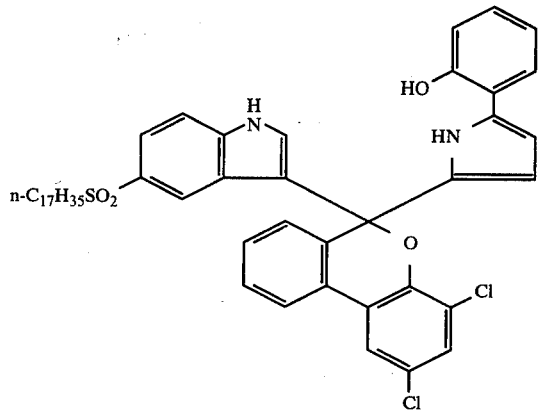
(105)
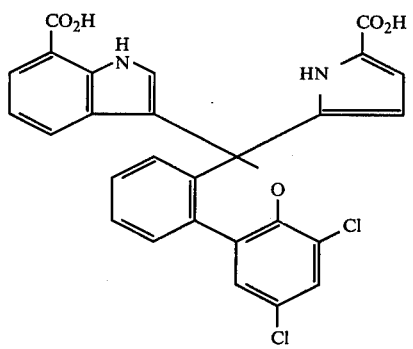
(106)
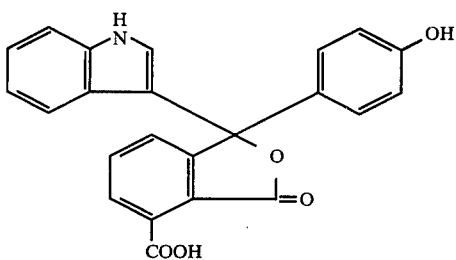
(107)
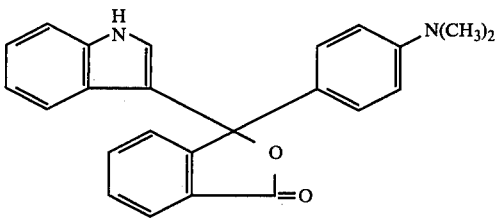
(108)
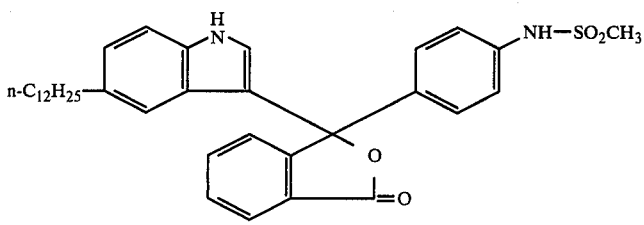
(109)
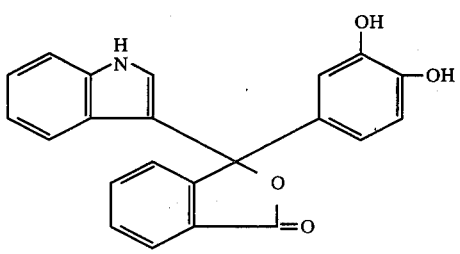
(110)

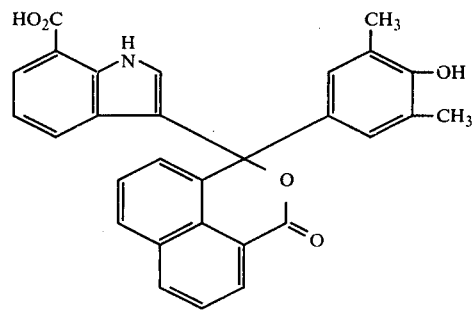
(111)
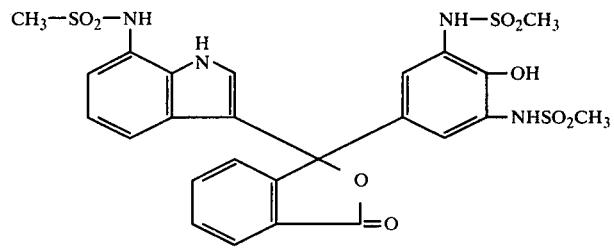
(112)
(113)
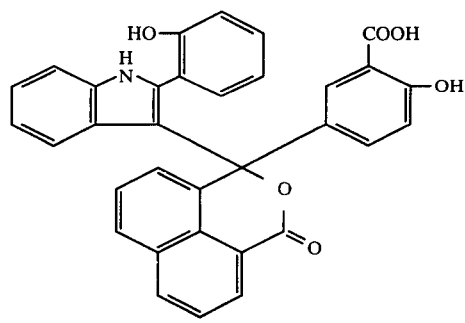
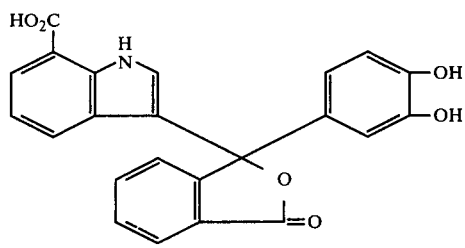
(114)
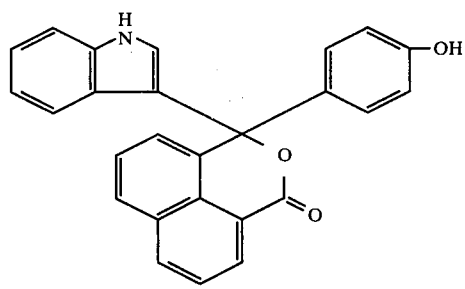
(115)
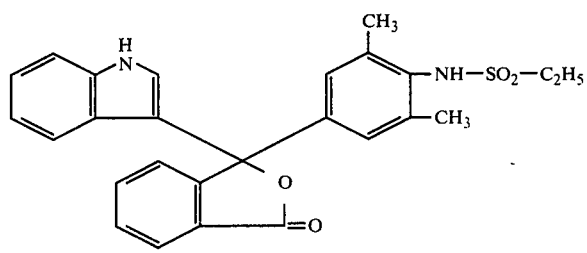
(116)

-continued
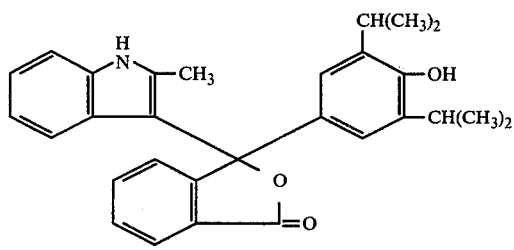 (117)
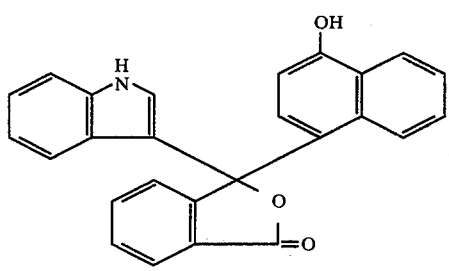 (118)
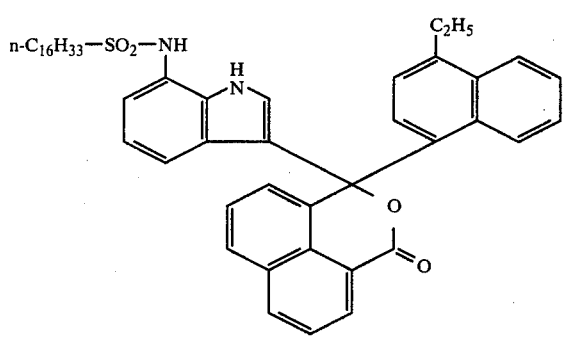 (119)
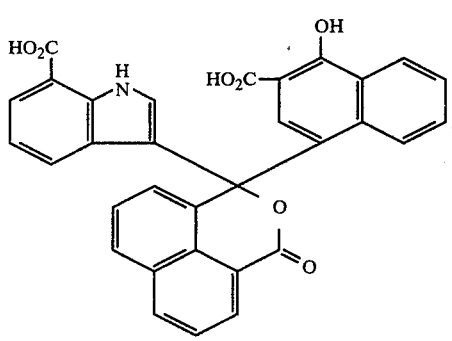 (120)
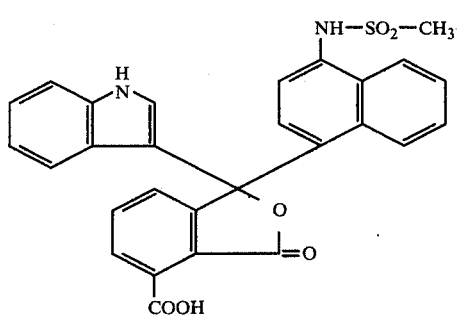 (121)

-continued
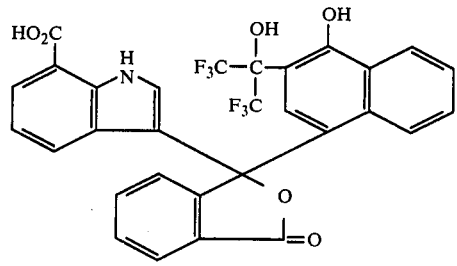
(122)
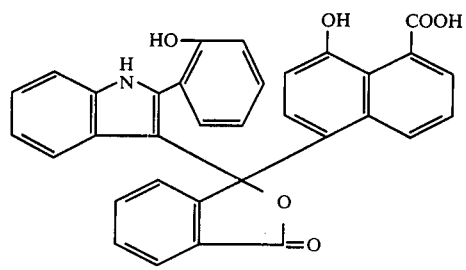
(123)
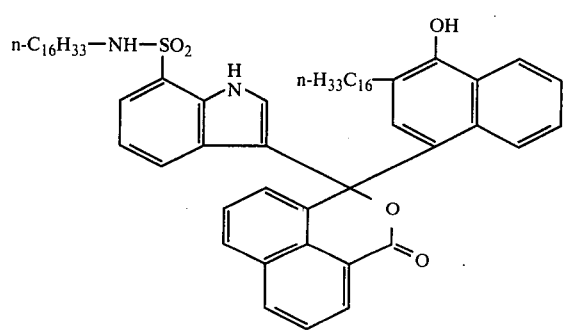
(124)
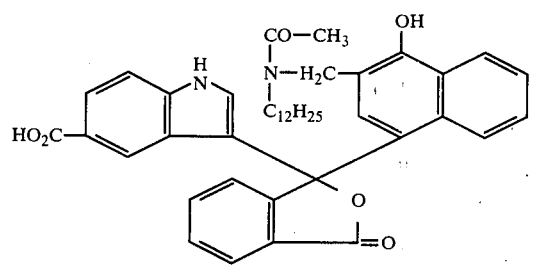
(125)
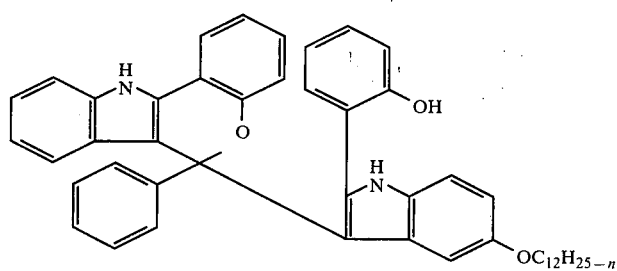
(126)
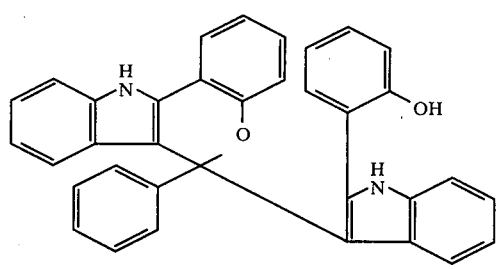
(127)

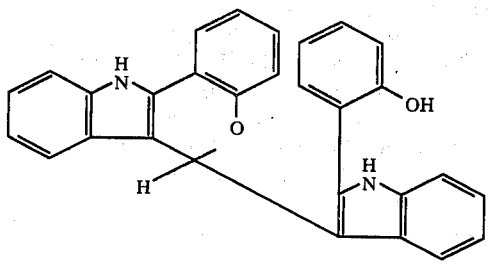

(128)

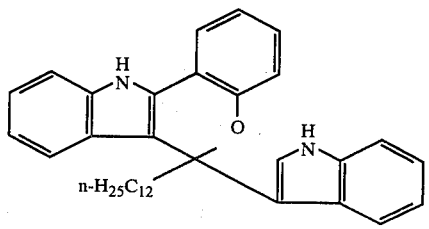

(129)

Various methods may be employed in preparing the indicator dyes described above. Phthalein dyes including phthalides and naphthalides containing an indol-3-yl radical may be prepared by reacting phthalic or naphthalic anhydride with the selected indole at elevated temperatures usually in the presence of a suitable catalyst, such as a Lewis acid catalyst. Phthalein dyes containing an indol-2-yl radical may be prepared in the same manner by using a starting indole containing blocking substituents suitably placed to direct bonding to the 2-position.

Another method that may be employed comprises reacting an indole with phthalic anhydride in the presence of a metal halide, e.g., aluminum chloride to yield a keto-acid intermediate which is subsequently reacted with a second aromatic compound, the same or different, in the presence of an acid condensing agent to yield the desired indole phthalein. Using this method both symmetrical and unsymmetrical compounds may be prepared by selecting respectively, as the second aromatic compound, an indole which is the same or an indole which is different from the starting indole initially reacted with the anhydride. Where it is desired to produce a mixed indole phthalein containing an indole radical and a second aryl radical derived from a different aromatic compound such as carbazoles or anilines, the keto-acid intermediate may be formed by reaction of the indole, carbazole or other appropriate compound with phthalic anhydride followed by condensation of the intermediate with the second aromatic compound to yield the desired mixed indole indicator dye.

A preferred method of preparing indole phthaleins comprises reacting an indole with phthalaldehydic or naphthaldehydic acid in the presence of a mild acid catalyst, e.g., toluene-p-sulfonic acid, to yield the corresponding phthalidyl- or naphthalidyl-indole intermediate which is oxidized by treating with, for example, dichlorodicyanoquinone. The oxidized intermediate is then reacted with another aromatic compound, carbocyclic or heterocyclic, in the presence of an acid catalyst to yield the desired dye. This method of preparing indole phthaleins and phthaleins derived from other selected aromatic compounds forms the subject matter of copending U.S. Patent application Ser. No. 108,662 of Alan L. Borror filed concurrently herewith, now abandoned.

The following Examples are given to further illustrate the present invention and are not intended to limit the scope thereof.

EXAMPLE 1

Preparation of the compound of formula (24)

A mixture of 6.0 g. (0.0372 mole) of 7-carboxyindole and 7.5 g. (0.0372 mole) of naphthaldehydic acid in 38 ml. of glacial acetic acid was heated to reflux and stirred mechanically. To the solution was added dropwise, 38 ml. of 12% toluene-p-sulfonic acid-acetic acid. An immediate precipitation of product began and the mixture was refluxed for five minutes. The mixture was cooled to room temperature, filtered, and the 3-naphthalidylindole intermediate washed with 50 ml. of acetic acid. The solid was then stirred in 100 ml. of acetone, filtered and dried to give 12.8 g. (86% by weight yield) of a white crystalline solid, 239°–240° C. melting range.

A mixture of 11.0 g. (0.028 mole) of the intermediate prepared above and 140 ml. of dioxane was refluxed with stirring under nitrogen. To the solution was added 7.3 g. (0.032 mole) of 2,3-dichloro-5,6-dicyano-1,4-benzoquinone and the refluxing continued for 3.5 hours. The mixture was cooled to room temperature and the pink solid comprising oxidized intermediate was collected by suction filtration. The solid was extracted twice by boiling in 125 ml. of acetone for 5 to 10 minutes. The solid was then heated in 125 ml. of ethanol and the white solid collected. Weight 7.2 g. (78% by weight yield).

A mixture of 0.40 g. (1.2 m mole) of oxidized intermediate and 0.51 g. (1.2 m mole) of 7-hexadecylsulfonamido-indole in 5 ml. of glacial acetic acid was heated to 65° C. with stirring. To the mixture was added 5 ml. of 12% toluene-p-sulfonic acid-acetic acid over a five-minute period. The solution turned an intense purple color. The heating was continued for 15 minutes at 65° C. and cooled to room temperature. The solution was poured into 20 ml. of water containing 3 ml. of concentrated ammonia. The precipitate was collected and dried. Recrystallization of 0.8 g. of this material from methanol-water gave 0.66 g. (77% by weight yield) of solid, melting range 216°–217° C.

EXAMPLE 2

The product of Example 1 was prepared in the same manner given above except that o-chloranil (0.029 mole) was substituted for dichlorodicyanoquinone as the oxidizing agent.

EXAMPLE 3

Preparation of the compound of formula (20)

A mixture of 2.0 g. of 2-(o-hydroxyphenyl) indole, 1.0 g. of 3,3-dichlorophthalide and 20 ml. of ether was heated on a steam bath until it evaporated to dryness. The dark colored residue was dissolved in dichloromethane and chromatographed on a silica gel column with slowly increasing amounts of acetone. Approximately 8% acetone eluted the product. After recrystallization from aqueous methanol and drying, a light purple material was obtained (melting range 178°–181° C.).

In addition to the above compounds, the specific indicator dyes of formulae (1) to (19) above also were prepared in accordance with the procedure of Example 1. The dye of formula (1) was prepared by reacting indole with the acid, oxidizing the intermediate thus formed and then reacting the oxidized intermediate with 2-ortho-hydroxyphenyl indole. In preparing the dyes of formulae (2) to (9), the respective 5-substituted indoles were initially reacted with the acid and in preparing the dyes of formulae (16) to (19), the respective 7-substituted indoles were intially reacted with the acid. The dyes of formulae (10) to (15) were prepared by reacting 7-carboxyindole with the acid and subsequently reacting the intermediate after oxidation with the compound selected for the second aryl radical.

Indicator dyes containing a 3,4-benzochromane ring-closing moiety including such dyes derived from indoles form the subject matter of copending U.S. Patent application Ser. No. 204,326 of Alan L. Borror filed Dec. 2, 1971 and as disclosed therein may be prepared by reacting benzocoumarin with the indole or other selected starting material in the presence of an acid catalyst. Indicator dyes as represented by Formula (II) having as a ring-closing moiety the o-hydroxyphenyl group substituted in the 2-position of the indole also form the subject matter of aforementioned copending U.S. Patent application Ser. No. 204,326 and as disclosed therein may be prepared by the condensation of 2-ortho-hydroxyphenyl indole with the appropriate compound desired as the R substituent.

Indicator dyes containing as the hydrogen-bonding group, a fluoroalkyl carbinol substituent, form the subject matter of copending U.S. Patent application Ser. No. 204,350 of Richard B. Greenwald filed Dec. 2, 1971, now U.S. Pat. No. 3,862,128 and indoles containing a sulfonamido or sulfamoyl substituent useful in preparing such phthaleins form the subject matter of copending U.S. Patent application Ser. No. 108,663 of Paul S. Huyffer filed concurrently herewith, now U.S. Pat. No. 3,772,329.

Mixed indicator dyes comprising phthaleins containing an indole radical and a second radical derived from a different N-heterocyclic aryl compound and phthaleins containing an indole radical and a second radical derived from a hydroxy-substituted carbocyclic aryl compound form the subject matter of copending U.S. Patent application Ser. No. 202,555 of Paul S. Huyffer and Ser. No. 202,558 of Eva R. Karger and Paul T. MacGregor, respectively, both filed Nov. 26, 1971, now U.S. Pat. Nos. 3,816,120 and 3,816,124, respectively.

Certain 2-indole phthaleins form the subject matter of copending U.S. Patent application Ser. No. 176,053 of Stanley M. Bloom and Paulina P. Garcia filed Aug. 30, 1971 now U.S. Pat. No. 3,779,752, and indicator dyes derived from carbazole which may contain an indole radical form the subject matter of U.S. Patent application Ser. No. 202,482 of Ruth C. Bilofsky and Richard D. Cramer filed Nov. 25, 1971, now U.S. Pat. No. 3,816,119. Indicator dyes containing a naphthalide ring-closing moiety substituted in the 6-position with certain groups, such as sulfonamido, form the subject matter of copending U.S. Patent application Ser. No. 193,746 of Myron S. Simon filed Oct. 29, 1971 now U.S. Pat. No. 3,811,881.

Examples of dyes that may be employed in combination with the indole dye or dyes as optical filter agent(s) for absorbing radiation in the longer wavelength region of the visible spectrum include 9-pyridyl fluorenes which form the subject matter of copending U.S. Patent application Ser. No. 184,363 of Alan L. Borror filed Sept. 28, 1971, now U.S. Pat. No. 3,726,675, a continuation of U.S. Patent application Ser. No. 49,627 filed June 25, 1970, now abandoned, and especially the indicator dyes derived from certain hydroxy-substituted carbocyclic aryl compounds, i.e., phenols and 1-naphthols, as disclosed and claimed in copending U.S. Patent application Ser. No. 103,392 of Myron S. Simon and David P. Waller filed Jan. 4, 1971, now U.S. Pat. No. 3,702,245.

It will be appreciated that the aforementioned indole dyes may be employed in any photographic process to absorb short wavelength radiation that might otherwise cause post-exposure fogging of a selectively exposed photosensitive element during development of the latent image contained therein. For purposes of clarity, however, the present invention will be further described in terms of the preferred embodiment employing composite diffusion transfer photosensitive elements for producing multicolor dye transfer images.

Multicolor images may be obtained using color image-forming components in diffusion transfer processes by several techniques. One such technique contemplates obtaining multicolor transfer images utilizing, for example, dye developers as dye image-providing materials by employment of an integral multilayer photosensitive element, such as is disclosed in the aforementioned U.S. Pat. No. 3,415,644 wherein at least two selectively sensitized photosensitive strata, superposed on a single support, are processed, simultaneously and without separation, with a single, common image-receiving layer. A suitable arrangement of this type comprises an opaque support carrying a red-sensitive silver halide stratum, a green-sensitive silver halide stratum and a blue-sensitive silver halide stratum, said emulsions having associated therewith, respectively, for example, a cyan dye developer, a magenta dye developer and a yellow dye developer. The dye developer may be utilized in the silver halide stratum, for example, in the form of particles, or it may be employed as a layer behind the appropriate silver halide strata. Each set of silver halide strata and associated dye developer strata optionally may be separated from other sets by suitable interlayers, for example, by a layer of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be employed. In such instances, a separate yellow filter may be omitted.

In a preferred embodiment of the present invention, the film unit is specifically adapted to provide for the production of a multicolor dye transfer image and the photosensitive laminate comprises, in order of essential layers, the dimensionally stable opaque layer; at least two selectively sensitized silver halide strata each having dye image-providing material of predetermined color associated therewith, for example, dye developers, which are soluble and diffusible in the processing composition as a function of the point-to-point degree of exposure of the respective associated silver halide strata; a polymeric layer dyeable by the dye image-providing materials; and a dimensionally stable transparent layer.

Dye developers, as well known in the art, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

The dye developers are preferably selected for their ability to provide colors that are useful in carrying out subtractive color photography, that is, the previously mentioned cyan, magenta and yellow. The dye developers employed may be incorporated in the respective silver halide emulsion or, preferably in a separate layer behind the respective silver halide stratum. Specifically, the dye developer may, for example, be in a coating or layer behind the respective silver halide stratum and such a layer of dye developer may be applied by use of a coating solution containing about 0.5 to 8%, by weight, of the respective dye developer distributed in a film-forming natural, or synthetic polymer, for example, gelatin, polyvinyl alcohol, and the like, adapted to be permeated by the chosen diffusion transfer fluid processing composition.

The silver halide strata comprising the multicolor photosensitive laminate preferably possess predominant spectral sensitivity to separate regions of the spectrum and each has associated therewith a dye which is a silver halide developing agent and is, most preferably, substantially soluble in the reduced form only at a first pH possessing, subsequent to processing, a spectral absorption range substantially complementary to the predominant sensitivity range of its associated emulsion.

In the preferred embodiment, each of the silver halide strata, and its associated dye, is separated from the remaining strata, and their associated dye, by separate alkaline solution permeable polymeric interlayers.

In such preferred embodiment of the invention, the silver halide stratum comprise photosensitive silver halide dispersed in gelatin and are about 0.6 to 6 microns in thickness; the dye itself is dispersed in an aqueous alkaline solution polymeric binder, preferably gelatin, as a separate layer about 1 to 7 microns in thickness; the alkaline solution permeable polymeric interlayers, preferably gelatin, are about 1 to 5 microns in thickness; the dyeable polymeric layer is transparent and about 0.25 to 0.4 mil. in thickness; and each of the dimensionally stable opaque and transparent layers are alkaline solution impermeable, processing composition vapor permeable and about 2 to 6 mils. in thickness. It will be specifically recognized that the relative dimensions recited above may be appropriately modified, in accordance with the desires of the operator, with respect to the specific product to be ultimately prepared.

In the preferred embodiment of the present invention's film unit for the production of a multicolor transfer image, the respective silver halide/dye developer units of the photosensitive element will be in the form of a tripack configuration which will ordinarily comprise a cyan dye developer/red-sensitive emulsion unit contiguous the dimensionally stable opaque layer, the yellow dye developer/blue-sensitive emulsion unit most distant from the opaque layer and the magenta dye developer/green-sensitive emulsion unit intermediate those units, recognizing that the relative order of such units may be varied in accordance with the desires of the operator.

Reference is now made to FIGS. 1 through 7 of the drawings wherein there is illustrated a preferred film unit of the present invention and wherein like numbers, appearing in the various figures, refer to like components.

As illustrated in the drawings, FIG. 1 sets forth a perspective view of the film unit, designated 10, and each of FIGS. 2 through 7 illustrate diagrammatic cross-sectional views of film unit 10, along the stated section lines 2—2, 3—3, 5—5 and 7—7, during the various depicted stages in the performance of a photographic diffusion transfer process as detailed hereinafter.

Film unit 10 comprises rupturable container 11, retaining, prior to processing, aqueous processing composition 12, and photosensitive laminate 13 including, in order, dimensionally stable opaque layer 14, preferably an actinic radiation-opaque flexible sheet material; cyan dye developer layer 15; red-sensitive silver halide emulsion layer 16; interlayer 17; magenta dye developer layer 18; green-sensitive silver halide emulsion layer 19; interlayer 20; yellow dye developer layer 21; blue-sensitive silver halide emulsion layer 22; auxiliary layer 23, which may contain an auxiliary silver halide developing agent; image-receiving layer 24; spacer layer 25; neutralizing layer 26; and dimensionally stable transparent layer 27, preferably an actinic radiation transmissive flexible sheet material.

The structural integrity of laminate 13 may be maintained, at least in part, by the adhesive capacity exhibited between the various layers comprising the laminate at their opposed surfaces. However, the adhesive capacity exhibited at an interface intermediate image-receiving layer 24 and the silver halide emulsion layer next adjacent thereto, for example, image-receiving layer 24 and auxiliary layer 23 as illustrated in FIGS. 2 through 7, should be less than that exhibited at the interface between the opposed surfaces of the remainder of the layers forming the laminate, in order to facilitate distribution of processing solution 12 intermediate the stated image-receiving layer 24 and the silver halide emulsion layer next adjacent thereto. The laminate's structural integrity may also be enhanced or provided, in whole or in part, by providing a binding member extending around, for example, the edges of laminate 13, and maintaining the layers comprising the laminate intact, except at the interface between layers 23 and 24 during distribution of processing composition 12 intermediate those layers. As illustrated in the figures, the binding member may comprise a pressure-sensitive tape 28 securing and/or maintaining the layers of laminate 13 together at its respective edges. Tape 28 will also act to maintain processing solution 12 intermediate image-receiving layer 24 and the silver halide emulsion layer next adjacent thereto, upon application of compressive pressure to pod 11 and distribution of its contents intermediate the stated layers. Under such circumstances, binder tape 28 will act to prevent leakage of fluid processing composition from the film unit's laminate during and subsequent to photographic processing.

Rupturable container 11 may be of the type shown and described in any of U.S. Pat. Nos. 2,543,181; 2,634,886; 3,653,732; 2,723,051; 3,056,492; 2,056,491; 3,152,515; and the like. In general, such containers will comprise a rectangular blank of fluid- and air-impervious sheet material folded longitudinally upon itself to form two walls 29 which are sealed to one another along their longitudinal and end margins to form a cavity in which processing composition 12 is retained. The longitudinal marginal seal 30 is made weaker than the end seals 31 so as to become unsealed in response to the hydraulic pressure generated within the fluid contents 12 of the container by the application of compressive pressure to walls 29 of the container.

As illustrated in FIGS. 1, 2 and 3, container 11 is fixedly positioned and extends transverse a leading edge of photosensitive laminate 13 whereby to effect unidirectional discharge of the container's contents 12 between image-receiving layer 24 and the stated layer next adjacent thereto, upon application of compressive force to container 11. Thus, container 11, as illustrated in FIG. 2, is fixedly positioned and extends transverse a leading edge of laminate 13 with its longitudinal marginal seal 30 directed toward the interface between image-receiving layer 24 and auxiliary layer 23. As shown in FIGS. 1, 2 and 4, container 11 is fixedly secured to laminate 13 by extension 32 of tape 28 extending over a portion of one wall 29 of the container, in combination with a separate retaining member such as illustrated retaining tape 33 extending over a portion of laminate 13's surface generally equal in area to about that covered by tape 28.

Figure 6:
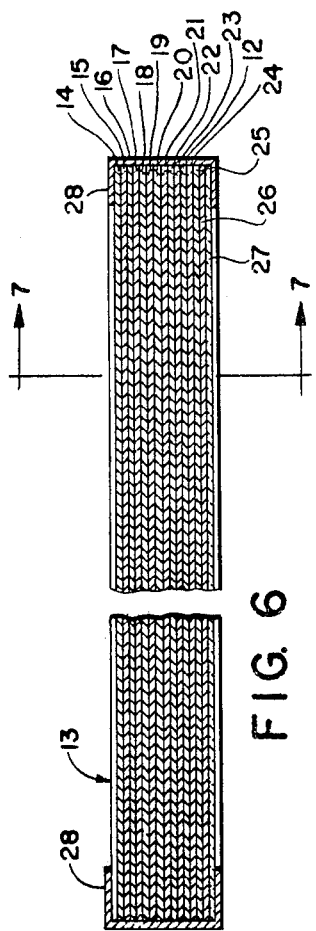
Figure 7:
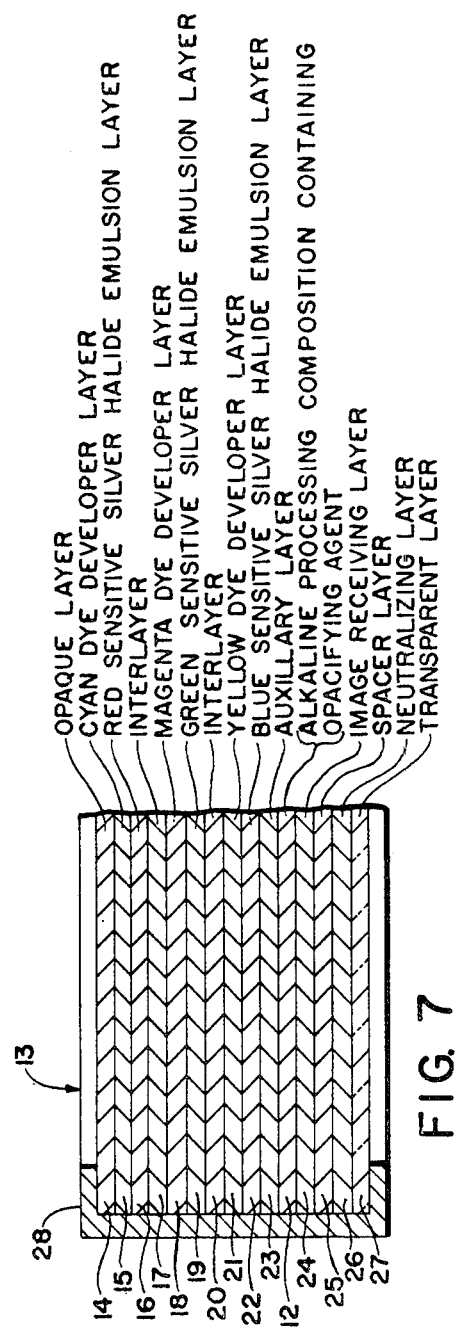

As illustrated in FIG. 6, extension flap 32 of tape 28 is preferably of such area and dimensions that upon, for example, manual separation of container 11 and tape 33, subsequent to distribution of processing composition 12, from the remainder of flim unit 10, flap 32 may be folded over the edge of laminate 13, previously covered by tape 33, in order to facilitate maintenance of the laminate's structural integrity, for example, during the flexations inevitable in storage and use of the processed film unit, and to provide a suitable mask or frame, for viewing of the transfer image through the picture viewing area of transparent layer 27.

The fluid contents of the container comprise an aqueous alkaline solution, having a pH and solvent concentration at which the dye developers are soluble and diffusible, which contains a reflecting agent in a quantity sufficient to mask the dye developers associated with the silver-halide emulsions subsequent to processing and additionally contains as an optical filter agent(s), an indole dye or dyes, preferably a dye as represented in formula (IV) above and in a preferred embodiment, also contains a second pH-sensitive dye or dyes having an absorption spectrum in a partly different wavelength range so that the indole dye and second dye together are capable of absorbing incident actinic radiation between 400 nm. and 700 nm.

In general, in a preferred embodiment, a concentration of reflecting agent or agents and optical filter agent or agents selected will be that sufficient to prevent further exposure of the film units silver halide emulsion or emulsions, by actinic radiation traversing through the dimensionally stable transparent layer, subsequent to distribution of processing solution intermediate the dyeable polymeric layer and the stated layer next adjacent thereto. Accordingly, the film unit may be processed, subsequent to distribution of the composition, in the presence of such radiation, in view of the fact that the silver halide emulsion or emulsions of the laminate are appropriately protected from incident radiation, at one major surface by the distributed reflecting and optical filter agents and at the remaining major surface by the dimensionally stable opaque layer. If the illustrated binder tapes are also opaque, edge leakage of actinic radiation incident on the emulsion or emulsions will also be prevented. The selected reflecting agent, however, should be one providing a background suitable for viewing the dye developer transfer image formed in the dyeable polymeric layer.

In general, while substantially any reflecting agent may be employed, it is preferred that an agent be selected that will not interfere with the color integrity of the dye transfer image, as viewed by the observer, and, most preferably, an agent which is aesthetically pleasing to the viewer and does not provide a background noise signal degrading, or detracting from, the information content of the image. Particularly desirable reflecting agents will be those providing a white background, for viewing the transfer image, and specifically those conventionally employed to provide background for reflection photographic prints and, especially, those agents possessing the optical properties desired for reflection of incident radiation.

As examples of reflecting pigments adapted for employment in the practice of the present invention, mention may be made of barium sulfate, zinc sulfide, titanium dioxide, barium stearate, silver flake, silicates, alumina, zirconium oxide, zirconium acetyl acetate, sodium zirconium sulfate, kaolin, mica, and the like.

A particularly preferred reflecting agent comprises titanium dioxide due to its highly effective reflection properties. In general, in such preferred embodiment, based upon percent titanium dioxide (weight/volume) a layer containing about 1500 to 4000 mgs./ft.$^2$ titanium dioxide will provide a percent reflectance of about 85 to 90%. In the most preferred embodiments, the percent reflectance particularly desired will be in the order of $\sim$ 85%.

In embodiments wherein the dispersion comprises a preformed layer positioned intermediate the reception layer and next adjacent silver halide layer, the pigment layer will be sufficiently transparent to allow transit of exposing radiation through the pigment layer and may comprise titanium dioxide reflecting agent possessing a particle size distribution averaging $< \sim 0.2$ micron in diameter and preferably $< \sim 0.05$ micron in diameter as initially present preceding exposure of the film unit, which preferred materials, upon contact with aqueous alkaline processing composition, preferably aggregate to provide particles possessing a diameter in excess of $\sim$ 0.2 micron in diameter and will be coated at a coverage of $\sim$ 200 to 1000 mgs./ft.$^2$. Specifically, the reflecting agent will be present in a quantity insufficient to prevent exposure of the emulsion layers by actinic radiation incident on the dimensionally stable transparent layer of the film unit but in a concentration sufficient, subsequent to processing, to mask dye developer associated with the silver halide emulsion strata from the dye transfer image. In the preferred construction of such embodiment, the pigment such as titanium dioxide will be initially present in a relatively small particle size to provide unexpectedly efficient transit of radiation through the reflecting layer during exposure which upon contact with an alkaline processing composition and aggregation of the pigment particles provides efficient light reflectivity and masking capacity subsequent to such aggregation.

In general, the reflecting agents to be employed are those which remain substantially immobile within their respective compositions during and subsequent to photographic processing and particularly those which comprise insoluble and nondiffusible inorganic pigment dispersions within the layer in which they are disposed.

Where desired, reflecting agent pigment may thus be distributed in whole or in part within a processing composition permeable polymeric matrix such as gelatin and/or any other such polymeric matrixes as are specifically denoted throughout the specification as suitable for employment as a matrix binder and may be distributed in one or more of the film unit layers which may be separated or contiguous, intermediate the image-receiving layer and next adjacent silver halide layer, provided that its distribution and concentration is effective to provide the denoted post processing masking function, and/or in whole or in part the reflecting agent may be ultimately disposed within the processing composition residuum located intermediate the image-receiving layer and next adjacent silver halide emulsion strata and associated dye image-forming material.

The optical filter agent(s) selected should exhibit at the initial pH of the processing, maximum spectral absorption of radiation at the wavelengths to which the film unit's photosensitive silver halide layer or layers are sensitive and preferably, should be substantially immobile or nondiffusible within the pigment dispersion, during performance of its radiation filtration function, in order to maintain and enhance the optical integrity of the dispersion as a radiation filter unit and to prevent its diffusion into and localized concentration within the image-receiving layer. Commensurate with the spectral sensitivity range of the silver halide layer or layers, the indole dye(s) may be used in combination with a second dye or dyes which combination together possesses absorption complementary to said sensitive range of such silver halide layers in order to provide effective protection against physical fog providing radiation during processing. Recognizing that the filter agent absorption will derogate from image-viewing characteristics by contaminating reflecting pigment background, the selected agents should be those exhibiting major spectral absorption at the pH at which processing is effected and minimal absorption at a pH below that which obtains during transfer image formation. Accordingly, the selected optical filter agent or agents should possess a pKa below that of the processing pH and above that of the environmental pH subsequent to transfer image formation.

It will be understood that in the performance of the present invention that the silver halide layers should be protected in all visible and non-visible regions of the spectrum to which they are sensitive. Depending upon the sensitivity of the silver halide or other photosensitive material employed, it may be desirable to use ultraviolet and/or infra-red absorbers in conjunction with the indicator dye or dyes selected as optical filter agents to provide additional protection in the non-visible regions. Ultraviolet and infra-red absorbers are well known in the photographic art and any of the compounds conventionally used for this purpose may be employed in the present invention. Like the optical filter agents, the absorbers should provide the desired protection against post-exposure fogging during at least the initial stages of development but should not absorb radiation intended to selectively expose the photosensitive material or detract from the brilliance, hues and other properties of the final image. Thus, the absorber or absorbers, as will be appropriate for the particular compounds selected, may be initially disposed in a layer of the film unit and/or the processing solution and subsequent to processing may be retained in or separated from the final product.

The indole dyes described above are capable of absorbing radiation in the shorter wavelength region of the visible spectrum and absorb such incident actinic radiation at selective pH ranges including acidic, neutral and alkaline pH. They are conveniently soluble in the processing solutions employed and without adverse action on conventional developing agents and/or on the latent image provided by selective photoexposure of the phtosensitive material, e.g., the silver halide emulsion or emulsions employed. The indole dyes as represented in formulae (III) and (IV) are especially useful in processes employing highly alkaline processing compositions having a pH of 12 or higher, and the dyes as represented in formula (IV) are especially preferred for use in such processes where good stability in highly alkaline media is desired. In general the indole dyes are substantially non-fogging, nonstaining and nonpoisonous and, although, in the preferred embodiment, the indole dye(s) selected will be disposed in a processing composition possessing an initial alkaline pH at which the dye(s) selected are adapted to absorb incident actinic radiation as retained in the rupturable container, alternatively such dye(s) may be conveniently dispersed in any processing composition permeable layer of the composite film unit structure intermediate the photosensitive silver halide layer to be protected from incident actinic radiation and the exposure surface of the film unit. When initially disposed in a layer of the film unit, they will be present at an environmental pH at which the agent or agents selected do not substantially absorb incident actinic radiation prior to photoexposure of the film unit and activation by contact with alkaline processing composition permeating such layer and thereby providing the environmental pH at which the agent or agents selected absorb incident radiation actinic to the photosensitive silver halide layer to prevent fogging during processing.

In general, although the optical filter agents of the present invention may thus be employed in any processing composition permeable layer of the preferred composite film units intermediate the photosensitive silver halide emulsion or emulsions to be protected from physical fog formation during processing and the transparent support layer, in the specifically preferred film unit embodiments, the optical filter agents are initially disposed within the alkaline processing solution, in order to obviate the necessity of converting the filter agent from a substantially nonabsorber of actinic radiation desired to effect photoexposure of the film unit to the desired light-absorbing form during processing, by alkaline processing composition contact, subsequent to selective photoexposure of the film unit and to thus maximize isolation of their effects from the photosensitive silver halide crystals prior to photoexposure.

As discussed previously, the concentration of indicator dye is selected to provide the optical transmission density required, in combination with other layers intermediate the silver halide emulsion layer(s) and the incident radiation, to prevent nonimagewise exposure, i.e., fogging, by incident actinic light during the performance of the particular photographic process. In the processes where the indicator dye or dyes selected as optical filter agents are used in conjunction with a reflecting agent or agents, as detailed above, the optical filter agents and reflecting agents together should possess the optical transmission density necessary to protect the photosensitive material for the particular photographic process. The optimum concentration of optical filter agent(s) or filter agent(s) together with reflecting agent(s) may be readily determined empirically for each photographic system.

As disclosed and claimed in aforementioned copending application Ser. No. 43,782 filed June 5, 1970, it as been discovered quite unexpectedly that an improved film unit assemblage of the aforementioned general structural parameters and adapted to be processed, subsequent to photoexposure, in the presence of actinic radiation may be fabricated to employ, as the stratum interposed intermediate the reception layer and next adjacent silver halide layer subsequent to photoexposure, in inorganic light-reflecting pigment dispersion containing reflecting pigment in a concentration per se insufficient, distributed as a layer intermediate the reception layer and next adjacent silver halide layer, to effectively prevent transmission of a given level of radiation actinic to the silver halide layer therethrough and at least one optical filter agent, in a concentration per se also insufficient to prevent transmission of said given level of actinic radiation therethrough, which concentrations individually and additively are together insufficient to prevent transmission of incident actinic radiation but in admixture are synergistically effective to provide a barrier to such transmission. Specifically the inorganic light-reflecting pigment dispersion containing the optical filter agent is formulated to exhibit an optical transmission density $> \sim$ 6.0 density units and an optical reflection density $< \sim$ 1.0 density units at a pH above the pKa of the optical filter agents included.

In accordance with that discovery, the optical filter agent will be employed in a concentration, itself ineffective to provide the required transmission density alone or, theoretically, in combination with the inorganic light-reflecting pigment, as projected by Beer's Law, that is, $D_T = ECl$ wherein $D_T$ is transmission density, E is the epsilon of the optical filter agent, C is the concentration and $l$ is the radiation path length, but empirically effective in combination with the pigment to prevent transmission of radiation actinic to the silver halide layers incident on the layer comprising the dispersion, during processing in the presence of actinic radiation, and sufficiently low to provide substantially immediate viewing of transfer image formation against the background provided by the reflecting pigment. Such effective minimal concentration of filter agent specifically facilitates the acceleration of the clearing time involved in discharging from visual observation the filter agent employed by reduction of the environmental pH from above to below the pKa of the filter agent selected.

As disclosed in the previously cited patents and applications, the liquid processing composition referred to for effecting multicolor diffusion transfer processes comprises at least an aqueous solution of an alkaline material, for example, diethylamine, sodium hydroxide or sodium carbonate and the like, and preferably possesses a pH in excess of 12, and most preferably includes a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers which are inert to an alkaline solution such as, for example, a hydroxyethyl cellulose or sodium carboxymethyl cellulose. Additionally, film-forming materials or thickening agents whose ability to increase viscosity is substantially unaffected if left in solution for a long period of time are also disclosed to be capable of utilization. As stated, the film-forming material is preferably contained in the processing composition in such suitable quantities as to impart to the composition a viscosity in excess of 100 cps. at a temperature of approximately 24° C. and preferably in the order of 100,000 cps. to 200,000 cps. at that temperature.

In the performance of a diffusion transfer multicolor process employing film unit 10, the unit is exposed to radiation, actinic to photosensitive laminate 13, incident on the laminate's exposure surface 34, as illustrated in FIG. 2.

Subsequent to exposure, as illustrated by FIGS. 2 and 4, film unit 10 is processed by being passed through opposed suitably gapped rolls 35 in order to apply compressive pressure to frangible container 11 and to effect rupture of longitudinal seal 30 and distribution of alkaline processing composition 12, possessing inorganic light-reflecting pigment and optical filter agent at a pH above the pKa of the filter agent and a pH at which the cyan, magenta and yellow dye developers are soluble and diffusible as a function of the point-to-point degree of exposure of red-sensitive silver halide emulsion layer 16, green-sensitive silver halide emulsion layer 19 and blue-sensitive silver halide emulsion layer 22, respectively, intermediate spacer layer 25 and auxiliary layer 23.

Alkaline processing composition 12 permeates emulsion layers 16, 19 and 22 to initiate development of the latent images contained in the respective emulsions. The cyan, magenta and yellow dye developers, of layers 15, 18 and 21, are immobilized, as a function of the development of their respective associated silver halide emulsions, preferably substantially as a result of their conversion from the reduced form to their relatively insoluble and nondiffusible oxidized form, thereby providing imagewise distributions of mobile, soluble and diffusible cyan, magenta and yellow dye developer, as a function of the point-to-point degree of their associated emulsions' exposure. At least part of the imagewise distributions of mobile cyan, magenta and yellow dye developer transfers, by diffusion, to dyeable polymeric layer 24 to provide a multicolor dye transfer image to that layer which is viewable against the background provided by the reflecting pigment present in processing composition residuum 12 and cyan, magenta and yellow dye developer remaining associated with blue-sensitive emulsion layer 22, green-sensitive emulsion layer 19 and red-sensitive emulsion layer 16. Subsequent to substantial transfer image formation, a sufficient portion of the ions comprising aqueous alkaline processing composition 12 transfer, by diffusion, through permeable polymeric reception layer 24, permeable spacer layer 25 to polymeric neutralizing layer 26 whereby the environmental pH of the system decreases as a function of neutralization to a pH at which the cyan, magenta and yellow dye developers, in the reduced form, are substantially nondiffusible to thereby provide a stable multicolor dye transfer image and discharge of the pH-sensitive optical filter agent by reduction of the pH substantially below the pKa of such agent to thereby provide maximum reflectivity in terms of the pigment concentration present.

The alkaline solution component of the processing composition, positioned intermediate the photosensitive element and the image-receiving layer, thus permeates the emulsions to initiate development of the latent images contained therein. The respective associated dye developers are immobilized or precipitated in exposed areas as a consequence of the development of the latent images. This immobilization is apparently, at least in part, due to a change in the solubility characteristics of dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsions, the associated dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving element receives a depthwise diffusion, from the developed emulsion, of unoxidized dye developer without appreciably disturbing the imagewise distribution thereof to provide the reversed or positive color image of the developed image.

Subsequent to distribution of processing composition 12, container 11 may be manually dissociated from the remainder of the film unit, as described above, to provide the product illustrated in FIG. 6.

The present invention will be further illustrated and detailed in conjunction with the following illustrative constructions which set out representative embodiments of the photographic utilization of the indicator dyes of this invention, which, however, are not limited to the details therein set forth and are intended to be illustrative only.

Film units were prepared, for example, by coating, in succession, on a gelatin subbed, 4 mil. opaque polyethylene terephthalate film base, the following layers:

1. a layer of the cyan dye developer 1,4-bis-($\beta$-[hydroquinonyl-$\alpha$-methyl]-ethylamino)-5,8-dihydroxyanthraquinone dispersed in gelatin and coated at a coverage of about 80 mgs./ft.$^2$ of dye and about 100 mgs./ft.$^2$ of gelatin;

2. a red-sensitive gelatino-silver iodobromide emulsion coated at a coverage of about 225 mgs./ft.$^2$ of silver and about 50 mgs./ft.$^2$ of gelatin;

3. a layer comprising the acrylic latex sold by Rohm and Haas Co. under the trade designation AC-61 and polyacrylamide coated at a coverage of about 150 mgs./ft.$^2$ of AC-61 and about 5 mgs./ft.$^2$ of polyacrylamide.

4. a layer of the magenta dye developer 2-(p-[$\beta$-hydroquinonylethyl]-phenylazo)-4-isopropoxy-1-naphthol dispersed in gelatin and coated at a coverage of 70 mgs./ft.$^2$ of dye and about 120 mgs./ft.$^2$ of gelatin;

5. a green-sensitive gelatino-silver iodobromide emulsion coated at a coverage of about 120 mgs./ft.$^2$ of silver and 60 mgs./ft.$^2$ of gelatin;

6. a layer comprising the acrylic latex sold by Rohm and Haas Co. under the trade designation B-15 and polyvinylacrylamide coated at a coverage of about 100 mgs./ft.$^2$ of B-15 and about 10 mgs./ft.$^2$ of polyvinylacrylamide.

7. a layer of the yellow dye developer 4-(p-[$\beta$-hydroquinonylethyl]-phenylazo)-3-(N-n-hexylcarboxamido)-1-phenyl-5-pyrazolone and the auxiliary developer 4'-methylphenyl hydroquinone dispersed in gelatin and coated at a coverage of about 50 mgs./ft.$^2$ of dye, 15 mgs./ft.$^2$ of auxiliary developer and about 75 mgs./ft.$^2$ of gelatin;

8. a blue-sensitive gelatino-silver iodobromide emulsion coated at a coverage of about 75 mgs./ft.$^2$ of silver and about 20 mgs./ft.$^2$ of gelatin; and 9. a layer of gelatin coated at a coverage of about 50 mgs./ft.$^2$.

Then a transparent 4 mil. polyethylene terephthalate film base was coated, in succession, with the following layers:

1. a 7:3 mixture, by weight, of polyethylene/maleic acid copolymer and polyvinyl alcohol, at a coverage of about 1400 mgs./ft.$^2$, to provide a polymeric acid layer;

2. a graft copolymer of acrylamide and diacetone acrylamide on a polyvinyl alcohol backbone in a molar ratio of 1:3.2:1, at a coverage of 800 mgs./ft.$^2$, to provide a polymeric spacer layer; and 3. a 2:1 mixture, by weight, of polyvinyl alcohol and poly-4-vinylpyridine, at a coverage of about 900 mgs./ft.$^2$ and including about 20 mgs./ft.$^2$ phenyl mercapto tetrazole, to provide a polymeric image-receiving layer.

The two components thus prepared were then taped together in laminate form, at their respective edges, by means of a pressure-sensitive binding tape extending around, in contact with, and over the edges of the resultant laminate.

A rupturable container comprising an outer layer of lead foil and an inner liner or layer of polyvinyl chloride retaining an aqueous alkaline processing solution comprising:

| | |
|---|---|
| Water | 100 cc. |
| Potassium hydroxide | 11.2 gms. |
| Hydroxyethyl cellulose (high viscocity) [commercially available from Hercules Powder Co., Wilmington, Delaware, under the trade name Natrasol 250] | 3.4 gms. |

-continued

| | |
|---|---|
| N-phenethyl-α-picolinium bromide | 2.7 gms. |
| Benzotriazole | 1.15 gms. |
| Titanium dioxode | 50.0 gms. |
| (A) | 2.08 gms. |

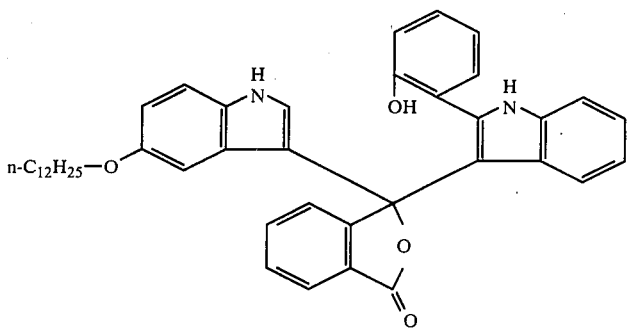

(B)  0.52 gms.

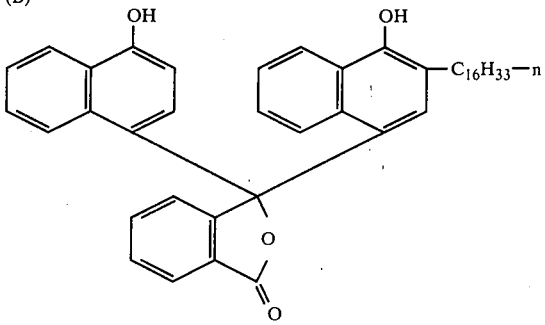

(C)  1.18 gms.

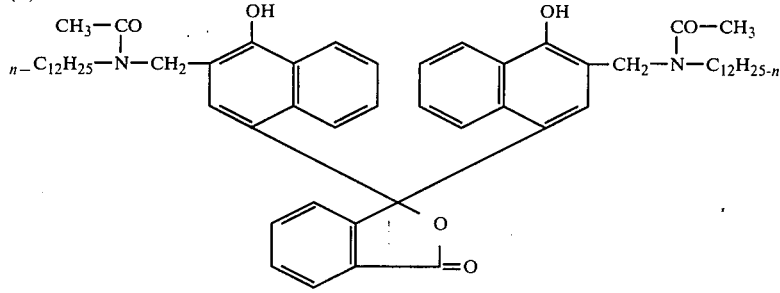

was then fixedly mounted on the leading edge of each of the laminates, by pressure-sensitive tapes interconnecting the respective containers and laminates, such that, upon application of compressive pressure to a container, its contents were distributed, upon rupture of the container's marginal seal, between the polymeric image-receiving layer and next adjacent gelatin layer.

The photosensitive composite film units were exposed through step wedges to selectively filtered radiation incident on the transparent polyethylene terephthalate layer and processed in the presence of actinic radiation by passage of the exposed film units from a dark area through appropriate pressure-applying members, such as suitably gapped, opposed rolls, to effect rupture of the container and distribution of its contents as the film unit is brought into simulated sunlight. During processing, the multicolor dye transfer image formation may be viewed through the transparent polyethylene terephthalate layer against the titanium dioxide background provided by distribution of the pigment containing processing composition between the polymeric image-receiving layer and gelatin layer 9 of the photosensitive component. Multicolor dye transfer image formation was found to be substantially complete and exhibiting the required color, brilliance, hues, saturation and isolation, within a period of approximately 2 minutes. The film unit could be exposed to incident light and the formation of the image viewed upon distribution of the processing composition by reason of the protection against incident radiation afforded the photosensitive silver halide emulsion layers by the optical filter agents and by reason of the effective reflective background afforded by the titanium dioxide.

Test multicolor dye transfer images prepared in the manner detailed above were compared to (a) control transfer images prepared identically with the exception that the images were processed in the dark, i.e., in the absence of actinic radiation and also compared to (b) control transfer images prepared identically with the exception that the processing composition did not contain optical filter agents. Such a comparison clearly revealed the effectiveness of the optical filter agents in preventing post-exposure fogging during processing in the presence of light as reflected by the maximum densities obtained.

Specifically, a test and control experiment, prepared in the manner detailed above, provided the following data:

| | Positive Transfer Image Density (Dmax) | | |
|---|---|---|---|
| | No Filter Agent Control | Test | Control |
| Red | 0.07 | 2.15 | 2.30 |
| Green | 0.13 | 1.78 | 2.20 |
| Blue | 0.19 | 1.92 | 2.12 |

The preceding test embodiment was repeated using as the processing composition an aqueous alkaline solution comprising:

| | | |
|---|---|---|
| Water | 100 | cc. |
| Potassium hydroxide | 11.3 | gms. |
| Hydroxyethyl cellulose (high viscosity) | 3.4 | gms. |
| N-phenethyl-α-picolinium bromide | 1.75 | gms. |
| Benzotriazole | 1.15 | gms. |
| Titanium dioxide | 50.0 | gms. |
| (D) | 1.8 | gms. |

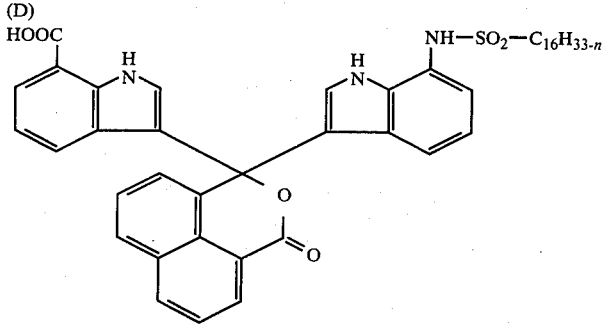

(E.) 2.64 gms.

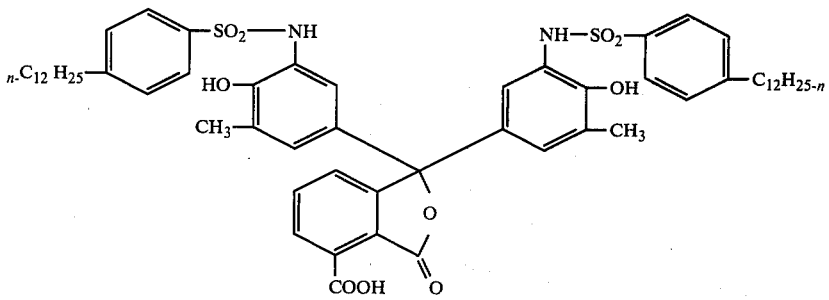

to povide the following data:

| | Positive Transfer Image Density (Dmax) | | |
|---|---|---|---|
| | No Filter Agent Control | Test | Control |
| Red | 0.07 | 2.46 | 2.50 + |
| Green | 0.13 | 2.42 | 2.50 + |
| Blue | 0.19 | 2.42 | 2.49 |

Figure 8:
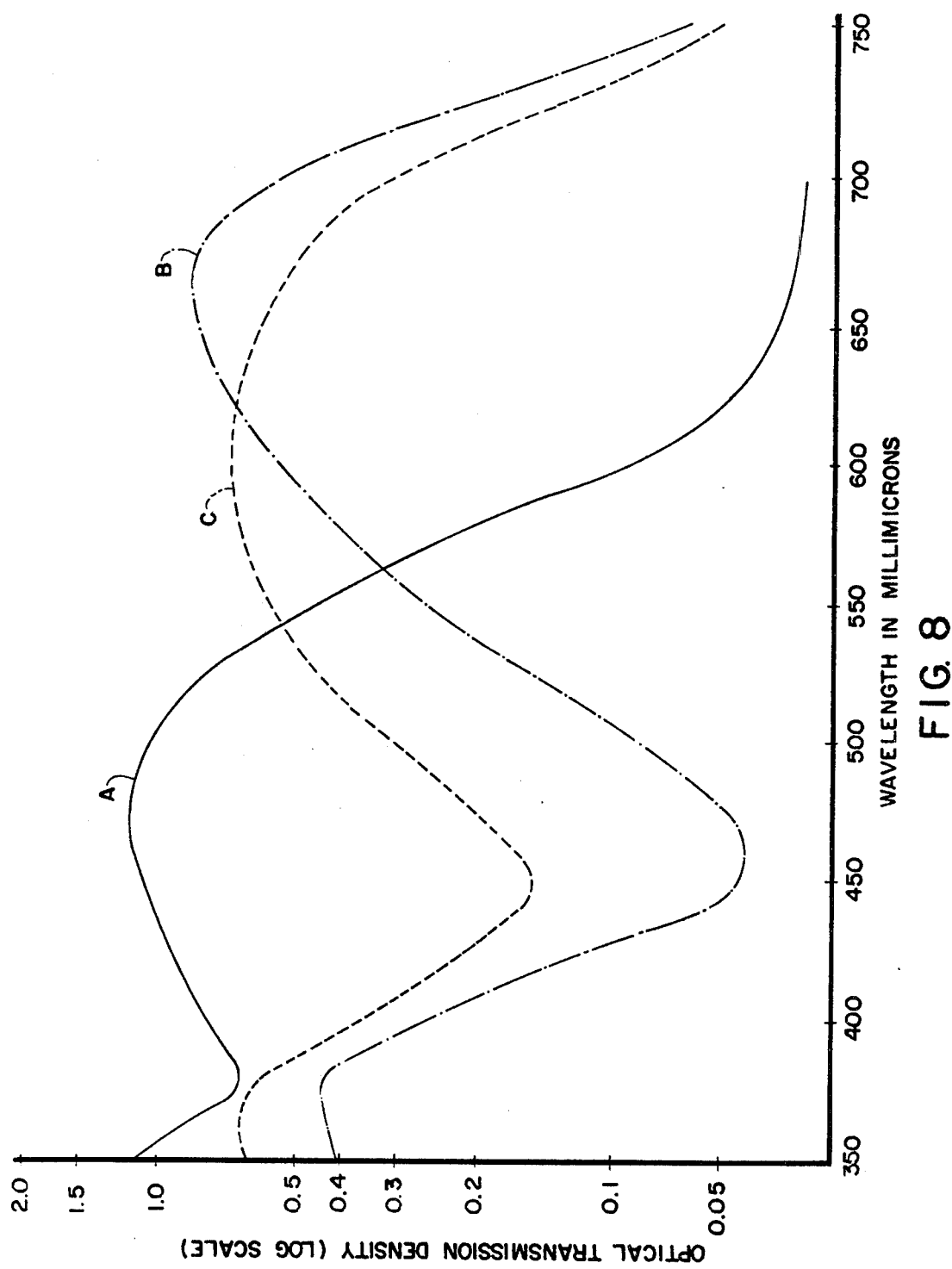
FIGS. 8 and 18 are graphic illustrations of the spectral absorption characteristics of indicator dyes of the present invention designated hereinafter as optical filter agents A, D and F through N representing the optical transmission density, i.e., absorbance of the respective agents measured on a logarithm scale over the wavelength range of 350 nm. to 750 nm. in aqueous alkaline solution at a pH substantially above their pKa.
Figure 9:
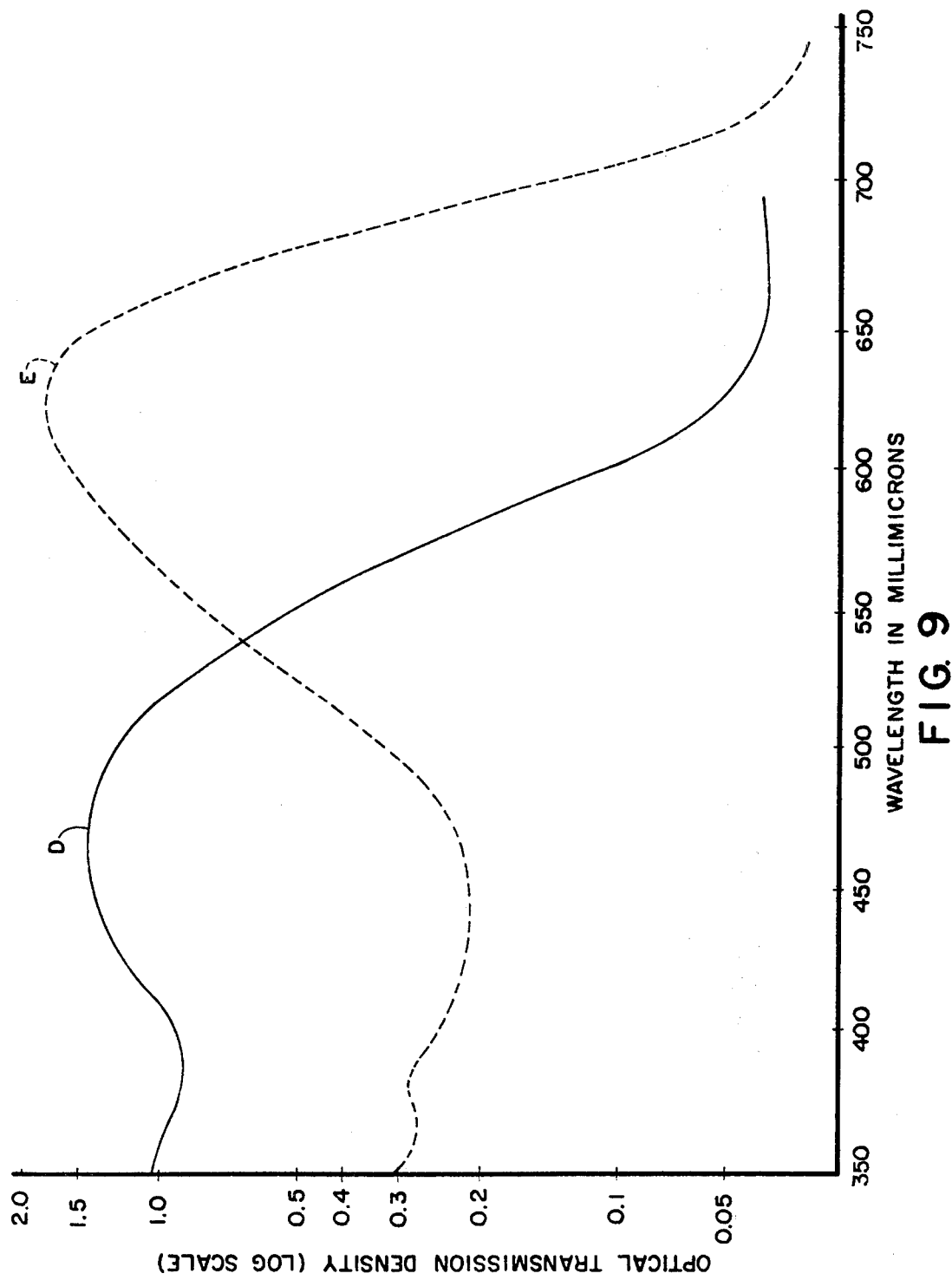
Figure 10:
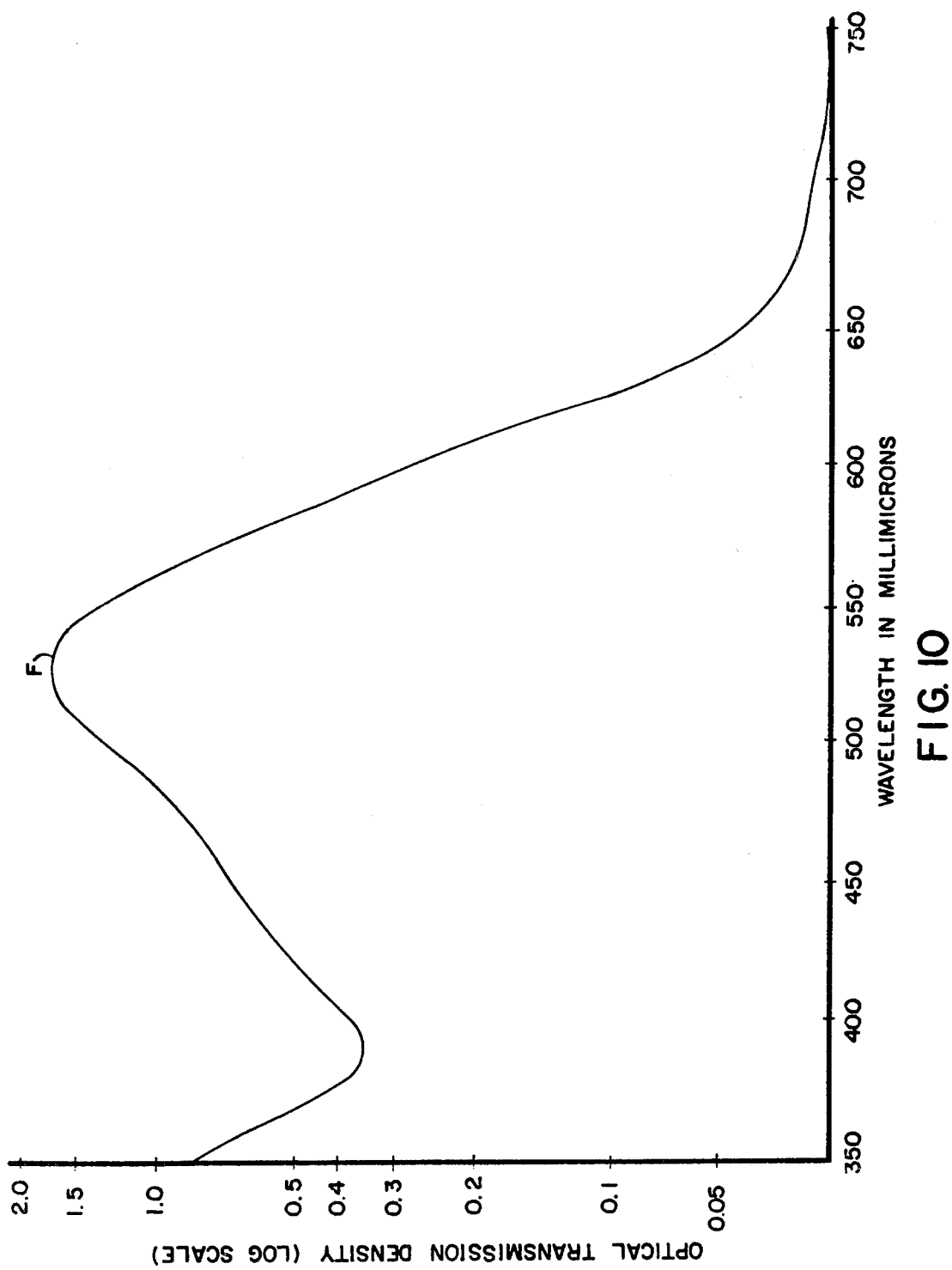
Figure 11:
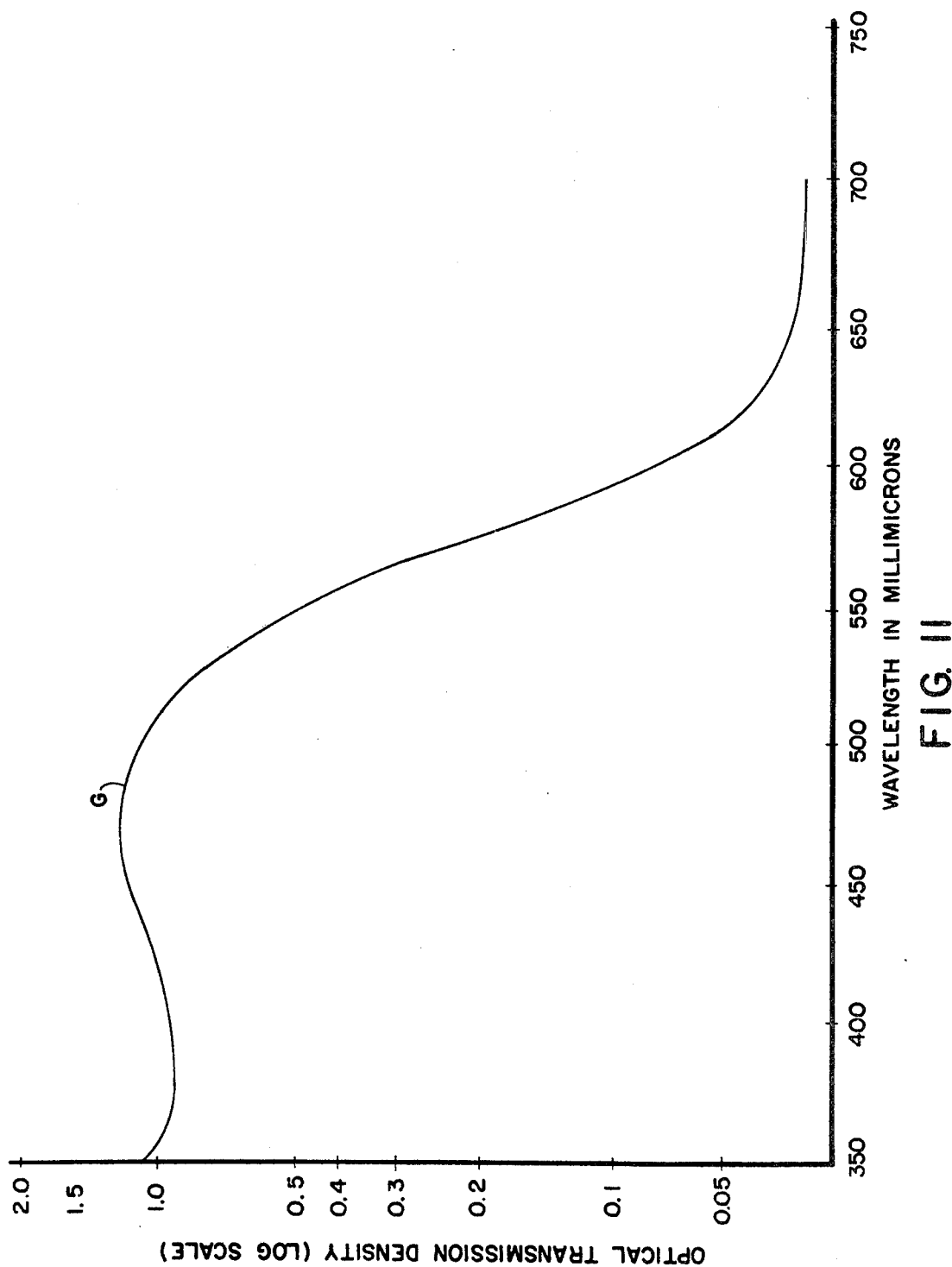
Figure 12:
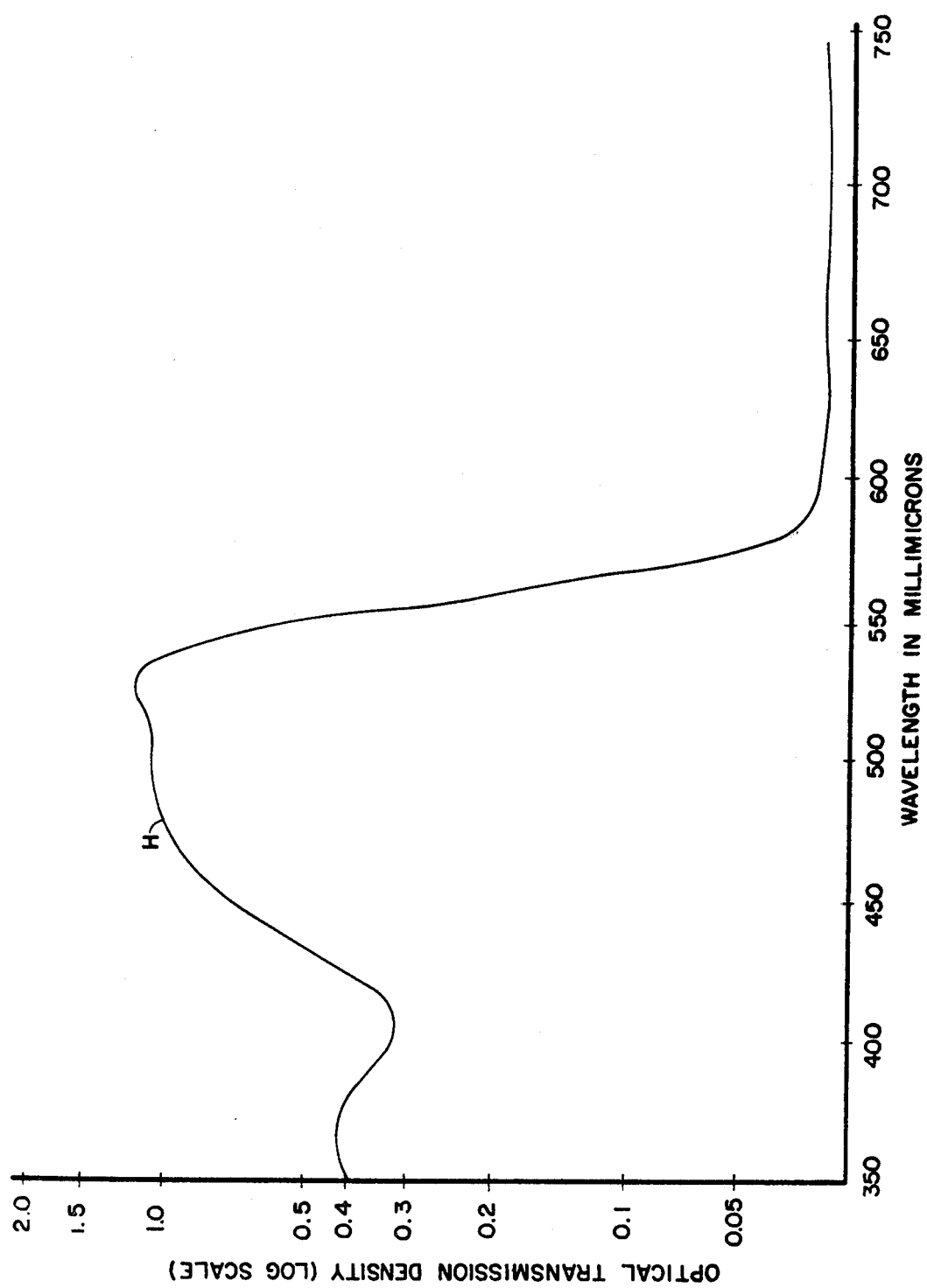
Figure 13:
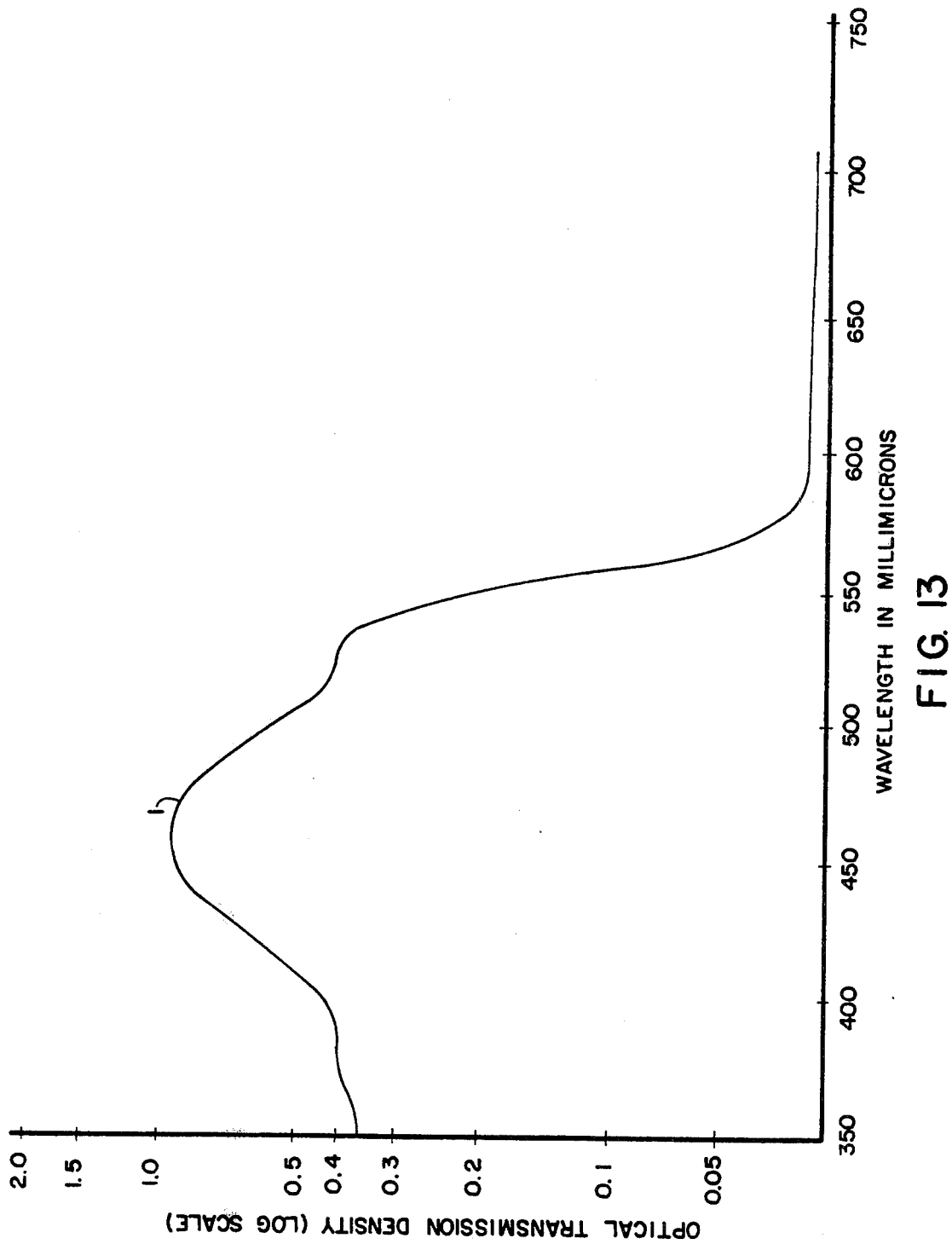
Figure 14:
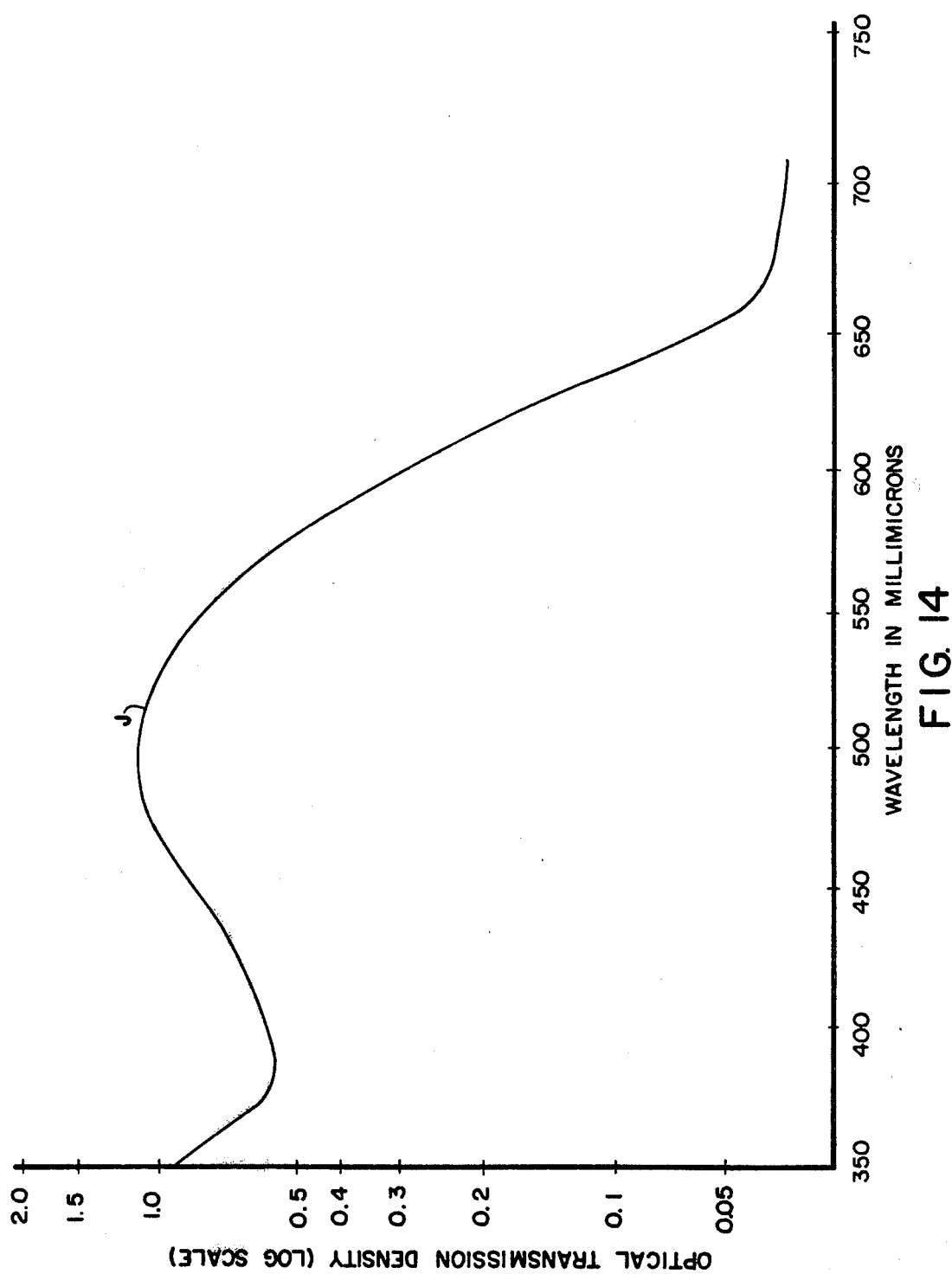
Figure 15:
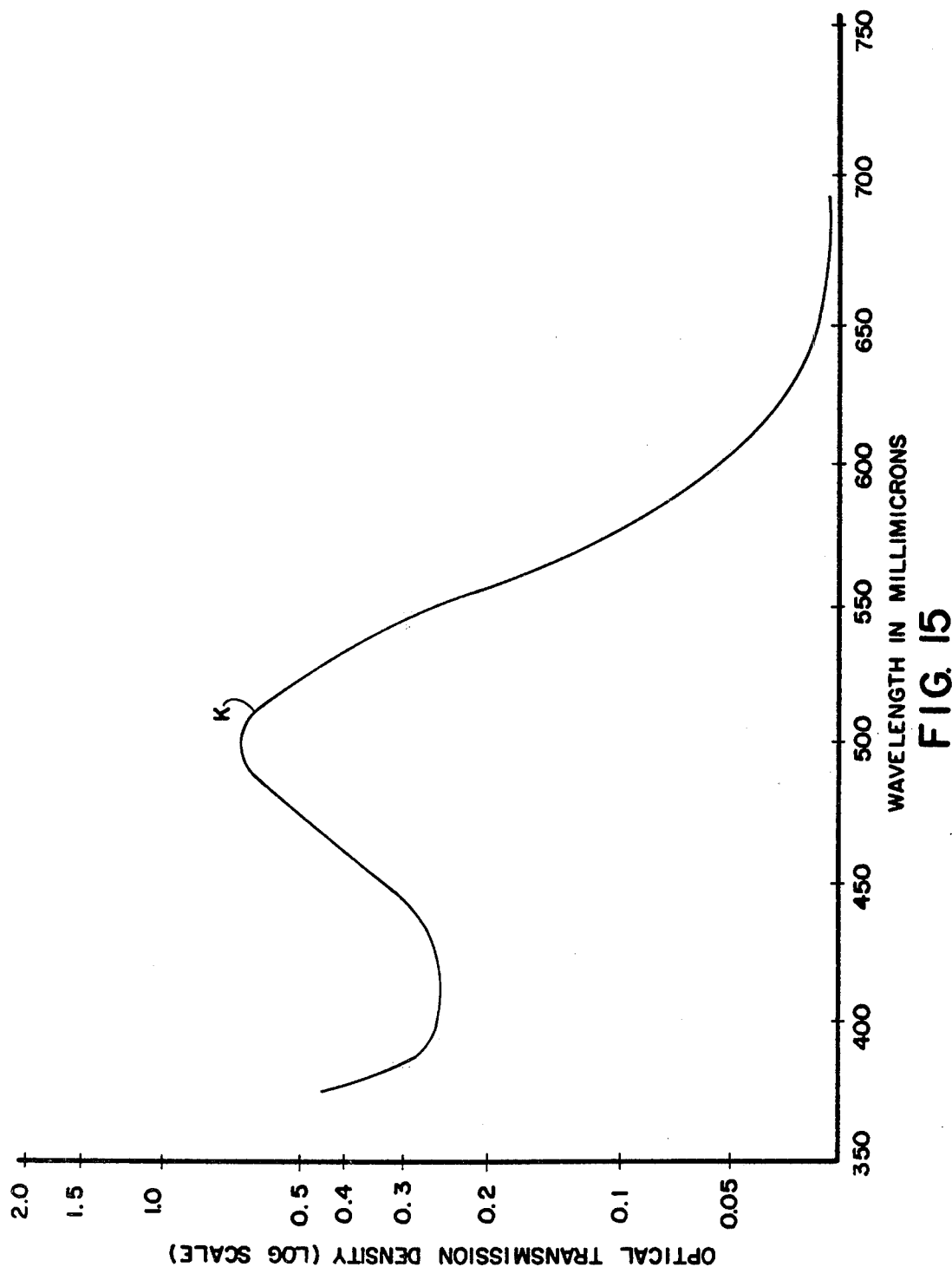

The spectral absorption characteristics of the optical filter agents denoted A, B, and C used in the first test embodiment and the spectral absorption characteristics of the optical filter agents denoted D and E used in the second test embodiment are graphically illustrated in FIGS. 8 and 9 respectively, wherein the curves represent the optical transmission density, i.e., absorbance of the respective agents at a pH substantially above their respective pKa. In these Figures, the curves denoted A and D represent optical filter agents of the present invention for absorbing shorter wavelength radiation shown in Formulae (6) and (24), respectively.

FIGS. 10 to 18 similarly are graphic illustrations of the spectral characteristics of other optical filter agents of the present invention useful in absorbing radiation in the shorter wavelength region of the visible spectrum which compounds are set forth in Formulae (2), (11), (13), (14), (17), (20), (48), (78) and (127), respectively, denoted in these Figures by letters F through N, respectively.

The optical filter agents A, D and F through N are substantially colorless, i.e., non-light absorbing at a pH substantially below their respective pKa as observed from optical reflection density measurements of processing compositions, such as those detailed above, with and without optical filter agent. Specifically, it has been observed that the optical reflection density of a processing composition containing optical filter agent in its colorless form is substantially the same as the optical reflection density of the processing composition without filter agent added.

Figure 16:
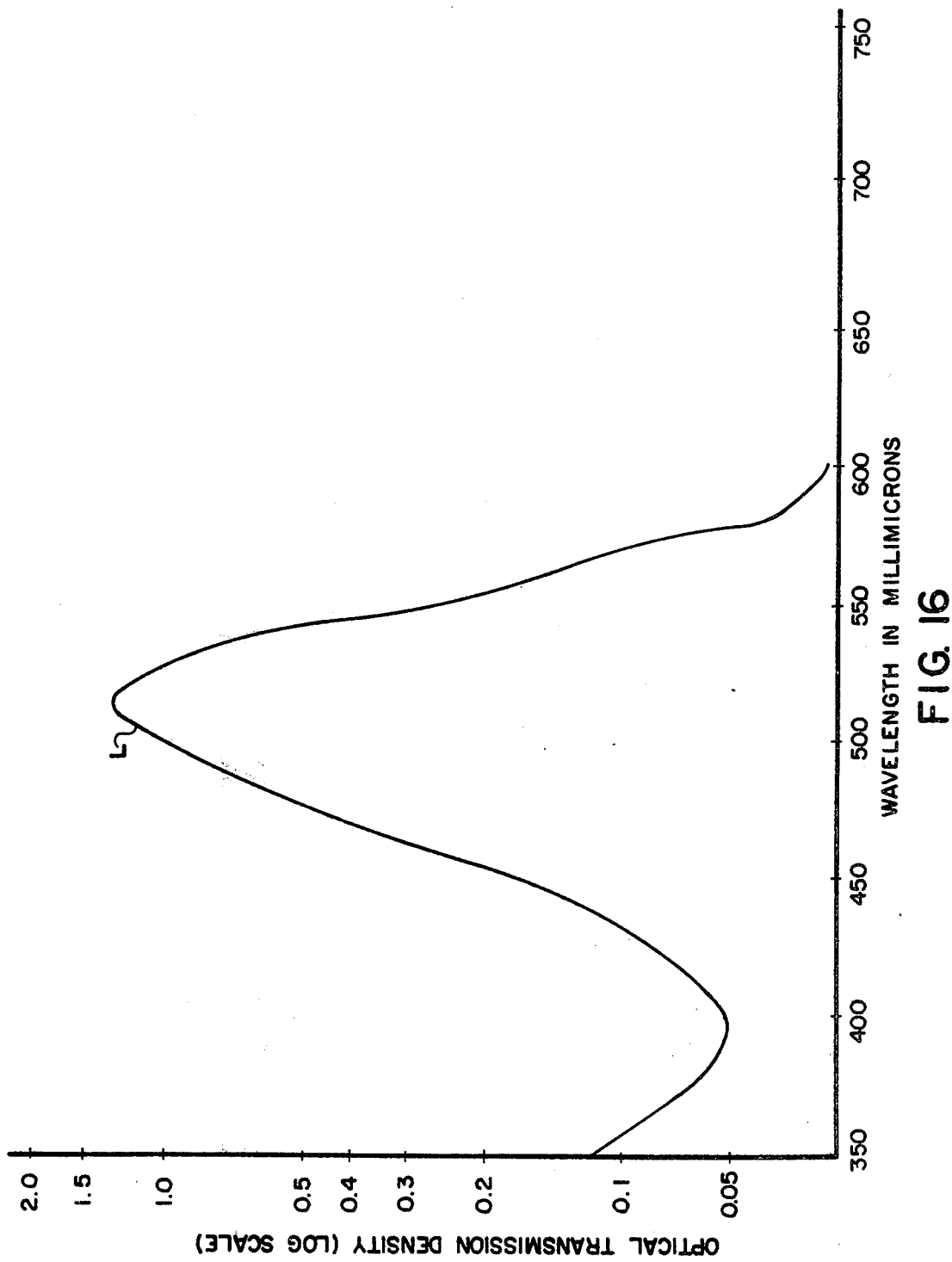
Figure 17:
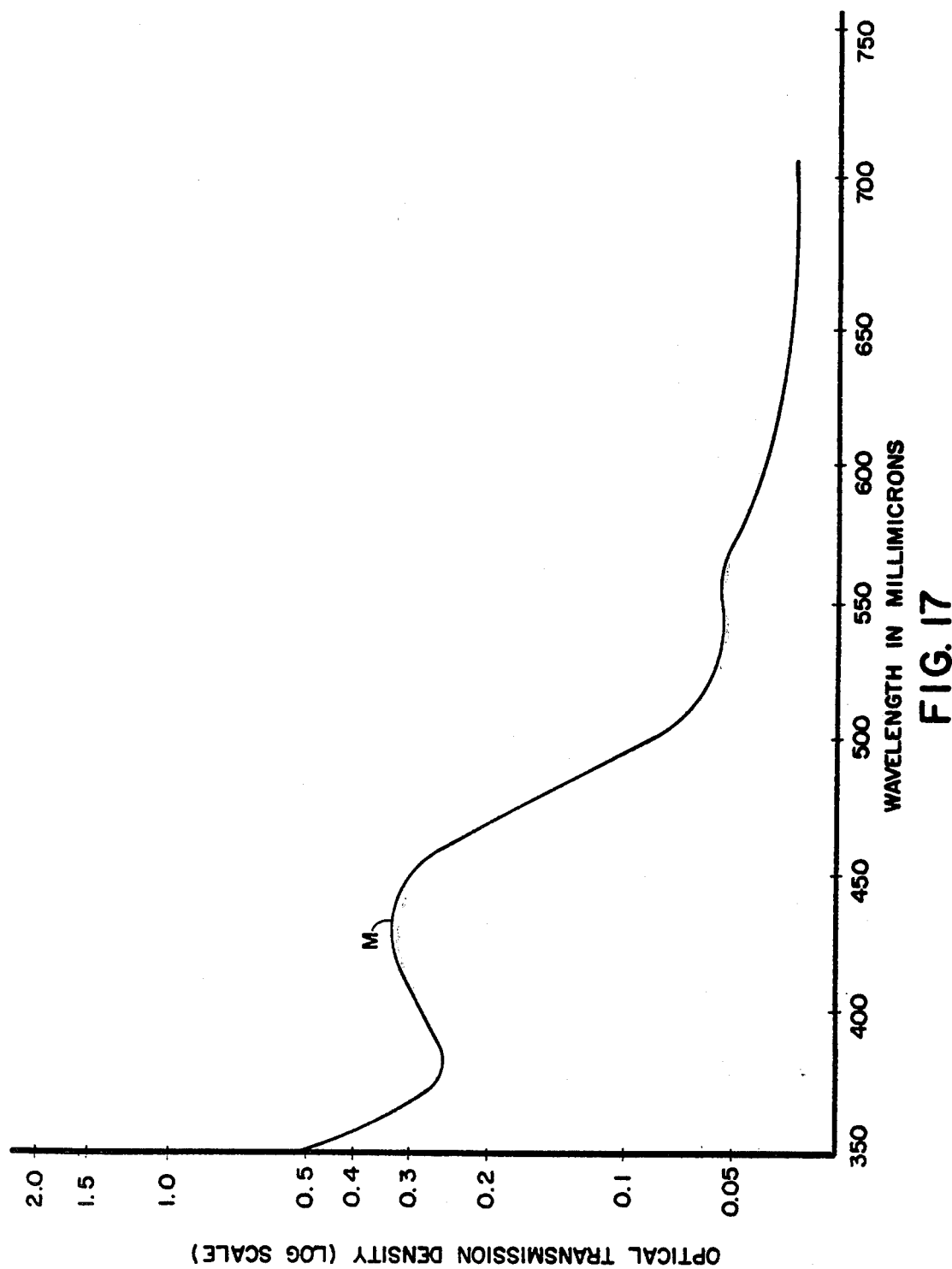
Figure 18:
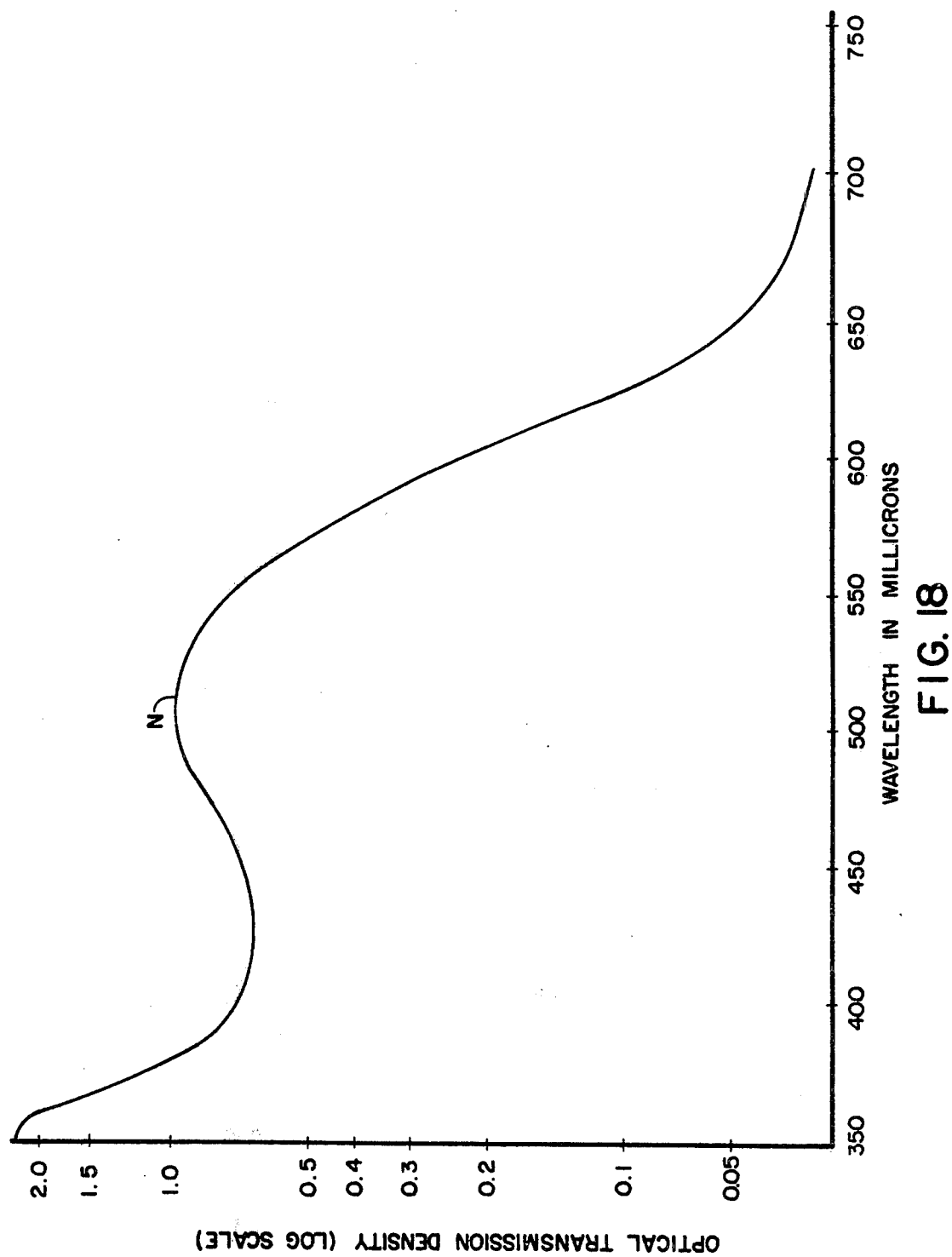

Of the optical filter agents illustrated above, those denoted A, D and F through K are novel indicator dyes derived from indoles as represented in Formulae (III) and (IV) above of the preferred embodiment. These indicator dyes contain an indol-3-yl radical possessing a hydrogen-bonding group substituted on a carbon atom adjacent to the nitrogen atom of the indole ring; a second indol-3-yl radical which preferably also is substituted with a hydrogen-bonding group adjacent the nitrogen atom or with an electron-withdrawing group in the 5-position; and a ring-closing moiety selected from a phthalide and a naphthalide. These dyes possess a relatively broad absorption spectrum as compared to simple indole phthaleins, for example, indole phthalein itself denoted L as illustrated in FIG. 16. Besides a broader spectrum, these dyes are colored at a higher pH which render them useful in photographic processes employing in highly alkaline media.

For example, simple indole phthaleins such as 3,3-bis-(2-phenylindol-3-yl) phthalide and 3,3-bis-(2-methylindol-3-yl) phthalide possess a lower pKa of 9.0 and 9.7, respectively. In comparison, indole phthaleins substituted with hydrogen-bonding groups or a hydrogen-bonding and an electron-withdrawing group such as optical filter agents A, F, J and K above possess a pKa of 11.7; 12.8; 12.9; and 13.4, respectively.

In the preferred embodiment, the pH and solvent concentration of the alkaline processing solution initially employed should possess a pH above the pKa of the indole dye and other optical filter agent, that is, the pH at which about 50% of the agents are present as the lesser absorbing species and about 50% are present as the greater absorbing species, preferably a pKa of > ~ 11 and most preferably > ~ 12 and a pH at which the dye developers employed are soluble and diffusible. Although it has been found that the specific pH to be employed may be readily determined empirically for any dye developer and optical filter agent, or group of dye developers and filter agents, most particularly desirable dye developers are soluble at pH's above 9 and relatively insoluble at pH's below 9, in reduced form, and relatively insoluble at substantially any alkaline pH, in oxidized form, and the system can be readily balanced accordingly for such dye developers. In addition, although as previously noted, the processing composition, in the preferred embodiment, will include the stated film-forming viscosity-increasing agent, or agents, to facilitate spreading of the composition and to provide maintenance of the spread composition as a structurally stable layer of the laminate, subsequent to distribution, it is not necessary that such agent be employed as a component of the composition.

Means for modulating pH, for example, a stratum containing a suitable acid, preferably a nondiffusible acid and more preferably a polymeric acid will be incorporated to provide reduction of the alkalinity of the processing solution from a pH above the pKa of the optical filter agent selected at which the dyes are soluble to a pH below the pKa of the agent at which the dyes are substantially nondiffusible, in order to advantageously further stabilize and optimize reflectivity of the dye transfer image. In such instance, the neutralizing layer may comprise particulate acid reacting reagent disposed within the film unit or a polymeric acid layer, for example, a polymeric acid layer approximating 0.3 to 1.5 mils. in thickness, positioned intermediate the transparent support and image-receiving layer, and/or the opaque support and next adjacent emulsion/dye unit layer, and the film unit may also contain a polymeric spacer or barrier layer, for example, approximating 0.1 to 0.7 mil. in thickness, next adjacent the polymeric acid layer, opposite the respective support layer, as previously described.

Specifically, the film units may employ the presence of a polymeric acid layer such as, for example, of the type set forth in U.S. Pat. No. 3,362,819 which, most preferably, includes the presence of an inert timing or spacer layer intermediate the polymeric acid layer carried on a support and the image-receiving layer.

As set forth in the last-mentioned patent, the polymeric acid layer may comprise polymers which contain acid groups, such as carboxylic acid and sulfonic acid groups, which are capable of forming salts with alkali metals, such as sodium, potassium, etc., or with organic bases, particularly quaternary ammonium bases, such as tetramethyl ammonium hydroxide, or potentially acid-yielding groups, such as anhydrides or lactones, or other groups which are capable of reacting with bases to capture and retain them. The acid-reacting group is, of course, retained in the polymer layer. In the preferred embodiments disclosed, the polymer contains free carboxyl groups and the processing composition employed contains a large concentration of sodium and/or potassium ions. The acid polymers stated to be most useful are characterized by containing free carboxyl groups, being insoluble in water in the free acid form, and by forming water-soluble sodium and/or potassium salts. One may also employ polymers containing carboxylic acid anhydride groups, at least some of which preferably have been converted to free carboxyl groups prior to imbibition. While the most readily available polymeric acids are derivatives of cellulose or of vinyl polymers, polymeric acids from other classes of polymers may be used. As examples of specific polymeric acids set forth in said patent, mention may be made of dibasic acid half-ester derivatives of cellulose which derivatives contain free carboxyl groups, e.g., cellulose acetate hydogen phthalate, cellulose acetate hydrogen glutarate, cellulose acetate hydrogen succinate, ethyl cellulose hydrogen succinate, ethyl cellulose acetate hydrogen succinate, cellulose acetate hydrogen succinate hydrogen phthalate; ether and ester derivatives or cellulose modified with sulfoanhydrides, e.g., with ortho-sulfobenzoic anhydride; polystyrene sulfonic acid; carboxymethyl cellulose; polyvinyl hydrogen phthalate; polyvinyl acetate hydrogen phthalate; polyacrylic acid; acetals of polyvinyl alcohol with carboxy or sulfo substituted aldehydes, e.g., o-, m-, or p-benzaldehyde sulfonic acid or carboxylic acid; partial esters of ethylene/maleic anhydride copolymers; partial esters of methyl-vinyl ether/maleic anhydride copolymers; etc.

The acid polymer layer should contain at least sufficient acid groups to effect a reduction in the pH of the image layer from a pH of about 12 to 14 to a predetermined pH, e.g., 11 or lower, to a pH of about 5 to 8 within a short time. The "predetermined pH" is a function of the processing time required to form the desired image after which point pH reduction aids in terminating further photographic processing, the time period after which light protection is not required, and the pH at which the optical filter agent's color is discharged.

It is, of course, necessary that the action of the polymeric acid be so controlled as not to interfere with either development of the negative or image transfer. For this reason, the pH of the image layer is kept at a level of pH 12 to 14 until the dye image has been formed after which the pH is reduced very rapidly to at least about pH 11, and preferably about pH 9 to 10. Unoxidized dye developers containing hydroquinonyl developing radicals diffuse from the negative to the positive as the sodium or other alkali salt. The diffusion rate of such dye image-forming components thus is at least partly a function of the alkali concentration, and it is necessary that the pH of the image layer remain on the order of 12 to 14 until transfer of the necessary quantity of dye has been accomplished. The subsequent pH reduction, in addition to its desirable effect upon image light stability, serves a highly valuable photographic function by substantially terminating further dye transfer. The processing technique thus effectively minimizes changes in image quality, e.g, color balance, as a result of the photosensitive element remaining laminated to the image-receiving layer.

In order to prevent premature pH reduction during transfer processing, as evidenced, for example, by an undesired reduction in positive image density or premature discharge of the optical filter agent, the acid groups are so distributed in the acid polymer layer that the rate of their availability to the alkali is controllable, e.g., as a function of the rate of swelling of the polymer layer which rate in turn has a direct relationship to the diffusion rate of the alkali ions. The desired distribution of the acid groups in the acid polymer layer may be effected by mixing the acid polymer with a polymer free of acid groups, or lower in concentration of acid groups, and compatible therewith, or by using only the acid polymer but selecting one having a relatively lower proportion of acid groups. These embodiments are illustrated, respectively, in the cited patent, by (a) a mixture of cellulose acetate hydrogen phthalate and (b) a cellulose acetate hydrogen phthalate polymer having a much lower percentage of phthalyl groups than the first-mentioned cellulose acetate hydrogen phthalate.

The layer containing the polymeric acid may contain a water-insoluble polymer, preferably a cellulose ester, which acts to control or modulate the rate at which the alkali salt of the polymer acid is formed. As examples of cellulose esters contemplated for use, mention is made of cellulose acetate, cellulose acetate butyrate, etc. The particular polymers and combinations of polymers employed in any given embodiment are, of course, selected so as to have adequate wet and dry strength and when necessary or desirable, suitable subcoats may be employed to help the various polymeric layers adhere to each other during storage and use.

The inert spacer layer, for example, an inert spacer layer comprising polyvinyl alcohol or gelatin, acts to "time" control the pH reduction by the polymeric acid layer. This timing is disclosed to be a function of the rate at which the alkali diffuses through the inert spacer layer. It was stated to have been found that the pH does not drop until the alkali has passed through the spacer layer, i.e., the pH is not reduced to any significant extent by the mere diffusion into the interlayer, but the pH drops quite rapidly once the alkali diffuses through the spacer layer.

As disclosed in said U.S. Pat. No. 3,362,819 the presence of an inert spacer layer was found to be effective in evening out the various reaction rates over a wide range of temperatures, for example, by preventing premature pH reduction when imbibition is effected at temperatures above room temperature, for example, at 95° to 100° F. By providing an inert spacer layer, that application discloses that the rate at which alkali is available for capture in the polymeric acid layer becomes a function of the alkali diffusion rates.

However, as disclosed in U.S. Pat. No. 3,455,686 issued July 15, 1969 in the names of Leonard C. Farney, Howard G. Rogers and Richard W. Young, preferably the aforementioned rate at which the cations of the alkaline processing composition, i.e., alkali ions, are available for capture in the polymeric acid layer should be decreased with increasing transfer processing temperatures in order to provide diffusion transfer color processes relatively independent of positive transfer image variations over an extended range of ambient temperatures.

Specifically, it is there stated to have been found that the diffusion rate of alkali through a permeable inert polymeric spacer layer increases with increased processing temperature to the extent, for example, that at relatively high transfer processing temperatures, that is, transfer processing temperatures above approximately 80° F., a premature decrease in the pH of the transfer processing composition occurs due, at least in part, to the rapid diffusion of alkali from the dye transfer environment and its subsequent neutralization upon contact with the polymeric acid layer. This was stated to be especially true of alkali traversing an inert spacer layer possessing permeability to alkali optimized to be effective within the temperature range of optimum transfer processing. Conversely, at temperatures below the optimum transfer processing range, for example, temperatures below approximately 40° F., the last-mentioned inert spacer layer was disclosed to provide an effective diffusion barrier timewise preventing effective traverse of the inert spacer layer by alkali having temperature depressed diffusion rates and to result in maintenance of the transfer processing environment's high pH for such an extended time interval as to facilitate formation of transfer image stain and its resultant degradation of the positive transfer images' color definition.

It is further stated in the last-mentioned U.S. Pat. No. 3,455,686 to have been found, however that if the inert spacer layer of the print-receiving element is replaced by a spacer layer which comprises a permeable polymeric layer exhibiting permeability inversely dependent on temperature, that is, a polymeric film-forming material which exhibits decreasing permeability to solubilized alkali derived cations such as alkali metal and quaternary ammonium ions under conditions of increasing temperature, that the positive transfer image defects resultant from the aforementioned overextended pH maintenance and/or premature pH reduction are obviated.

As examples of polymers which were disclosed to exhibit inverse temperature-dependent permeability to alkali, mention may be made of: hydroxypropyl polyvinyl alcohol, polyvinyl methyl ether, polyethylene oxide, polyvinyl oxazolidinone, hydroxypropyl methyl cellulose, isopropyl cellulose, partial acetals of polyvinyl alcohol such as partial polyvinyl butyral, partial polyvinyl formal, partial polyvinyl acetal, partial polyvinyl propional, and the like.

The last-mentioned specified acetals of polyvinyl were stated to generally comprise saturated aliphatic hydrocarbon chains of a molecular weight of at least 1000, preferably of about 1000 to 50,000, possessing a degree of acetalation within about 10 to 30%, 10 to 30%, 20 to 80%, and 10 to 40%, of the polyvinyl alcohol's theoretical polymeric hydroxyl groups, respectively, and including mixed acetals where desired.

Where desired, a mixture of the polymers is to be employed, for example, a mixture of hydroxypropyl methyl cellulose and partial polyvinyl butyral.

The dimensionally stable support layers referred to may comprise any of the various types of conventional opaque and transparent rigid or flexible materials possessing the requisite liquid impermeability and vapor transmissivity denoted above, and may comprise polymeric films of both synthetic types and those derived from naturally occurring products. Particularly suitable materials include aqueous alkaline solution impermeable, water vapor permeable, flexible polymeric materials such as vapor permeable polymeric films derived from ethylene glycol terephthalic acid, vinyl chloride polymers; polyvinyl acetate; polyamides; polymethacrylic acid methyl and ethyl esters; cellulose derivatives such as cellulose, acetate, triacetate, nitrate, propionate, butyrate, acetate-propionate, or acetate-butyrate; alkaline solution impermeable, water vapor permeable papers; crosslinked polyvinyl alcohol; regenerated cellulose; and the like.

As examples of materials, for use as the image-receiving layer, mention may be made of solution dyeable polymers such as nylon as, for example, N-methoxymethyl polyhexamethylene adipamide; partially hydrolyzed polyvinyl acetate; polyvinyl alcohol with or without plasticizers; cellulose acetate with filler as, for example, one-half cellulose acetate and one-half oleic acid; gelatin; and other materials of a similar nature. Preferred materials comprise polyvinyl alcohol or gelatin containing a dye mordant such as poly-4-vinylpyridine, as disclosed in U.S. Pat. No. 3,148,061, issued Sept. 8, 1964.

It will be noted that the liquid processing composition employed may contain an auxiliary or accelerating developing agent, such as p-methylaminophenol, 2,4-diaminophenol, p-benzylaminophenol, hydroquinone, toluhydroquinone, phenylhydroquinone, 4'-methylphenylhydroquinone, etc. It is also contemplated to employ a plurality of auxiliary or accelerating developing agents, such as a 3-pyrazolidone developing agent and a benzenoid developing agent, as disclosed in U.S. Pat. No. 3,039,869, issued June 19, 1962. As examples of suitable combinations of auxiliary developing agents, mention may be made of 1-phenyl-3-pyrazolidone in combination with p-benzylaminophenol and 1-phenyl-3-pyrazolidone in combination with 2,5-bis-ethylenimino-hydroquinone. Such auxiliary developing agents may be employed in the liquid processing composition or they may be initially incorporated, at least in part, in any one or more of the silver halide emulsion strata, the strata containing the dye developers, the interlayers, the overcoat layer, the image-receiving layer, or in any other auxiliary layer, or layers, of the film unit. It may be noted that at least a portion of the dye developer oxidized during development may be oxidized and immobilized as a result of a reaction, e.g., an energy-transfer reaction, with the oxidiation product of an oxidized auxiliary developing agent, the latter developing agent being oxidized by the development of exposed silver halide. Such a reaction of oxidized developing agent with unoxidized dye developer would regenerate the auxiliary developing agent for further reaction with the exposed silver halide.

In addition, development may be effected in the presence of an onium compound, particularly a quaternary ammonium compound, in accordance with the processes disclosed in U.S. Pat. No. 3,173,786, issued Mar. 16, 1965.

It will be apparent that the relative proportions of the agents of the diffusion transfer processing composition may be altered to suit the requirements of the operator. Thus, it is within the scope of this invention to modify the herein described developing compositions by the substitution of preservatives, alkalies, etc., other than those specifically mentioned, provided that the pH of the composition is initially at the first pH and solvent concentration required. When desirable, it is also contemplated to include, in the developing composition, components such as restrainers, accelerators, etc. Similarly, the concentration of various components may be varied over a wide range and when desirable adaptable components may be disposed in the photosensitive element, prior to exposure, in a separate permeable layer of the photosensitive element and/or in the photosensitive emulsion.

An extensive compilation of specific dye developers particularly adapted for employment in photographic diffusion transfer processes is set forth in aforementioned U.S. Pat. No. 2,983,606 and in the various copending U.S. applications referred to in that patent, especially in the table of U.S. applications incorporated by reference into the patent as detailed in column 27. As examples of additional U.S. patents detailing specific dye developers for photographic transfer process use, mention may also be made of U.S. Pat. Nos. 2,983,605; 2,992,106; 3,047,386; 3,076,808; 3,076,820; 3,077,402; 3,126,280; 3,131,061; 3,134,762; 3,134,765; 3,135,604; 3,135,605; 3,135,606; 3,135,734; 3,141,772; 3,142,565; and the like.

As additional examples of synthetic, film-forming, permeable polymers particularly adapted to retain dispersed dye developer, mention may be made of nitrocarboxymethyl cellulose, as disclosed in U.S. Pat. No. 2,992,104; an acylamidobenzene sulfo ester of a partial sulfobenzal of polyvinyl alcohol, as disclosed in U.S. Pat. No. 3,043,692; polymers of N-alkyl-$\alpha,\beta$-unsaturated carboxamides and copolymers of N-alkyl-$\alpha,\beta$-carboxamides with N-hydroxyalkyl-$\alpha,\beta$-unsaturated carboxamides, as disclosed in U.S. Pat. No. 3,069,263; copolymers of vinylphthalimide and $\alpha,\beta$-unsaturated carboxylic acids, as disclosed in U.S. Pat. No. 3,061,428; copolymers of N-vinylpyrrolidones and $\alpha,\beta$-unsaturated carboxylic acids and terpolymers of N-vinylpyrrolidones, $\alpha,\beta$-unsaturated carboxylic acids and alkyl esters of $\alpha,\beta$-unsaturated carboxylic acids, as disclosed in U.S. Pat. No. 3,044,873; copolymers of N,N-dialkyl-$\alpha,\beta$-unsaturated carboxamides with $\alpha,\beta$-unsaturated carboxylic acids, the corresponding amides of such acids, and copolymers of N-aryl- and N-cycloalkyl-$\alpha,\beta$-unsaturated carboxamides with $\alpha,\beta$-unsaturated carboxylic acids, as disclosed in U.S. Pat. No. 3,069,296; and the like.

In addition to conventional techniques for the direct dispersion of a particulate solid material in a polymeric, or colloidal, matrix such as ball-milling and the like techniques, the preparation of the dye developer dispersion may also be obtained by dissolving the dye in an appropriate solvent, or mixture of solvents, and the resultant solution distributed in the polymeric binder, with optional subsequent removal of the solvent, or solvents, employed, as, for example, by vaporization where the selected solvent, or solvents, possesses a sufficiently low boiling point or washing where the selected solvent, or solvents, possesses a sufficiently high differential solubility in the wash medium, for example, water, when measured against the solubility of the remaining composition components, and/or obtained by dissolving both the polymeric binder and dye in a common solvent.

For further detailed treatment of solvent distribution systems of the types referred to above, and for an extensive compilation of the conventional solvents traditionally employed in the art to effect distribution of photographic color-providing materials in polymeric binders, specifically for the formation component layers of photographic film units, reference may be made to U.S. Pat. Nos. 2,269,158; 2,322,027; 2,304,939; 2,304,940; 2,801,171; and the like.

This invention is applicable to a wide variety of photographic processes as will be readily apparent to one skilled in the art. Dye developers are preferred image-providing substances, as indicated above, and constitute an example of initially diffusible dye image-providing substances. Other useful dye image-providing substances include initially diffusible dyes useful as image dyes per se and which couple with the oxidation product of a silver halide developing agent to provide a non-diffusible product, initially diffusible color couplers which couple with the oxidation product of a silver halide developing agent to provide image dyes, initially non-diffusible dyes which couple with the oxidation product of a silver halide developing agent to release a diffusible dye useful as an image dye per se, and initially non-diffusible dyes which upon oxidation undergo an intramolecular ring closure to release a diffusible dye useful as an image dye per se. The final image may be formed as a result of the diffusion transfer of a soluble complex of undeveloped silver halide, in which event the image may be in silver or the transferred silver halide complex may be utilized as an intermediate in the formation of an image in dye, e.g., by using the transferred silver to catalyze the bleaching of a dye thus providing an image in terms of unreacted dye. Alternatively, the transferred silver halide complex may be used to cause an initially nondiffusibile coupling dye or ring-closing dye to undergo reaction to provide diffusible products which are removed from the image layer by diffusion to provide an image in terms of unreacted dye. For example, there may be employed dye image-forming materials such as those disclosed in U.S. Pat. Nos. 2,647,049; 2,661,293; 2,698,244; 2,698,798; 2,802,735; 3,148,062; 3,227,550; 3,227,551; 3,227,552; 3,227,554; 3,243,294; 3,330,655; 3,347,671; 3,352,672; 3,364,022; 3,443,939; 3,443,940; 3,443,941; 3,443,943 and 3,445,228, wherein diffusion transfer processes are described which employ color coupling techniques comprising, at least in part, reacting one or more color developing agents and one or more color formers or couplers to provide a dye transfer image to a superposed image-receiving layer and those disclosed in U.S. Pat. Nos. 2,774,668 and 3,087,817, wherein color diffusion transfer processes are described which employ the imagewise differential transfer of complete dyes by the mechanisms therein described to provide a transfer dye image to a contiguous image-receiving layer, and thus including the employment of image-providing materials in whole or in part initially insoluble or nondiffusible as disposed in the film unit which diffuse during processing as a direct or indirect function of exposure.

For the production of the photosensitive gelatino silver halide emulsions employed to provide the film unit, the silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant water-soluble salts by chilling the dispersion, noodling the set dispersion, and washing the noodles with cold water, or alternatively, employing any of the various flocc systems, or procedures, adapted to effect removal of undesired components, for example, the procedures described in U.S. Pat. Nos. 2,614,928; 2,614,929; 2,728,662; and the like; after-ripening the dispersion at an elevated temperature in combination with the addition of gelatin and various adjuncts, for example, chemical sensitizing agents of U.S. Pat. Nos. 1,574,944; 1,623,499; 2,410,689; 2,597,856; 2,597,915; 2,487,850; 2,518,698; 2,521,926; and the like; all according to the traditional procedures of the art, as described in Neblette, C. B., *Photography Its Materials and Processes*, 6th Ed., 1962.

Optical sensitization of the emulsion's silver halide crystals may be accomplished by contact of the emulsion composition with an effective concentration of the selected optical sensitizing dyes dissolved in an appropriate dispersing solvent such as methanol, ethanol, acetone, water, and the like; all according to the traditional procedures of the art, as described Hamer, F. M., *The Cyanine Dyes and Related Compounds*.

Additional optional additives, such as coating aids, hardeners, viscosity-increasing agents, stabilizers, preservatives, and the like, for example, those set forth hereinafter, also may be incorporated in the emulsion formulation, according to the conventional procedures known in the photographic emulsion manufacturing art.

The photoresponsive material of the photographic emulsion will, as previously described, preferably comprise a crystal of silver, for example, one or more of the silver halides such as silver chloride, silver iodide, silver bromide, or mixed silver halides such as silver chlorobromide, silver chloroiodobromide or silver iodobromide, of varying halide ratios and varying silver concentrations. However, other photosensitive materials which are functional equivalents may be employed in an emulsion or in binderless layers.

As the binder for the respective emulsion strata, the aforementioned gelatin may be, in whole or in part, replaced with some other colloidal material such as albumin; casein; or zein; or resins such as a cellulose derivatives, as described in U.S. Pat. Nos. 2,322,085 and 2,327,808; polyacrylamides, as described in U.S. Pat. No. 2,541,474; vinyl polymers such as described in an extensive multiplicity of readily available U.S. and foreign patents.

In preferred embodiments of the present invention, the photosensitive silver halide emulsions employed will be emulsions adapted to provide a Diffusion Transfer Process Exposure Index $> \sim 50$, which Index indicates the correct exposure rating of a diffusion transfer color process at which an exposure meter, calibrated to the ASA Exposure Index, must be set in order that it give correct exposure data for producing color transfer prints of satisfactorily high quality. The Diffusion Transfer Process Exposure Index is based on a characteristic H&D curve relating original exposure of the photosensitive silver halide emulsions to the respective curve densities forming the resultant transfer image. Thus, the Diffusion Transfer Exposure Index is based on the exposure to which the photosensitive silver halide emulsions, for use in color diffusion transfer processes, must be subjected in order to obtain an acceptable color transfer image by that process and is a direct guide to the exposure setting to be entered in a camera in order to obtain proper exposure of the film unit.

Although the preceding description of the invention has been couched in terms of the preferred photosensitive component construction wherein at least two selectively sensitized photosensitive strata are in contiguous coplanar relationship and, specifically, in terms of the preferred tripack type structure comprising a red-sensitive silver halide emulsion stratum, a green-sensitive silver halide emulsion stratum and a blue-sensitive silver halide emulsion stratum having associated therewith, respectively a cyan dye developer, a magenta dye developer and a yellow dye developer, the photosensitive component of the film unit may comprise at least two sets of selectively sensitized minute photosensitive elements arranged in the form of a photosensitive screen wherein each of the minute photosensitive elements has associated therewith, for example, an appropriate dye developer in or behind its respective silver halide emulsion portion. In general, a suitable photosensitive screen will comprise minute red-sensitized emulsion elements, minute green-sensitized emulsion elements and minute blue-sensitized emulsion elements arranged in side-by-side relationship in a screen pattern and having associated therewith, respectively, a cyan, a magenta and a yellow dye developer.

The present invention also includes the employment of a black dye developer and the use of a mixture of dye developers adapted to provide a black-and-white transfer image, for example, the employment of dye developers of the three subtractive colors in an appropriate mixture in which the quantities of the dye developers are proportioned such that the colors combine to provide black.

Where in the specification, the expression "positive image" has been used, this expression should not be interpreted in a restrictive sense since it is used primarily for purposes of illustration, in that it defines the image produced on the image-carrying layer as being reversed, in the positive-negative sense, with respect to the image in the photosensitive emulsion layers. As an example of an alternative meaning for "positive image", assume that the photosensitive element is exposed to actinic light through a negative transparency. In this case, the latent image in the photosensitive emulsion layers will be a positive and the dye image produced on the image-carrying layer will be a negative. The expression "positive image" is intended to cover such an image produced on the image-carrying layer.

It will be recognized that, by reason of the preferred film unit's structural parameters, the transfer image formed upon directed exposure of the film unit to a selected subject and processing, will be a geometrically reversed image of the subject. Accordingly, to provide transfer image formation geometrically nonreversed, exposure of such film unit should be accomplished through an image reversing optical system such a camera possessing an image reversing optical system.

In addition to the described essential layers, it will be recognized that the film unit may also contain one or more subcoats or layers, which, in turn, may contain one or more additives such as plasticizers, intermediate essential layers for the purpose, for example, of improving adhesion, and that any one or more of the described layers may comprise a composite of two or more strata of the same, or different, components and which may be contiguous, or separated from, each other, for example, two or more neutralizing layers or the like, one of which may be disposed intermediate the cyan dye image-forming component retaining layer and the dimensionally stable opaque layer.

While the acid-containing or neutralizing layer and spacer or timing layer have heretofore been described as being disposed between the image-receiving layer and the transparent support, this pH-reducing means may be disposed elsewhere in the film unit and may, for example, be disposed in the negative component, as is disclosed in the copending application of Edwin H. Land, Ser. No. 782,056, filed Dec. 9, 1968 and now U.S. Pat. No. 3,573,043.

Besides the composite photosensitive element described in the preferred embodiment, the indicator dyes of the present invention may be employed in composite photosensitive elements, in general, where the dyeable stratum along with any associated layers may be contained together with the photosensitive strata as a unitary film unit which may be termed an integral negative-positive film unit comprising a negative component including the aforementioned essential layers and a positive component including at least the dyeable stratum in which the color transfer image is to be formed. The essential layers are preferably contained on a transparent dimensionally stable layer or support member positioned closest to the dyeable stratum so that the resulting transfer image is viewable through this transparent layer. Most preferably another dimensionally stable layer which may be transparent or opaque is positioned on the opposed surface of the essential layers so that the aforementioned essential layers are sandwiched or confined between a pair of dimensionally stable layers or support members, at least one of which is transparent to permit viewing therethrough of a color transfer image obtained as a function of development of the exposed film unit in accordance with the known color diffusion transfer processes. It will be appreciated that all of these film units, like the specific one detailed above, may optionally contain other layers performing specific desired functions, e.g., spacer layers, pH-reducing layers, etc.

As examples of such integral negative-positive film units for preparing color transfer images viewable without separation are those described and claimed in aforementioned U.S. Pat. No. 3,415,644 and in U.S. Pat. Nos. 3,415,645 3,415,646 and 3,473,925; as well as those described in copending applications Ser. Nos. 782,056 filed Dec. 9, 1968 and now U.S. Pat. No. 3,473,043; 65,084 filed Aug. 19, 1970 and now U.S. Pat. No. 3,672,890 both in the name of Edwin H. Land; and Ser. Nos. 39,646 and 39,666 of Howard G. Rogers, filed May 22, 1970 and now U.S. Pat. Nos. 3,594,165 and 3,594,164, respectively.

In general, the film units of the foregoing description, e.g., those described in the aforementioned patents and/or copending applications, are exposed to form a developable image and thereafter developed by applying the appropriate processing composition to develop exposed silver halide and to form, as a function of development, an imagewise distribution of diffusible dye image-providing material which is transferred, at least in part by diffusion, to the dyeable stratum to impart thereto the desired color transfer image, e.g., a positive color transfer image. Common to all of these systems is the provision of a reflecting layer between the dyeable stratum and the photosensitive strata to mask effectively the latter and to provide a background for viewing the color image contained in the dyeable stratum, whereby this image is viewable without separation, from the other layers or elements of the film unit. In certain of these systems, this reflecting layer is provided prior to photoexposure, e.g., as a preformed layer included in the essential layers of the laminar structure comprising the film unit, and in others it is provided at some time thereafter, e.g., by including a suitable light-reflecting agent, for example, a white pigment such as titanium dioxide, in the processing composition. As an example of such a preformed layer, mention may be made of that disclosed in the copending applications of Edwin H. Land, Ser. Nos. 846,441, filed July 31, 1969 and now U.S. Pat. No. 3,615,421 and 3,645 filed Jan. 19, 1970 and now U.S. Pat. No. 3,620,724. The reflecting pigment may be generated in situ as is disclosed in the copending applications of Edwin H. Land, Ser. Nos. 43,741 and 43,742, both filed June 5, 1970 and now U.S. Pat. Nos. 3,647,434 and 3,647,435, respectively. In a particularly preferred form, such film units are employed in conjunction with a rupturable container, such as described above, containing the processing composition having the light-reflecting agent incorporated therein which container is adapted upon application of pressure of distributing its contents to develop the exposed film unit and to provide the light-reflecting layer.

As noted previously, the photographic use of the above described indole dyes as optical filter agents to prevent post-exposure fogging of a selectively exposed photosensitive sensitive material is not limited to diffusion transfer processes nor to such processes employing composite photosensitive elements. While the use of such dyes in composite multicolor diffusion transfer film units is a particularly preferred embodiment of the present invention, these dyes may be used with equally effective results in any photographic process where it is desired to protect a photosensitive material from incident radiation actinic to the photosensitive material within the wavelength range capable of being absorbed by the indole dye. For example, such indole dyes may be used in conventional tray photographic processing as a component of the processing bath, or they may be present in a layer coextensive with one or both surfaces of a layer of photosensitive material to be processed using conventional tray procedures, provided that they are non-light-absorbing prior to photoexposure and also subsequent to developing the latent image unless the layer containing the indole dye is to be removed subsequent to processing. In such procedures, the photoexposed photosensitive material will, of course, be transferred from the camera to the processing bath in the absence of radiation actinic to the material.

Such indole dyes also may be employed in diffusion transfer processes where the photosensitive and image-receiving elements are separated subsequent to the formation of a transfer image or where a spreader sheet is separated from the photosensitive element to reveal a final image in the negative. In addition to the composite diffusion transfer structures described above, the indole dyes may be used with composite diffusion transfer film units where the final image is to be viewed by transmitted light. Also they may be used in composite film units specifically adapted, for example, for forming a silver transfer image, for developing a negative silver image by monobath processing, for obtaining an additive color image, and for obtaining a dye image by the silver dye bleach process which structures are described in detail in aforementioned copending U.S. application Ser. No. 101,968, particularly with reference to FIGS. 10 to 13 of the application's drawings.

In view of the foregoing, it will be readily apparent that the indole dyes are useful generally in photographic processes for producing silver, monochromatic and multi-color images using any photosensitive material including conventional and direct positive silver halide emulsions. Depending upon the selected photosensitive material, one or more indole dyes may be used alone or in combination with another optical filter agent, such as another light-absorbing dye. Indole dyes may be selected that are adequate for protecting blue-sensitive and orthochromatic materials and with panchromatic materials are preferably used with another optical filter dye capable of absorbing radiation in the longer wavelength regions of the visible spectrum, which second dye may be non-color-changing or another pH sensitive dye.

As noted above, when composite film structures are employed, the indole dye(s) employed may be initially present in the film structure and/or applied with the processing solution and may be rendered ineffective to permit viewing of the final image subsequent to processing by modulation of the pH and/or by mordanting in a layer out of view. If the selected indole dye does not possess the desired stability in the processing composition for long term storage therein, it may be initially disposed in the film structure or stored in a double-compartmented pod or in one of two associated pods separate from the processing solution until such time as the pod(s) are ruptured whereupon the dye is admixed with the processing solution. The present invention, however, offers a selection of dyes useful in acidic, neutral and alkaline media and which are stable therein. Though the composite film structures have been described for use with alkaline processing media so that the pH modulating means is an acid-reacting reagent, it will be appreciated that an alkaline-reacting reagent would be substituted, therefore, when acidic or neutral compositions are used for processing and it is desired to make the compositions more alkaline to discharge the color of the optical filter dyes.

The indicator dyes as represented in Formulae (III) and (IV) above which find particular utility in highly alkaline processing media comprise the subject matter of the present invention. Their use as optical filter agents for protecting photosensitive materials from radiation in the shorter wavelength region of the visible spectrum forms the subject matter of U.S. Patent application Ser. No. 108,260 filed Jan. 21, 1971 and now U.S. Pat. No. 3,702,244.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A compound of the formula:

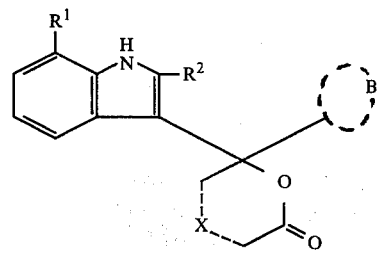

wherein one of $R^1$ and $R^2$ is a hydrogen-bonding group selected from carboxy, —$NHSO_2R'''$ wherein $R'''$ is selected from alkyl having 1 to 20 carbon atoms, phenyl, naphthyl, phenyl-substituted alkyl having up to 18 carbon atoms and alkyl-substituted phenyl having up to 18 carbon atoms, —$SO_2NHR''''$ wherein $R''''$ has the same meaning as given for $R'''$ and o-hydroxyphenyl, said o-hydroxyphenyl being unsubstituted or substituted in one of the 4- or 5-positions with alkoxy containing 1 to 12 carbon atoms, and the other is hydrogen; B is an indol-3-yl radical,

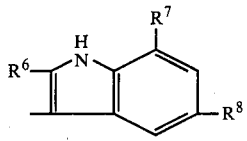

wherein $R^6$ and $R^7$ each are selected from hydrogen, methoxy, carboxy, —$NHSO_2R'''$ wherein $R'''$ has the same meaning given above, —$SO_2NHR''''$ wherein $R''''$ has the same meaning given above and o-hydroxyphenyl, said o-hydroxyphenyl being unsubstitued or substituted in one of the 4- or 5-positions with alkoxy containing 1 to 12 carbon atoms, at least one of $R^6$ and $R^7$ being hydrogen; $R^8$ is selected from hydrogen, carboxy, cyano, halo, and alkoxy having 1 to 12 carbon atoms; and X represents the atoms necessary to complete a ring-closing moiety selected from phthalide and naphthalide, said ring-closing moiety being unsubstituted.

2. A compound as defined in claim 1 wherein $R^1$ is a hydrogen-bonding group and $R^2$ is hydrogen.

3. A compound as defined in claim 1 wherein $R^2$ is a hydrogen-bonding group and $R^1$ is hydrogen.

4. A compound as defined in claim 1 wherein X represents phthalide.

5. A compound as defined in claim 1 wherein X represents naphthalide.

6. A compound as defined in claim 4 wherein $R^1$ is hydrogen; $R^2$ is o-hydroxyphenyl and X is phthalide.

7. A compound as defined in claim 6 wherein said $R^6$, $R^7$ and $R^8$ each are hydrogen.

8. A compound as defined in claim 6 wherein $R^6$ and $R^7$ each are hydrogen and $R^8$ is alkoxy.

9. A compound of the formula

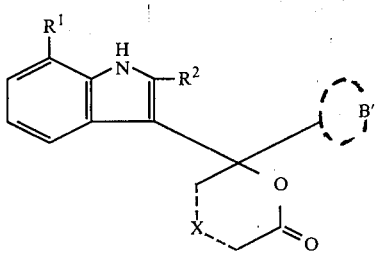

wherein one of $R^1$ and $R^2$ is a hydrogen-bonding group selected from carboxy, —$NHSO_2R'''$ wherein $R'''$ is selected from alkyl having 1 to 20 carbon atoms, phenyl, naphthyl, phenyl-substituted alkyl having up to 18 carbon atoms and alkyl-substituted phenyl having up to 18 carbon atoms, —$SO_2NHR''''$ wherein $R''''$ has the same meaning as $R'''$ and o-hydroxyphenyl, said o-hydroxyphenyl being unsubstituted or substituted in one of the 4- or 5-positions with alkoxy containing 1 to 12 carbon atoms and the other is hydrogen; B' is a radical selected from (1)

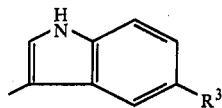

wherein $R^3$ is an electron withdrawing group selected from carboxy and cyano and (2)

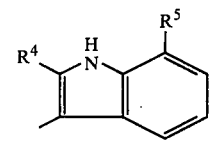

wherein one of $R^4$ and $R^5$ is a hydrogen-bonding group selected from carboxy, —$NHSO_2R'''$ wherein $R'''$ has the same meaning given above, —$SO_2NHR''''$ wherein $R''''$ has the same meaning given above and o-hyroxyphenyl, said o-hydroxyphenyl being unsubstituted or substituted in one of the 4- or 5-positions with alkoxy containing 1 to 12 carbon atoms, and the other is hydrogen; and X represents the atoms necessary to complete a ring-closing moiety selected from phthalide and naphthalide, said ring-closing moiety being unsubstituted.

10. A compound as defined in claim 9 wherein X represents phthalide.

11. A compound as defined in claim 9 wherein X represents naphthalide.

12. A compound as defined in claim 9 wherein B' is

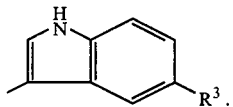

13. A compound as defined in claim 9 wherein B' is

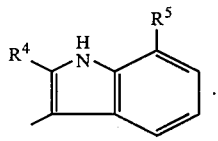

14. A compound as defined in claim 9 wherein $R^1$ is hydrogen and $R^2$ is a hydrogen-bonding group.

15. A compound as defined in claim 14 wherein X represents phthalide.

16. A compound as defined in claim 15 wherein $R^2$ is o-hydroxyphenyl.

17. A compound as defined in claim 16 wherein B' is

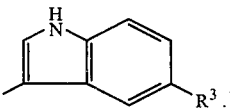

18. A compound as defined in claim 17 wherein $R^3$ is carboxy.

19. A compound as defined in claim 17 wherein $R^3$ is cyano.

20. A compound as defined in claim 16 wherein B' is

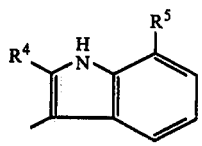

21. A compound as defined in claim 20 wherein $R^4$ is a hydrogen-bonding group and $R^5$ is hydrogen.
22. A compound as defined in claim 21 wherein $R^4$ is o-hydroxyphenyl.
23. A compound as defined in claim 20 wherein $R^4$ is hydrogen and $R^5$ is a hydrogen-bonding group.
24. A compound as defined in claim 23 wherein $R^5$ is carboxy.
25. A compound as defined in claim 23 wherein $R^5$ is —NHSO$_2$R.
26. A compound as defined in claim 23 wherein $R^5$ is —SO$_2$NHR.
27. A compound as defined in claim 14 wherein X represents naphthalide.
28. A compound as defined in claim 27 wherein $R^2$ is o-hydroxyphenyl.
29. A compound as defined in claim 9 wherein $R^1$ is a hydrogen-bonding group and $R^2$ is hydrogen.
30. A compound as defined in claim 29 wherein X is naphthalide.
31. A compound as defined in claim 30 wherein $R^1$ is carboxy.
32. A compound as defined in claim 31 wherein $B^r$ is

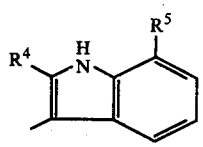

33. A compound as defined in claim 32 wherein $R^4$ is hydrogen and $R^5$ is a hydrogen-bonding group.
34. A compound as defined in claim 33 wherein $R^5$ is carboxy.
35. A compound as defined in claim 33 wherein $R^5$ is —NHSO$_2$R.
36. A compound as defined in claim 33 wherein $R^5$ is —SO$_2$NHR.
37. The compound

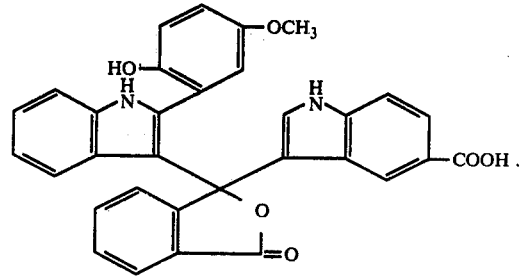

38. The compound

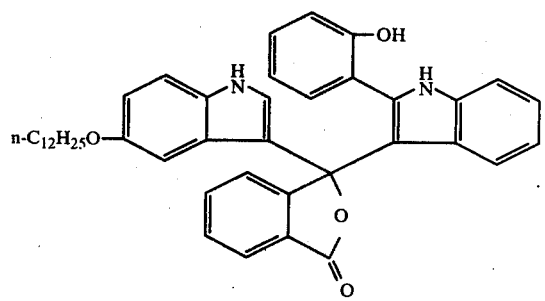

39. The compound

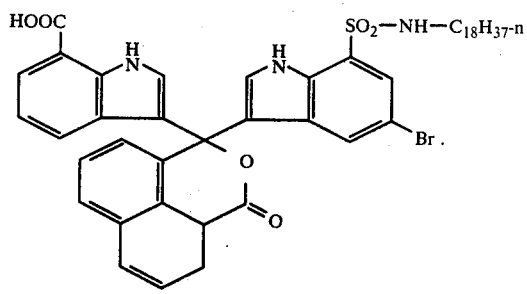

40. The compound

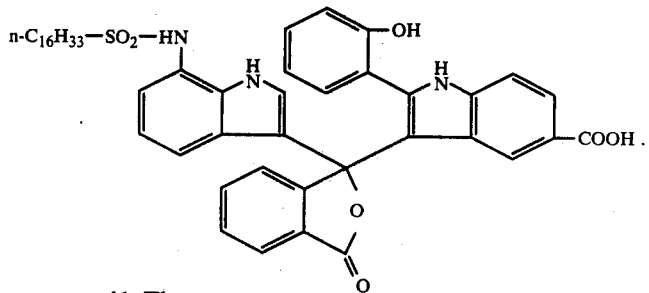

41. The compound

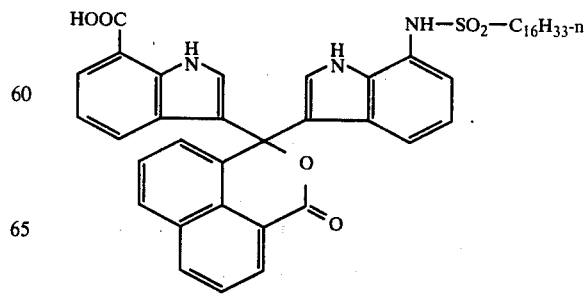

* * * * *